US012338144B2

(12) United States Patent
Trembly et al.

(10) Patent No.: US 12,338,144 B2
(45) Date of Patent: Jun. 24, 2025

(54) DECONTAMINATION OF FLUIDS VIA JOULE-HEATING

(71) Applicant: Ohio University, Athens, OH (US)

(72) Inventors: Jason Patrick Trembly, Athens, OH (US); David Drown Ogden, Athens, OH (US)

(73) Assignee: Ohio University, Athens, OH (US)

( * ) Notice: Subject to any disclaimer, the term of this patent is extended or adjusted under 35 U.S.C. 154(b) by 546 days.

(21) Appl. No.: 16/621,930

(22) PCT Filed: Jun. 29, 2018

(86) PCT No.: PCT/US2018/040327
§ 371 (c)(1),
(2) Date: Dec. 12, 2019

(87) PCT Pub. No.: WO2019/006323
PCT Pub. Date: Jan. 3, 2019

(65) Prior Publication Data
US 2020/0115258 A1  Apr. 16, 2020

Related U.S. Application Data

(60) Provisional application No. 62/527,248, filed on Jun. 30, 2017.

(51) Int. Cl.
*C02F 1/46* (2023.01)
*C02F 1/06* (2023.01)
*C02F 1/52* (2023.01)

(52) U.S. Cl.
CPC .............. *C02F 1/4608* (2013.01); *C02F 1/06* (2013.01); *C02F 1/52* (2013.01); *C02F 2201/46* (2013.01); *C02F 2209/03* (2013.01)

(58) Field of Classification Search
CPC . B01D 1/0017; B01D 3/06; C02F 1/06; C02F 1/4608; C02F 2201/46; C02F 2209/03; C02F 1/048
See application file for complete search history.

(56) References Cited

U.S. PATENT DOCUMENTS

| 3,686,474 A * | 8/1972 | Power ...................... H05B 3/00 392/396 |
| 2003/0196938 A1* | 10/2003 | Arnaud ................... C02F 1/463 210/96.1 |
| 2011/0011801 A1 | 1/2011 | Cho |
| 2011/0108491 A1 | 5/2011 | Lean et al. |

(Continued)

FOREIGN PATENT DOCUMENTS

WO   WO-2014174309 A1 *  10/2014  ............. B01D 61/42

OTHER PUBLICATIONS

Pseudocritical line—Pseudocritical points, nuclear-power.com, available at https://shorturl.at/zK068. (Year: 2023).*

(Continued)

*Primary Examiner* — Patrick Orme
(74) *Attorney, Agent, or Firm* — Wood Herron & Evans LLP

(57) ABSTRACT

A method of, and apparatus and system for, decontaminating a liquid containing dissolved solids including subjecting liquid containing dissolved solids to Joule heating under conditions effective to cause said dissolved solids to precipitate out of solution.

15 Claims, 34 Drawing Sheets

(56) References Cited

U.S. PATENT DOCUMENTS

| | | | | |
|---|---|---|---|---|
| 2011/0244305 A1* | 10/2011 | Zhang | .................. | H01M 4/669 |
| | | | | 429/231.95 |
| 2014/0054242 A1* | 2/2014 | Imai | .................... | C02F 1/46109 |
| | | | | 210/150 |
| 2014/0346114 A1 | 11/2014 | Trembly | | |
| 2014/0360885 A1* | 12/2014 | Pajari | .................... | C02F 1/4674 |
| | | | | 205/556 |

OTHER PUBLICATIONS

Specific Heat Calculator, omnicalculator.com, https://www.omnicalculator.com/physics/specific-heat (last visited Jul. 13, 2023). (Year: 2023).*

Heat Capacity and Specific Heat, chem.libretexts.org, available at https://shorturl.at/iowA9 (last visited Jul. 13, 2023). (Year: 2023).*

Facts About Platinum, LiveScience.org, https://www.livescience.com/39144-platinum.html (last visited Mar. 26, 2022). (Year: 2022).*

Shaffer, D. L. et al., "Desalination and Reuse of High-Salinity Shale Gas Produced Water: Drivers, Technologies, and Future Directions," Environ. Sci. Technol., vol. 47, No. 17, pp. 9569-9583, Sep. 2013.

Thiel, G. P. et al., "Energy consumption in desalinating produced water from shale oil and gas extraction," Desalination, p. 94, 2015.

Toner, J. D. et al., "A Low-Temperature Thermodynamic Model for the Na—K—Ca—Mg—Cl System Incorporating New Experimental Heat Capacities in KCl, MgCl2, and CaCl2 Solutions," Journal of Chemical & Engineering Data, vol. 62, No. 3, pp. 995-1010, Mar. 2017.

Van Wyk, S. et al., "Design and results of a first generation pilot plant for supercritical water desalination (SCWD)," Desalination, vol. 439, pp. 80-92, Aug. 2018.

Veil, J. A. et al., "NORM disposal options, costs vary," Oil Gas J., vol. 97, No. 1, pp. 37-43, 1999.

Veil, J. A. et al., "Produced water volume estimates and management practices," SPE Production & Operations, vol. 26, No. 03, pp. 234-239, 2011.

Zhang, T. et al., "Co-precipitation of Radium with Barium and Strontium Sulfate and Its Impact on the Fate of Radium during Treatment of Produced Water from Unconventional Gas Extraction," Environ. Sci. Technol., vol. 48, No. 8, pp. 4596-4603, Apr. 2014.

Ziemkiewicz, P. F. et al., "Evolution of water chemistry during Marcellus Shale gas development: A case study in West Virginia," Chemosphere, vol. 134, pp. 224-231, Sep. 2015.

Zoback, M. et al., "Addressing the environmental risks from shale gas development," Worldwatch Institute, Briefing Paper, Jul. 2010.

International Search Report and Written Opinion in International Patent Application No. PCT/US2018/040327, mailed Nov. 19, 2018, 11 pgs.

Pioro et al., "Thermophysical Properties at Critical and Supercritical Conditions", Jan. 28, 2011 (Jan. 28, 2011); retrieved on Aug. 30, 2018 from <https://www.intechopen.com/books/heat-transfer-theoretical-analysis-experimental-investigations-and-industrial-systems/thermophysical properties-at-critical-and-supercritical-pressures;> entire document; especially p. 2 para 1.

Wikipedia, "Joule heating", Apr. 5, 2017 (Apr. 5, 2017), retrieved on Aug. 30, 2018 from <https://en.wikipedia.org/w/index.php?title=Joule_heating&oldid=773933488> ; entire document, especially p. 1 para 1, p. 2 para 5.

Pioro, et al., Thermophysical Properties at Critical and Supercritical Pressures, Heat Transfer—Theoretical Analysis, Experimental Investigations and Industrial Systems, Jan. 2011, pp. 573-592, IntechOpen, London, UK.

Todd, et al., Corrigendum to "Thermodynamics of high-temperature, high-pressue water electrolysis", Journal of Power Sources 289, 2015, pp. 184-186, Elsevier B.V., Netherlands.

Abdullah, J. A. et al., "An innovative procedure for NORM scales treatment and radionuclides separation," Appl. Radiat. Isot., vol. 125, pp. 139-143.

Adams, L. H. et al., "Equilibrium in binary systems under pressure. I. An experimental and thermodynamic investigation of the system, NaCl—H2O, at 25°," Journal of the American Chemical Society, vol. 53, No. 10, pp. 3769-3813, 1931.

Archer, D., "Thermodynamic properties of NaCl+H2O system I. Thermodynamic properties of NaCl(cr)," Journal of Physical and Chemical reference Data, vol. 21, No. 1, p. 121, 1992.

Archer, D., "Thermodynamic properties of NaCl+H2O system II. Thermodynamic properties of NaCl(aq), NaCl—2H2O(cr), and phase equilibria," Journal of Physical and Chemical reference Data, vol. 21, No. 4, pp. 793-829, 1992.

Armellini, F. "Phase equilibria and precipitation phenomena of sodium chloride and sodium sulfate in sub- and supercritical water," Massachusetts Institute of Technology, 1993.

Barnes, H. L. et al., "Chemical aspects of acid mine drainage," Water Polution Control Federation, vol. 40, No. 3, pp. 371-384, Mar. 1968.

Benavides, P. T. et al., "Optimal design of adsorbents for NORM removal from produced water in natural gas fracking. Part 1: Group contribution method for adsorption," Chem. Eng. Sci., vol. 137, pp. 964-976, Dec. 2015.

Benavides, P. T. et al., "Optimal design of adsorbents for NORM removal from produced water in natural gas fracking. Part 2: CAMD for adsorption of radium and barium," Chem. Eng. Sci., vol. 137, pp. 977-985, Dec. 2015.

Bergmo, P. E. S. et al., "Simultaneous CO2 injection and water production to optimise aquifer storage capacity," International Journal of Greenhouse Gas Control, vol. 5, No. 3, pp. 555-564, May 2011.

Bischoff, J. L. et al., "Liquid-vapor relations for the system NaCl—H2O: summary of the P-T-x surface from 300° to 500° C.," American Journal of Science, vol. 289, pp. 217-248, 1989.

Bischoff, J. L. et al., "The system NaCl—H2O: Relations of vapor-liquid near the critical temperature of water and of vapor-liquid-halite from 300° to 500° C.," Geochim. Cosmochim. Acta, vol. 50, No. 7, pp. 1437-1444, 1986.

Blondes, M. S. et al., "US Geological Survey National Produced Waters Geochemical Database v2. 3 (Provisional) Documentation," USGS Dec. 2017.

Blount, C. W. et al., "The solubility of anhydrite (CaSO4) in NaCl—H2O from 100 to 450° C. and 1 to 1000 bars," Geochimica et Cosmochimica Acta, vol. 33, pp. 227-245, Jan. 1969.

Brown, P. L. et al., "Hydrolysis of magnesium(II) at elevated temperatures," J. Chem. Soc., Dalton Trans., 1996, pp. 3071-3075.

Clark, C. E. et al., "Produced water volumes and management practices in the United States," Argonne National Laboratory (ANL), 2009.

Coday, B. D. et al., "Forward Osmosis: Novel desalination of produced water and fracturing flowback," Journal American Water Works Association, vol. 106, pp. E55-E66, Feb. 2014.

Dastgheib, S. A. et al., "Produced Water from CO2-EOR in the Illinois Basin," Energy Procedia, vol. 63, pp. 6878-6886, 2014.

DiPippo, M. M. et al., "Ternary phase equilibria for the sodium chloride-sodium sulfate-water system at 200 and 250 bar up to 400° C.," Fluid Phase Equilibria, vol. 157, No. 2, pp. 229-255, 1999.

Dong, et al., "Techno-economic analysis of hydraulic fracking flowback and produced water treatment in supercritical water reactor," Energy, vol. 133, pp. 777-783, Aug. 2017.

Driesner, T. et al., "The system H2O—NaCl. Part I: Correlation formulae for phase relations in temperature-pressure-composition space from 0 to 1000° C., 0 to 5000 bar, and 0 to 1 XNaCl," Geochimica et Cosmochimica Acta, vol. 71, pp. 4880-4901, Oct. 2007.

Driesner, T., "The system H2O—NaCl. Part II: Correlations for molar volume enthalpy, and isobaric heat capacity from 0 to 1000° C., 1 to 5000 bar, and 0 to 1 XNaCl," Geochimica et Cosmochimica Acta, vol. 71, pp. 4902-4919, Oct. 2007.

Fan, W. et al., "Radium-226 Removal from Simulated Produced Water Using Natural Zeolite and Ion-Exchange Resin," Ind. Eng. Chem. Res., vol. 55, No. 48, pp. 12502-12505, Dec. 2016.

(56) References Cited

OTHER PUBLICATIONS

Gray, M. R. et al., "Kinetics of Hydrolysis of Chloride Salts in Model Crude Oil," Pet. Sci. Technol., vol. 26, No. 16, pp. 1924-1933, Oct. 2008.
Greenlee, L. F. et al., "Reverse osmosis desalination: Water sources, technology, and today's challenges," Water Res., vol. 43, No. 9, pp. 2317-2348, May 2009.
Guerra, K. et al., "Oil and gas producted water management and beneficial use in the western United States," U.S. Department of Interior Bureau of Reclamation, 157, Sep. 2011.
Haluszczak, L. O. et al., "Geochemical evaluation of flowback brine from Marcellus gas wells in Pennsylvania, U.S.A.," Applied Geochemistry, vol. 28, pp. 55-61, Jan. 2013.
Hardy, A. et al., "NORM Mitigation and Clean Water Recovery from Marcellus Produced Water," p. 143.
Heijman, S. G. J. et al., "Zero liquid discharge: Heading for 99% recovery in nanofiltration and reverse osmosis," Desalination, vol. 236, No. 1-3, pp. 357-362, Jan. 2009.
Hnedkovsky L. et al., "A new version of differential flow heat capacity calorimeter, tests of heat loss corrections and heat capacities of aqueous NaCl from T=300 K to T=623 K," The Journal of Chemical Thermodynamics, vol. 34, No. 6, pp. 755-782, Jun. 2002.
Hovey, J. K. et al., "Vapor-liquid phase equilibria of potassium chloride-water mixtures: equation-of-state representation for KCl—H2O and NaCl—H2O," Journal of Physical Chemistry, vol. 94, No. 3, pp. 1175-1179, 1990.
Kaplan, R. et al., "Assessment of desalination technologies for treatment of a highly saline brine from a potential CO2 storage site," Desalination, vol. 404, pp. 87-101, Feb. 2017.
Keevil, N. B., "Vapor pressures of aqueous solutions at high temperatures," Journal of the American Chemical Society, vol. 64, No. 4, pp. 841-850, 1942.
Konikow, L. F., "Long-Term Groundwater Depletion in the United States," Groundwater, vol. 53, No. 1, pp. 2-9, 2015.
Land, L. S. et al., "The origin and evolution of saline formation water, lower cretaceous carbonates, south-central Texas, U.S.A.," Journal of Hydrology, vol. 54, No. 1-3, pp. 51-74, 1981.
Leusbrock, I. et al., "Quantitative approaches for the description of solubilities of inorganic compounds in near-critical and supercritical water," J. of Supercritical Fluids 47 (2008) 117-127.
Leusbrock, I. et al., "Solubility of 1:1 Alkali Nitrates and Chlorides in Near-Critical and Supercritical Water," Journal of Chemical & Engineering Data, vol. 54, No. 12, pp. 3215-3223, Dec. 2009.
Leusbrock, I. et al., "The solubility of magnesium chloride and calcium chloride in near-critical and supercritical water," The Journal of Supercritical Fluids, vol. 53, No. 1-3, pp. 17-24, Jun. 2010.
Leusbrock, I., "Removal of inorganic compounds via supercritical water," University of Groningen, 2011.
Lopez, D. E. et al., "Desalination of hypersaline brines with joule-heating and chemical pre-treatment: Conceptual design and economics," Desalination, vol. 415, pp. 49-57, Aug. 2017.
Mangelson, K. A. et al., "Removing and disposing of radium from well water," J. Am. Water Works Assoc., vol. 82, No. 6, pp. 72-76, 1990.
Mielke, E. et al., "Water Consumption of Energy Resource Extraction, Processing, and Conversion," Energy Technology Innovation Policy Research Group, Oct. 2010.
Moon, D. et al., "Preconcentration of radium isotopes from natural waters using MnO2 Resin," Appl. Radiat. Isot., vol. 59, No. 4, pp. 255-262, Oct. 2003.
Odu, S. O. et al., "Design of a process for supercritical water desalination with zero liquid discharge," Industrial and Engineering Chemistry Research, vol. 54, pp. 5527-5535, 2015.
Ogden, D. D. et al., "Desalination of hypersaline brines via Joule-heating: Experimental investigations and comparison of results to existing models," Desalination, vol. 424, pp. 149-158, Dec. 2017.
Oren, Y. et al., "Pilot studies on high recovery BWRO-EDR for near zero liquid discharge approach," Desalination, vol. 261, No. 3, pp. 321-330, Oct. 2010.
Palliser, C. et al., "A model for deep geothermal brines, II: thermodynamic properties—density," Transport in Porous Media, vol. 33, pp. 129-154, 1998.
Palliser, C., "A model for deep geothermal brines: state space description and thermodymanic properties," Massey University, 1998.
Rubinstein, J. L. et al., "Myths and Facts on Wastewater Injection, Hydraulic Fracturing, Enhanced Oil Recovery, and Induced Seismicity," Seismol. Res. Lett., vol. 86, No. 4, pp. 1060-1067, Jul. 2015.
Savage, P. E. et al., "Reactions at supercritical conditions: Applications and fundamentals," AIChE Journal, vol. 41, No. 7, pp. 1723-1778, Jul. 1995.
Schubert, M. et al., "Continuous salt precipitation and separation from supercritical water. Part 2. Type 2 salts and mixtures of two salts," The Journal of Supercritical Fluids, vol. 52, No. 1, pp. 113-124, Feb. 2010.

\* cited by examiner

DECONTAMINATION OF FLUIDS VIA JOULE-HEATING

CROSS-REFERENCE TO RELATED APPLICATIONS

This application claims priority to, and the benefit of the filing date of, U.S. Patent Application Ser. No. 62/527,248, entitled "Desalination of Hypersaline Brines via Joule-Heating," filed Jun. 30, 2017, the disclosure of which is incorporated by reference herein in its entirety.

STATEMENT REGARDING FEDERALLY SPONSORED RESEARCH

This invention was made with government support under DE-FE0026315 awarded by the Department of Energy. The government has certain rights in the invention.

FIELD OF THE INVENTION

The present invention relates generally to methods, apparatus, and systems for removing contaminants, such as dissolved solids, from liquids, such as water.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

The ability to find adequate freshwater resources for energy production is a growing concern in the United States and around the world. A 2015 study showed that nearly all U.S. aquifers have shown significant depletion since 1900, with a distinct increase in depletion rate during the 1940's and after the year 2000 [L. F. Konikow, "Long-Term Groundwater Depletion in the United States," Groundwater, vol. 53, no. 1, pp. 2-9, 2015]. While water resources are scarce in some locations, they are being contaminated in others.

Hydraulic fracturing is a water intensive process that generates a significant amount of wastewater (produced water), also known as brine. The production of produced water from conventional and unconventional hydrocarbon reservoirs remains the most significant industrial waste byproduct by volume [C. E. Clark and J. A. Veil, "Produced water volumes and management practices in the United States.," Argonne National Laboratory (ANL), 2009]. A recent study showed that a single hydraulically fractured lateral can consume up to 5.6 million gallons of fresh water during the initial drilling and hydraulic fracturing phase of the well development [E. Mielke, L. Diaz Anadon, and V. Narayanamurti, "Water Consumption of Energy Resource Extraction, Processing, and Conversion," Energy Technology Innovation Policy Research Group, October, 2010]. Another study, conducted by the Argonne National Laboratory, estimated that the total volume of produced water in 2007 was nearly 882 billion gallons [J. Veil, et al., "Produced water volume estimates and management practices," SPE Production & Operations, vol. 26, no. 03, pp. 234-239, 2011]. The United States Geological Survey (USGS) Produced Water Database estimates roughly 14 billion barrels (bbl) of the waste is annually generated by oil/gas wells. Estimates indicate nearly $11 billion was spent in 2013 on transporting produced water alone. These produced waters induce multiple strains on the infrastructure and environment, from transportation costs [D. L. Shaffer, L. H. Arias Chavez, M. Ben-Sasson, S. Romero-Vargas Castrillón, N. Y. Yip, and M. Elimelech, "Desalination and Reuse of High-Salinity Shale Gas Produced Water: Drivers, Technologies, and Future Directions," Environ. Sci. Technol., vol. 47, no. 17, pp. 9569-9583, September 2013] to seismic activity around particular injection sites [J. L. Rubinstein and A. B. Mahani, "Myths and Facts on Wastewater Injection, Hydraulic Fracturing, Enhanced Oil Recovery, and Induced Seismicity," Seismol. Res. Lett., vol. 86, no. 4, pp. 1060-1067, July 2015]. Dissolved salts, unreacted hydrocarbons, and inorganic compounds make recovery of clean water quite difficult [C. E. Clark and J. A. Veil, "Produced water volumes and management practices in the United States.," Argonne National Laboratory (ANL), 2009]. A 2016 report projects tremendous growth in produced water treatment and recycling, resulting in a $3.8 billion market by 2025 ["Wastewater Treatment Technologies in Natural Gas Hydraulic Fracturing," Navigant Research, 16 Apr. 2016]. Sodium chloride is the predominant component within produced water streams as seen in Table 1 (below); however, other primary ions are found, including but not limited to, $Ba^{2+}$, $Sr^{2+}$ and naturally occurring radioactive materials (NORM), which magnifies treatment difficulty and associated costs [M. S. Blondes et al., "US Geological Survey National Produced Waters Geochemical Database v2. 3 (PROVISIONAL) Documentation," USGS December 2017].

TABLE 1

Ranges of aqueous ions within produced water generated by unconventional gas reservoirs, from the USGS database. Data points presented as mg · $L^{-1}$; data represented as ppm were neglected

| Cations | |
|---|---|
| $Na^+$ | 13.1-117,000 mg · $L^{-1}$ |
| $Ca^{2+}$ | 1.95-162,324 mg · $L^{-1}$ |
| $Mg^{2+}$ | 0.1-5,560 mg · $L^{-1}$ |
| $K^+$ | 0.07-4,080 mg · $L^{-1}$ |
| $Ba^{2+}$ | 0.05-22,400 mg · $L^{-1}$ |
| $Sr^{2+}$ | 0.07-15,400 mg · $L^{-1}$ |
| Anions | |
| $Cl^-$ | 1-196,000 mg · $L^{-1}$ |
| $SO_4^{2-}$ | 0.1-3,580 mg · $L^{-1}$ |
| $HCO_3^-$ | 0.01-13,880 mg · $L^{-1}$ |

To prevent production of voluminous solid end products with radioactive or hazardous components, researchers have been investigating various methods to remove such constituents via precipitative and adsorption methodologies [P. T. Benavides and U. Diwekar, "Optimal design of adsorbents for NORM removal from produced water in natural gas fracking. Part 1: Group contribution method for adsorption," Chem. Eng. Sci., vol. 137, pp. 964-976, December 2015; P. T. Benavides, B. H. Gebreslassie, and U. M. Diwekar, "Optimal design of adsorbents for NORM removal from produced water in natural gas fracking. Part 2: CAMD for adsorption of radium and barium," Chem. Eng. Sci., vol. 137, pp. 977-985, December 2015; J. A. Abdullah, M. S. Al-Masri, Y. Amin, H. Khalily, M. Ammar, and S. Nassour, "An innovative procedure for NORM scales treatment and radionuclides separation," Appl. Radiat. Isot., vol. 125, pp.

139-143, July 2017; W. Fan et al., "*Radium-226 Removal from Simulated Produced Water Using Natural Zeolite and Ion-Exchange Resin*," Ind. Eng. Chem. Res., vol. 55, no. 48, pp. 12502-12505, December 2016; K. A. Mangelson and R. P. Lauch, "*Removing and disposing of radium from well water*," J. Am. Water Works Assoc., vol. 82, no. 6, pp. 72-76, 1990; D. Moon, W. Burnett, S. Nour, P. Horwitz, and A. Bond, "*Preconcentration of radium isotopes from natural waters using MnO2 Resin*," Appl. Radiat. Isot., vol. 59, no. 4, pp. 255-262, October 2003; A. Hardy and A. Shapiro, "*NORM Mitigation and Clean Water Recovery from Marcellus Produced Water*," p. 143; J. A. Veil and K. Smith, "*NORM disposal options, costs vary*," Oil Gas J., vol. 97, no. 1, pp. 37-43, 1999; and T. Zhang, K. Gregory, R. W. Hammack, and R. D. Vidic, "*Co-precipitation of Radium with Barium and Strontium Sulfate and Its Impact on the Fate of Radium during Treatment of Produced Water from Unconventional Gas Extraction*," Environ. Sci. Technol., vol. 48, no. 8, pp. 4596-4603, April 2014]. And, research into effective methods of purifying hypersaline brines to reduce environmental impact and energy production costs will remain.

Further, as carbon emissions from power production have come under increased scrutiny, interest in $CO_2$ sequestration via deep saline aquifers has increased. Projections indicate injection of one metric ton of $CO_2$ can produce 1 m³ of saline water with total dissolved solids (TDS) concentrations ranging from 6 to 210 g·L⁻¹[P. E. S. Bergmo, A.-A. Grimstad, and E. Lindeberg, "*Simultaneous $CO_2$ injection and water production to optimise aquifer storage capacity*," International Journal of Greenhouse Gas Control, vol. 5, no. 3, pp. 555-564, May 2011; S. A. Dastgheib, C. Knutson, and Y. Yang, "*Produced Water from $CO_2$-EOR in the Illinois Basin*," Energy Procedia, vol. 63, pp. 6878-6886, 2014].

To date, many methods have been developed for decontaminating or disposing of hypersaline brines. These methods range from injection into underground reservoirs to treatment at municipal water plants [M. Zoback, S. Kitasei, and B. Copithorne, "*Addressing the environmental risks from shale gas development*," Worldwatch Institute, Briefing Paper, July 2010]. Membrane technology (including forward and reverse osmosis filtration) are being pursued, but membrane fouling and pH sensitivity are still issues along with limited water recovery [B. D. Coday and T. Y. Cath, "*Forward Osmosis: Novel desalination of produced water and fracturing flowback*," Journal—American Water Works Association, vol. 106, pp. E55-E66, February 2014; R. Kaplan, D. Mamrosh, H. H. Salih, and S. A. Dastgheib, "*Assessment of desalination technologies for treatment of a highly saline brine from a potential $CO_2$ storage site*," Desalination, vol. 404, pp. 87-101, February 2017]. Among the methods commonly employed to treat hypersaline brines, processes with low or zero liquid discharge (ZLD) are becoming more attractive due to their ability to limit costs associated with transport and disposal of concentrate [Y. Oren et al., "*Pilot studies on high recovery BWRO-EDR for near zero liquid discharge approach*," Desalination, vol. 261, no. 3, pp. 321-330, October 2010]. Nanofiltration and reverse osmosis (RO) membranes are becoming attractive due to their incredibly high recovery [Y. Oren et al., "*Pilot studies on high recovery BWRO-EDR for near zero liquid discharge approach*," Desalination, vol. 261, no. 3, pp. 321-330, October 2010; S. G. J. Heijman, H. Guo, S. Li, J. C. van Dijk, and L. P. Wessels, "*Zero liquid discharge: Heading for 99% recovery in nanofiltration and reverse osmosis*," Desalination, vol. 236, no. 1-3, pp. 357-362, January 2009]; however, these methods are typically limited to concentrations of 50 mg·L⁻¹ and require pretreatment and multiple passes [L. F. Greenlee, D. F. Lawler, B. D. Freeman, B. Marrot, and P. Moulin, "*Reverse osmosis desalination: Water sources, technology, and today's challenges*," Water Res., vol. 43, no. 9, pp. 2317-2348, May 2009]. Simple distillation of the brines could be completed, but the process would be highly energy intensive for large scale desalination of high salinity waste streams [R. Kaplan, D. Mamrosh, H. H. Salih, and S. A. Dastgheib, "*Assessment of desalination technologies for treatment of a highly saline brine from a potential $CO_2$ storage site*," Desalination, vol. 404, pp. 87-101, February 2017]. Evaporation pits are a simple technology that have been successfully used in desalination of low concentration brines (mainly from membrane desalination permeate) but these require a large footprint and do not recover the desalinated water [R. Kaplan, D. Mamrosh, H. H. Salih, and S. A. Dastgheib, "*Assessment of desalination technologies for treatment of a highly saline brine from a potential $CO_2$ storage site*," Desalination, vol. 404, pp. 87-101, February 2017]. Mechanical vapor compression and multi-effect desalination systems are currently in use for desalination of produced water, but have low recovery ratios for high concentration brine feed water [G. P. Thiel, E. W. Tow, L. D. Banchik, H. W. Chung, and J. H. Lienhard, "*Energy consumption in desalinating produced water from shale oil and gas extraction*," Desalination, p. 94, 2015].

Produced water TDS content can vary wildly depending upon the source reservoir, so a means of treating higher salinity brines with minimal discharge is an emerging concern [M. S. Blondes et al., "US Geological Survey National Produced Waters Geochemical Database v2. 3 (PROVISIONAL) Documentation," USGS December, 2017]. And so, another possible method for treating hypersaline brines generated from industrial activities (including oil/gas wells and $CO_2$ injection wells) is a supercritical-water based treatment process. Like many fluids, as pure water approaches its critical point, its enthalpy of vaporization ($\Delta h_{vap}$) diminishes dramatically, until the critical point is reached where a single phase is formed (i.e. no change of state occurs with heat addition). Utilizing supercritical water properties is a known means to desalinate brine waste generated by industrial processes [S. O. Odu, A. G. J. van der Ham, S. Metz, and S. R. A. Kersten, "*Design of a process for supercritical water desalination with zero liquid discharge*," Industrial and Engineering Chemistry Research, vol. 54, pp. 5527-5535, 27 2015; I. Leusbrock, "*Removal of inorganic compounds via supercritical water*," University of Groningen, 2011; I. Leusbrock, S. J. Metz, G. Rexwinkel, and G. F. Versteeg, "*Solubilities of inorganic compounds in supercritical water*;" University of Groningen; I. Leusbrock, S. J. Metz, G. Rexwinkel, and G. F. Versteeg, "*The solubility of magnesium chloride and calcium chloride in near-critical and supercritical water*," The Journal of Supercritical Fluids, vol. 53, no. 1-3, pp. 17-24, June 2010; I. Leusbrock, S. J. Metz, G. Rexwinkel, and G. F. Versteeg, "*Solubility of 1:1 Alkali Nitrates and Chlorides in Near-Critical and Supercritical Water*," Journal of Chemical & Engineering Data, vol. 54, no. 12, pp. 3215-3223, December 2009]. And so, for brines of higher salinity, supercritical water desalination (SCWD) has become more attractive to overcome difficulties such as osmotic pressure associated with reverse osmosis [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007]. This method has historically been used in organic waste removal [L. H. Adams, "*Equilibrium in binary systems under pressure. I. An experimental and thermodynamic investigation of the system, NaCl—$H_2O$, at 25*," Journal of the American Chemical Society, vol. 53, no. 10, pp. 3769-3813, 1931] but is emerging as a desalination method due to its potential for minimal liquid discharge with hypersaline brines near the salt saturation point [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007; C. W. Blount and F. W. Dickson, "*The solubility of anhydrite ($CaSO^4$) in NaCl—$H_2O$ from 100 to 450° C. and 1 to 1000 bars*," Geochimica et Cosmochimica Acta, vol. 33, pp. 227-245, 01 1969; J. K. Hovey, K. S. Pitzer, J. C. Tanger, J. L. Bischoff, and R. J. Rosenbauer, "*Vapor-liquid phase equilibria of potassium chloride-water mixtures: equation-of-state representation for potassium chloride-water and sodium chloride-water*," Journal of Physical Chemistry, vol. 94, no. 3, pp. 1175-1179, 1990; F. Armellini, "*Phase equilibria and precipitation phenomena of sodium chloride and sodium sulfate in sub- and supercritical water*," Massachusetts Institute of Technology, 1993; L. Hněmdkovský, V. Hynek, V. Majer, and R. H. Wood, "*A new version of differential flow heat capacity calorimeter; tests of heat loss corrections and heat capacities of aqueous NaCl from T=300 K to T=623 K*," The Journal of Chemical Thermodynamics, vol. 34, no. 6, pp. 755-782, June 2002; and J. L. Bischoff and K. S. Pitzer, "*Liquid-vapor relations for the system NaCl—$H_2O$: summary of the P-T-x surface from 300 degrees to 500 degrees Celsius*," American Journal of Science, vol. 289, pp. 217-248, 1989]. However, these applications suffer from high capital costs and heat losses due to the heating methods employed [T. Driesner, "*The system $H_2O$—NaCl. Part II: Correlations for molar volume, enthalpy, and isobaric heat capacity from 0 to 1000° C., 1 to 5000bar, and 0 to 1 XNaCl*," Geochimica et Cosmochimica Acta, vol. 71, pp. 4902-4919, January 2007; F. Armellini, "*Phase equilibria and precipitation phenomena of sodium chloride and sodium sulfate in sub- and supercritical water*," Massachusetts Institute of Technology, 1993; L. Hněmdkovský, V. Hynek, V. Majer, and R. H. Wood, "*A new version of differential flow heat capacity calorimeter; tests of heat loss corrections and heat capacities of aqueous NaCl from T=300 K to T=623 K*," The Journal of Chemical Thermodynamics, vol. 34, no. 6, pp. 755-782, June 2002; and J. L. Bischoff and K. S. Pitzer, "*Liquid-vapor relations for the system NaCl—$H_2O$: summary of the P-T-x surface from 300 degrees to 500 degrees Celsius*," American Journal of Science, vol. 289, pp. 217-248, 1989], which hinders the scaling of the application from a techno-economic standpoint [D. Archer, "*Thermodynamic properties of NaCl+$H_2O$ system II. Thermodynamic properties of NaCl (aq), NaCl—2H2O(cr), and phase equilibria*," Journal of Physical and Chemical reference Data, vol. 21, no. 4, pp. 793-829, 1992]. For example, most supercritical water reactors utilize externally heated designs, which possess high thermal lag, internal scaling issues, and high manufacturing costs. Due to these issues, such systems are unable to be cost-effectively scaled.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

As described above, various aspects of the present invention address the drawbacks described above. For example, as mentioned above, current methods of decontaminating or disposing of contaminated liquids, such as hypersaline brines, (including injection into underground reservoirs, treatment at municipal water plants, membrane technology, distillation, evaporation pits, mechanical vapor compression, and multi-effect desalination) include multiple drawbacks. And while use of supercritical water properties is a known means to desalinate brine waste generated by industrial processes, the supercritical water reactors cannot be scaled due to problems like high thermal lag and high manufacturing costs that result from the externally heated designs of these reactors (among other issues).

And so, various aspects of the present invention include new reactor designs that include alternative heating apparatus and methods. In various embodiments directed to these aspects of the present invention, Joule-heating, a result of the power dissipated as current travels through a non-ideal conductor, is used for directly heating a liquid. Thus, one aspect of the present invention provides a method of decontaminating a liquid containing dissolved solids, wherein the method includes subjecting that liquid to Joule-heating under conditions effective to cause the dissolved solids to precipitate out of solution. In certain embodiments, the liquid being treated may be water having dissolved salts therein.

Another aspect of the present invention provides an apparatus to decontaminate a liquid including dissolved solids. The apparatus includes at least (1) a reactor having a first electrode and a second electrode, and (2) a liquid flow path between the first and second electrodes. In certain embodiments, one of the electrodes may include a wall of the reactor, and the other electrode may be at least partially disposed within the reactor. In use, an electrical current may be applied between the inner electrode and the wall of the reactor in order to Joule-heat the liquid within the flow path. During use of the apparatus, the liquid may be heated until it reaches a pseudocritical temperature, and it then divides into two phases: vapor and liquid. As the vapor is produced, dissolved solids transfer to the remaining liquid in the liquid phase. The vapor can then be removed and collected. And the remaining liquid can be separately removed and collected. As with the method described above, in certain embodiments, the liquid being treated in the apparatus may be water having dissolved salts therein (i.e., a brine). In such embodiments, the reactor operates as a desalinator.

This apparatus allows for direct control of power applied to the brine using the electrical conductivity of the brine when applying an alternating current (AC), resulting in a lower TDS content vapor product (a vapor phase) and a concentrated TDS liquid product (a liquid phase). The electrode that allows for direct heat conduction within the reactor, takes advantage of the high prevalence of conducting salts within a produced water stream. This internal heating method potentially overcomes issues plaguing supercritical water treatment of produced water, including poor heat transfer caused by internal wall fouling and limited scalability due to thick reactor walls [D. D. Ogden and J. P. Trembly, "*Desalination of hypersaline brines via Joule-heating: Experimental investigations and comparison of results to existing models*," Desalination, vol. 424, pp. 149-158, December 2017]. By modulating the conductivity of the contained fluid via phase separation, the applied power is directly proportional to the vapor-to-liquid ratio [D. D. Ogden and J. P. Trembly, "*Desalination of hypersaline brines via Joule-heating: Experimental investigations and comparison of results to existing models*," Desalination, vol. 424, pp. 149-158, December 2017].

Another aspect of the present application provides a further apparatus for flash evaporation. This apparatus may include a heater vessel and a flash evaporation vessel. A liquid containing dissolved solids (such as water containing dissolved salts) is delivered into the heater vessel. This liquid may, for example, be the liquid that is removed and collected from the reactor apparatus described above (following Joule-heating and removal of vapor). Once a desired temperature and pressure are achieved, the liquid is released to the flash evaporation vessel, where at least partial vaporization of the liquid occurs. The vapor generated via flash evaporation may then be removed and condensed.

A further aspect of the present invention provides a system for decontaminating a liquid. The system may include at least (1) a reactor having a first electrode, a second electrode, and a liquid flow path between said first and second electrodes, and (2) at least one flash evaporation apparatus in fluid communication with said reactor. The reactor may be the similar or the same to that described above. And the flash evaporation apparatus may the similar or the same to that described above. The system of this aspect of the present invention may further include precipitation and separation tanks for pretreatment of the liquid before it enters the reactor and subsequently the flash evaporation vessel.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

Figure 1:
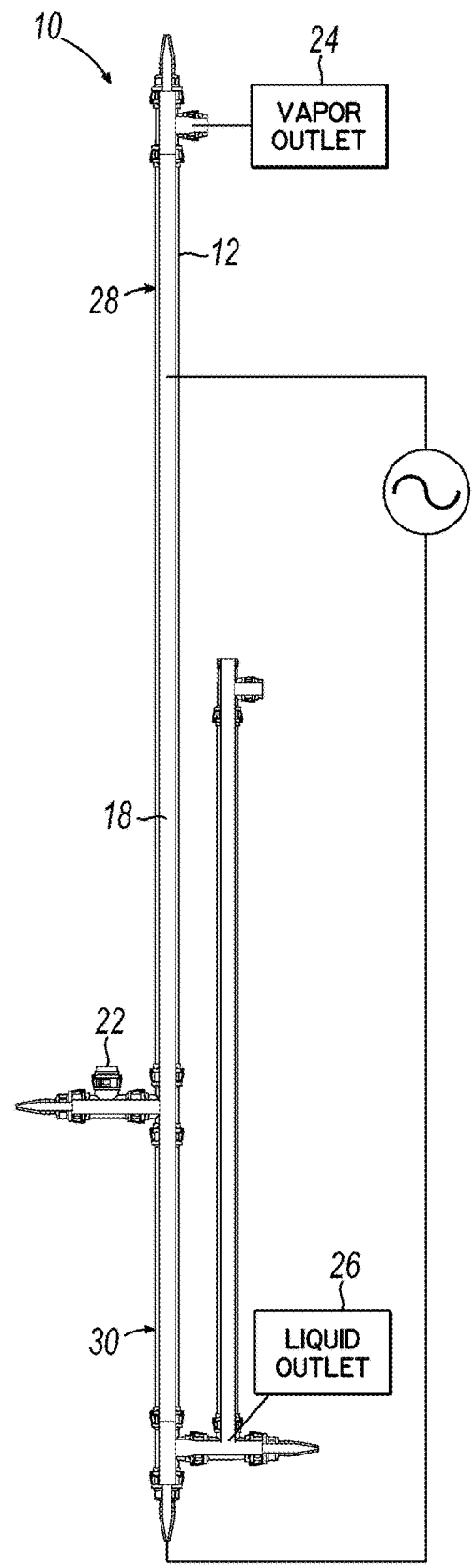
FIG. 1 is cross-sectional view of a reactor in accordance with various aspects and principles of the invention described herein.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, various aspects of the present invention address the drawbacks described above. For example, as mentioned above, current methods of decontaminating or disposing of contaminated liquids, such as hypersaline brines, (including injection into underground reservoirs, treatment at municipal water plants, membrane technology, distillation, evaporation pits, mechanical vapor compression, and multi-effect desalination) include multiple drawbacks. And while use of supercritical water properties is a known means to desalinate brine waste generated by industrial processes, the supercritical water reactors cannot be scaled due to problems like high thermal lag and high manufacturing costs that result from the externally heated designs of these reactors (among other issues).

And so, various aspects of the present invention include new reactor designs that include alternative heating apparatus and methods. In various embodiments directed to these aspects of the present invention, Joule-heating, a result of the power dissipated as current travels through a non-ideal conductor, is used for directly heating a liquid. Thus, one aspect of the present invention provides a method of decontaminating a liquid containing dissolved solids, wherein the method includes subjecting that liquid to Joule-heating under conditions effective to cause the dissolved solids to precipitate out of solution. In certain embodiments, the liquid being treated may be water having dissolved salts therein.

In the method of this aspect of the present invention, an electrical current is passed through the liquid in order to Joule-heat the liquid. When this occurs to sufficient heating, a portion of the liquid vaporizes, which causes a portion of the dissolved solids therein to precipitate. More specifically, the liquid is heated to a pseudocritical temperature and subsequently a vapor is separated from the liquid, causing dissolved solids to precipitate from remaining liquid, and to be collected in the remaining liquid (i.e., that portion of the original liquid that remains in the liquid phase. Thus, the liquid is heated until it reaches a pseudocritical temperature. At the pseudocritical temperature, the liquid divides into two phases, the two phases including a liquid and a vapor. As the vapor is produced, the dissolved solids transfer to the liquid phase. The vapor may then be removed and collected. And the liquid may be removed and collected separately from the vapor.

Another aspect of the present invention provides an apparatus to decontaminate a liquid including dissolved solids. The apparatus includes at least (1) a reactor having a first electrode and a second electrode, and (2) a liquid flow path between the first and second electrodes. In certain embodiments, one of the electrodes may include a wall of the reactor, and the other electrode may be at least partially disposed within the reactor. In use, an electrical current may be applied between the inner electrode and the reactor body in order to Joule-heat the liquid within the flow path. During use of the apparatus, the liquid may be heated until it reaches a pseudocritical temperature, and it then divides into two phases: vapor and liquid. As the vapor is produced, dissolved solids transfer to the remaining liquid in the liquid phase. The vapor can then be removed and collected. And the remaining liquid can be separately removed and collected. As with the method described above, in certain embodiments, the liquid being treated in the apparatus may be water having dissolved salts therein (i.e., a brine). In such embodiments, the reactor operates as a desalinator.

This apparatus allows for direct control of power applied to the brine using the electrical conductivity of the brine when applying an alternating current (AC), resulting in a lower TDS content vapor product (a vapor phase) and a concentrated TDS liquid product (a liquid phase). The electrode that allows for direct heat conduction within the reactor, takes advantage of the high prevalence of conducting salts within a produced water stream. This internal heating method potentially overcomes issues plaguing supercritical water treatment of produced water, including poor heat transfer caused by internal wall fouling and limited scalability due to thick reactor walls [D. D. Ogden and J. P. Trembly, "*Desalination of hypersaline brines via Joule-heating: Experimental investigations and comparison of results to existing models*," Desalination, vol. 424, pp. 149-158, December 2017, incorporated by reference herein in its entirety]. By modulating the conductivity of the contained fluid via phase separation, the applied power is directly proportional to the vapor-to-liquid ratio [D. D. Ogden and J. P. Trembly, "*Desalination of hypersaline brines via Joule-heating: Experimental investigations and comparison of results to existing models*," Desalination, vol. 424, pp. 149-158, December 2017].

More specifically, and referring now to the Figures, the supercritical water apparatus includes at least (1) a reactor 10 having a first electrode 12 and a second electrode 14, and (2) a liquid flow path 16 between said first and second electrodes 12, 14. In certain embodiments, one of the electrodes (e.g., the first electrode 12) may include a wall 12 of the reactor 10 (wherein that wall helps to define an interior space 18 of the reactor 10), and the other electrode (e.g., the second electrode 14) may be at least partially disposed within the interior space 18 of the reactor 10. In certain embodiments, the reactor 10 may be tubular in shape with the second electrode 14 running along a length of the tubular reactor.

The reactor 10 may be constructed using various materials. For example, one may use a material that is corrosion-resistant. One such material is a high nickel alloy. Further, the reactor (serving as the first electrode 12—i.e., outer electrode) may be insulated from the inner electrode 14 (i.e., second electrode 14) by an electrode sealing fitting 20.

An electric current (e.g., an alternating voltage) is applied between the inner electrode 14 and the wall 12 of the reactor 10. The process fluid between the inner electrode 14 and the wall 12 of the reactor 10 acts as a path for current to conduct, resulting in a complete electrical circuit. Although the process fluid conducts electricity, it has a resistance to electrical current flow, dissipating power into the process fluid, known as Joule heating. Adjustment of the voltage that is applied to the reactor allows for direct and immediate control over the energy input to the process.

Referring now to FIG. 1, a first illustrated embodiment of the reactor 10 is shown. In this embodiment, process fluid (near its supercritical temperature) enters a lower portion of the reactor 10 (the lower third of the reactor 10 in the illustrated embodiment) through an inlet 22. The fluid is heated using the Joule-heating method described herein until it reaches the pseudocritical temperature. At the pseudocritical temperature, the fluid divides into two phases, a concentrated liquid and a clean vapor. In other words, as the clean vapor is produced, the dissolved solids transfer to the liquid phase, thereby resulting in the concentrated liquid (i.e., liquid including an increased concentration of contaminants as compared to the original process fluid that entered the reactor 10 via the inlet 22). The clean vapor rises to the top of the reactor 10 and may be removed through the vapor outlet 24. The concentrated liquid drops to the bottom of the reactor 10 and may be removed via a liquid outlet 26. Thus, in such an embodiment, the reactor 10 may be positioned such that the vapor outlet 24 is positioned in an upper section 28 of the reactor 10, and that the liquid outlet 26 is positioned in a lower section 30 of the reactor 10. The electrical resistance of the reactor 10 may be used to estimate the liquid level and in turn control the division of flow between the vapor and liquid outlets 24, 26.

Figure 2:
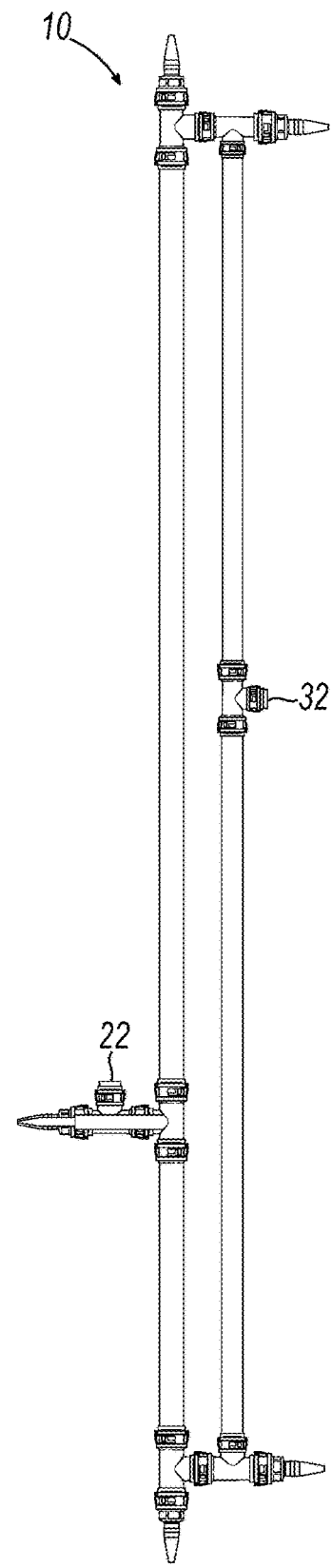
FIG. 2 is a cross-sectional view of an alternate embodiment of a reactor in accordance with various aspects and principles of the invention described herein.

In an alternate embodiment (shown in FIG. 2), the reactor 10 has the ability to be operated in a single outlet 32 configuration. This configuration can be used for a number of industrial processes that do not require the separation of liquid and vapor phase. In order to change the embodiment shown in FIG. 1 to a single outlet 32 mode, the liquid outlet tube is connected to the vapor outlet as shown in FIG. 2.

Figure 3:
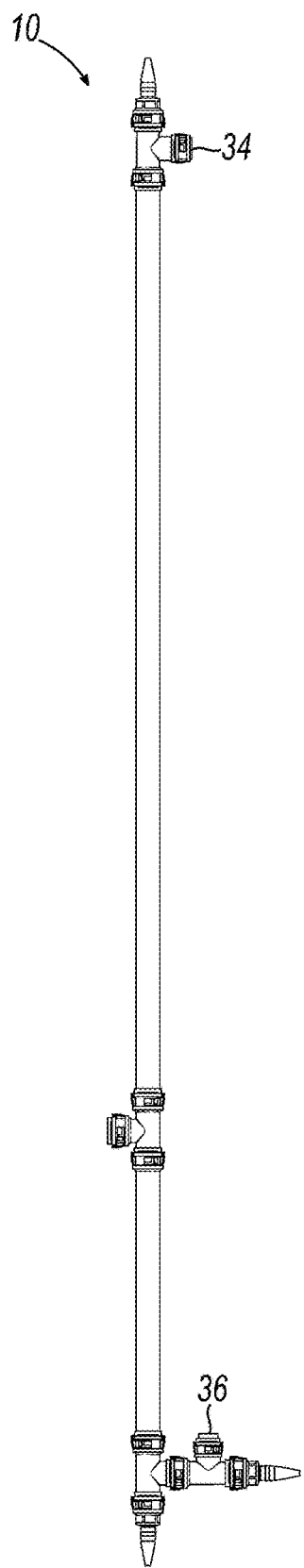
FIG. 3 is a cross-sectional view of yet another embodiment of a reactor in accordance with various aspects and principles of the invention described herein.

In yet another embodiment, the reactor 10 can be operated in a flow through configuration as well, as shown in FIG. 3. To operate in flow through mode, the inlet (of the embodiment of FIG. 1) is removed (or otherwise closed, such as by having a cap placed over it). Depending on the process, the vessel may be oriented vertically or horizontally, and the two outlets 34, 36 of the basic configuration can be used as inlets or outlets.

Figure 4A:
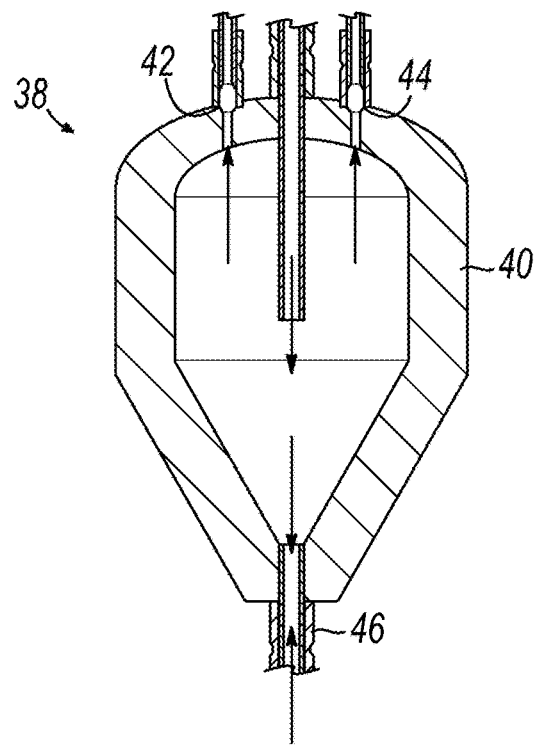
FIGS. 4A and 4B are schematics comparing a traditional externally heated reactor and a reactor in accordance with various aspects and principles of the invention described herein.
Figure 4B:
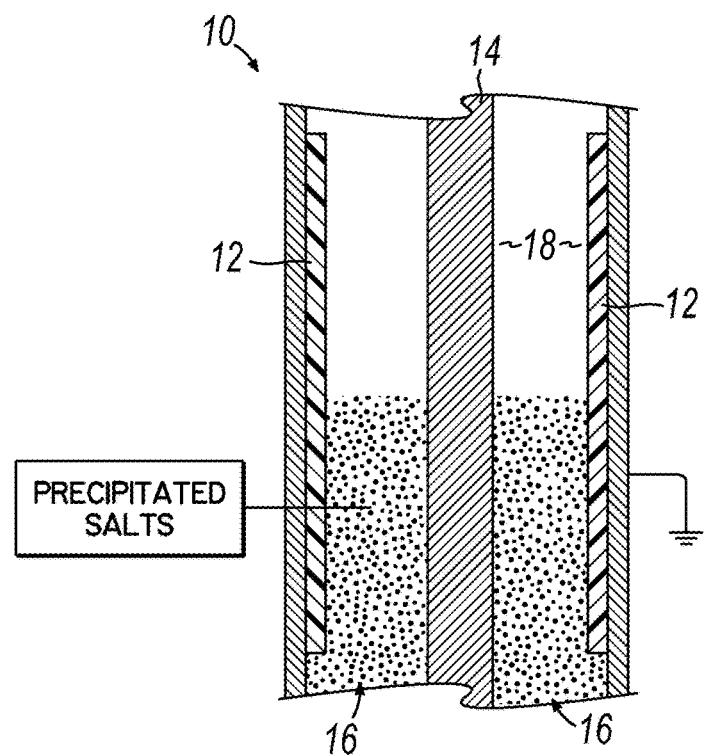

As described above, previously developed systems operated using an externally heated reactor 38 (see FIG. 4A). Such previous reactors 38 required thick vessel walls 40 as well as high temperature exterior surfaces to drive heat transfer through the wall 40. In addition to high temperatures, the thick vessel walls 40 resulted in a large thermal lag, due to the large thermal capacitance of the thick wall, greatly increasing time required to make adjustments to the process. A Joule heated reactor of the present invention (such as that shown in FIG. 4B), however, operates by directly heating the fluid, decreasing the temperature of the outer surfaces as well as the thickness requirements of the reactor vessel. Direct heating of the fluid in the reactor gives the additional benefit of rapid adjustability of the power applied to the process. This adjustability is useful in operating a dynamic system that operates near the supercritical point of water, where thermodynamic properties such as density and specific heat rapidly change with temperature.

The previous externally heated reactor vessels superheated the vapor product as a result of the high wall temperatures needed to heat the process fluid. This increase in temperature required additional energy to be applied to the reactor. The Joule heated reactor, however, is able to apply the majority of the applied power to the process fluid while minimizing the superheating of the clean vapor (and, thus, the energy input needed with the present apparatus and method is reduced). Due to the strong correlation between electrical conductivity and salt concentration in a brine solution, the liquid phase of the reactor (in certain embodiments) conducts 25 times more current than the vapor phase. Such a difference in conductivity results in less than 5% of the input power applied to the clean vapor. Applying 95% of the power to the liquid phase eliminates the majority of the wasted heat, greatly increasing the energy efficiency of the reactor designed in accordance with principles of the present invention.

Figure 5:
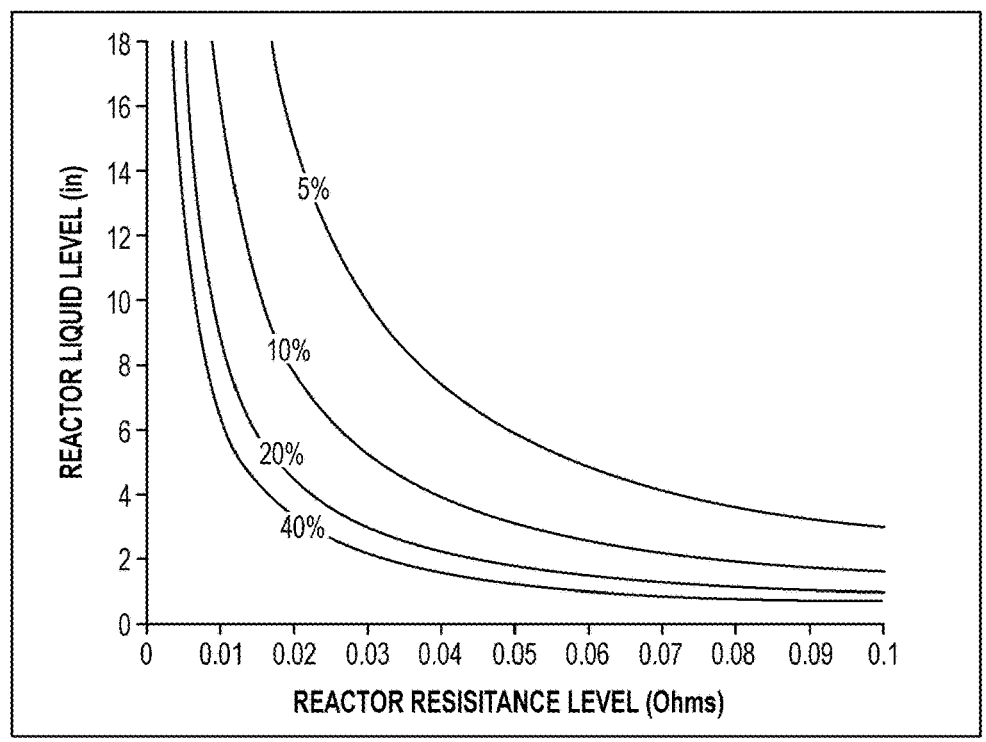
FIG. 5 is a graph depicting a model of reactor liquid level compared to resistance, plotted as lines of constant NaCl concentration.

Still alternate embodiments of the reactor 10 may provide a dual outlet design with level control. A previous reactor 38 operated with two outlets 42, 44 but lacked the ability to control the liquid vapor interface level in the reactor. A lower outlet 46 was used with a controlled cooling water flow and a matched effluent flow as shown in FIG. 4A. This would allow the concentrated effluent solution to be evacuated from the reactor but lacked the ability to control the flowrate and concentration of the effluent. The Joule based reactor 10, in embodiments of the present invention, uses electrical current to heat the process fluid, allowing measurement of the resistance of the reactor 10. As previously described, the liquid phase is more conductive than the vapor phase. This results in the resistance of the reactor 10 being dependent on the liquid level. Those skilled in the art will note that, as the salt concentration in the lower portion of the reactor 10 increases, the resistance is affected. Although the resistance changes with salt concentration, the liquid level in the reactor 10 has a higher effect on resistance, as shown in FIG. 5. Once the desired operating conditions are achieved in the reactor 10, the flowrate of the lower liquid outlet of the reactor 10 is controlled in a feedback loop to keep the resistance and liquid level of the reactor 10 constant.

Figure 6:
FIG. 6 is a cross-sectional view of the configuration of the electrode associated with the reactor in accordance with various aspects and principles of the invention described herein.

As described above, in order to power the reactor 10, an internal electrode (the second electrode 14) is installed into the reactor 10. The installation of this second electrode 14, in certain embodiments, is performed with (1) electrical insulation from the inner wall of the reactor 10, (2) a leak-proof seal, and (3) mechanical containment of the second electrode 14. Electrical insulation of the electrode may be achieved using a standard electrode sealing fitting 20 with an extended alumina insulator 48. To provide a leak-proof seal, the temperature of the electrode may be maintained under the melting point of the sealing material. Due to the relatively low resistance of the reactor 10, a large electrical current is conducted through the inner electrode 14, resulting in heat generation and a temperature increase in the electrode. In order to allow for extended operation, the inner electrode 14 may be constructed from a highly corrosion resistant nickel alloy (e.g., HC 276). Due to the low electrical conductivity of materials such as high nickel alloys, a large amount of heat is generated in and the reactor 10 power is limited by the temperature of the electrode. If a highly conductive copper electrode is used, the power to the reactor 10 can be greatly increased, but the longevity of the electrode is sacrificed. In one particular embodiment, the electrode that is used in the reactor 10 is a two-piece electrode 50, shown in FIG. 6, incorporating a copper electrode 52 through the sealing fitting that threads onto a nickel alloy interior electrode 54 where it contacts the fluid, This allows the maximum current to be applied to the reactor 10 while extending the life of the electrode.

Figure 7:
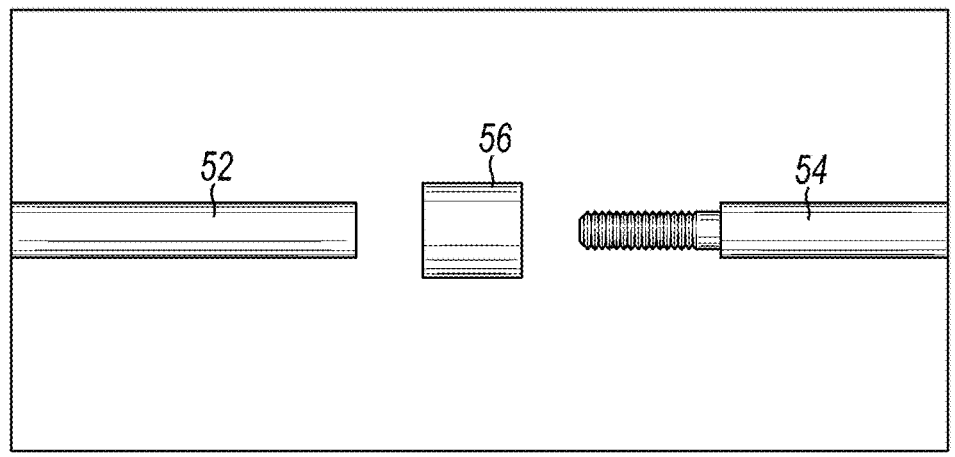
FIG. 7 is a perspective view of a multi-piece electrode coupling in accordance with various aspects and principles of the invention described herein.
Figure 8:
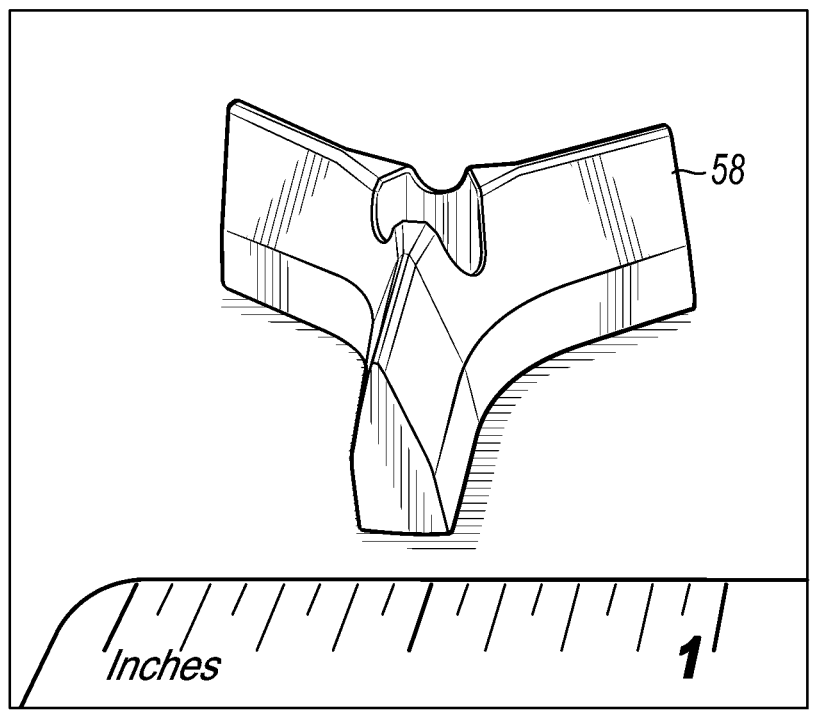
FIG. 8 is a perspective view of electrode centering braces in accordance with various aspects and principles of the invention described herein.
Figure 9:
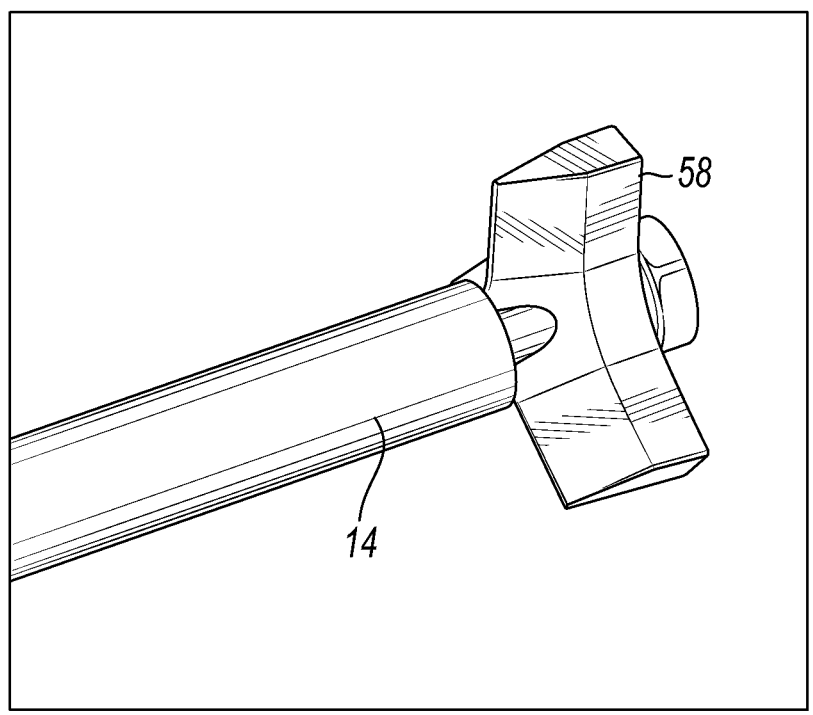
FIG. 9 is a perspective view of an electrode centering brace installed on an electrode in accordance with various aspects and principles of the invention described herein.

Mechanical containment may be used to prevent ejection of the electrode 50. In order to achieve the mechanical containment of the electrode, an alumina insulating washer 56 may be installed between the two electrodes 52, 54 (see FIG. 7). This transfers the force that is applied to the electrode into the extended insulator, preventing ejection of the electrode. In the illustrated embodiment, the electrode is supported at only one end, and so one may center the electrode throughout its length using one or more centering braces 58 in order to prevent shorting of the electrodes (see FIG. 8 and FIG. 9). This particular example of a multi-piece electrode design is capable of conducting 200 A through a ¼" electrode while sealing process fluid up to 425° C. and 280 Bar.

Figure 24:
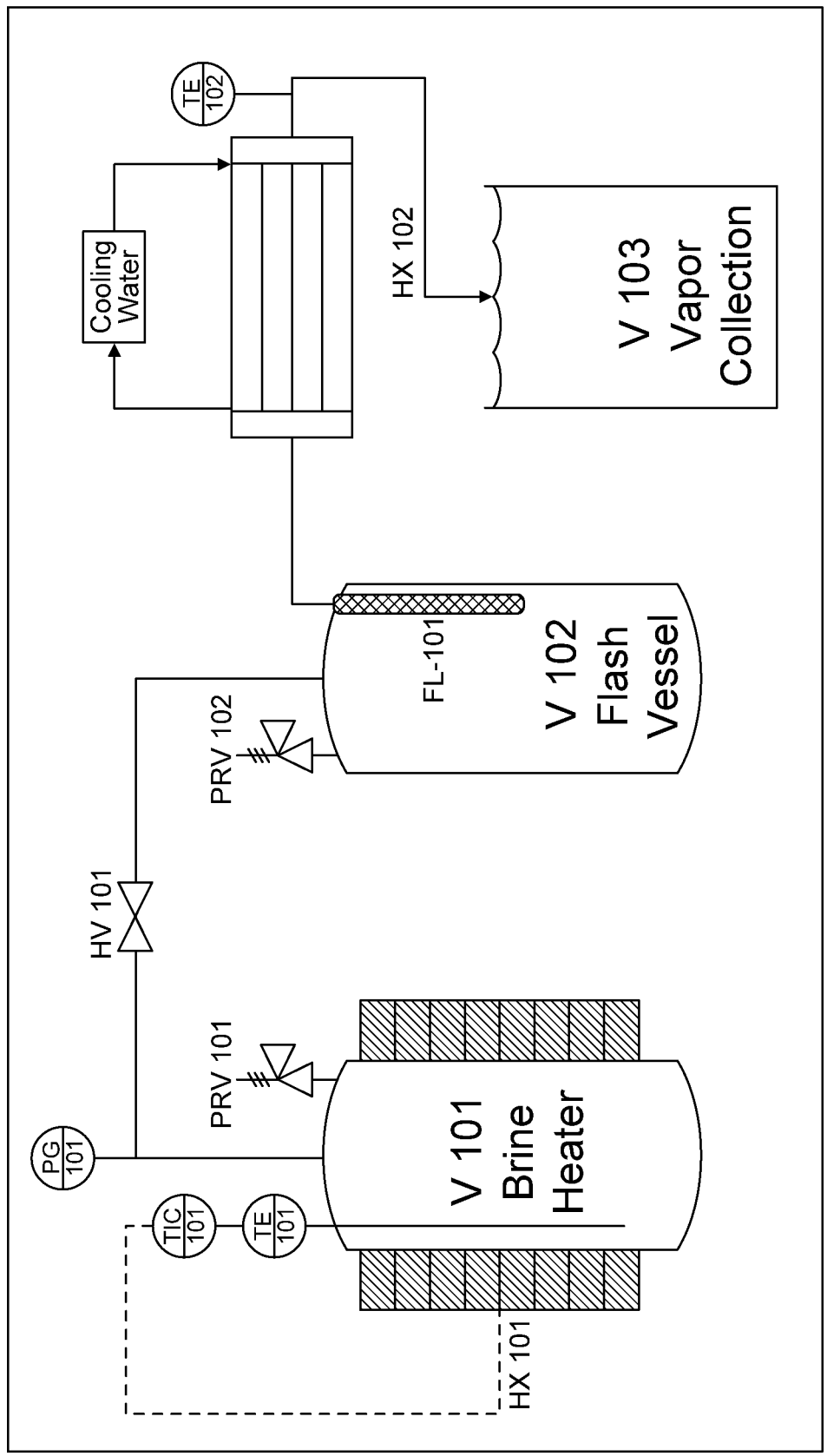
FIG. 24 is a piping and instrumentation diagram of an exemplary flash evaporation test system in accordance with various aspects and principles of the invention described herein.

Another aspect of the present application provides an apparatus for flash evaporation. This apparatus may include a heater vessel and a flash evaporation vessel (an example of one embodiment of such an apparatus can be seen in FIG. 24). A liquid containing dissolved solids (such as water containing dissolved salts) is delivered into the heater vessel. This liquid may, for example, be the liquid that is removed and collected from the reactor 10 described above (following Joule-heating and removal of vapor). Once a desired temperature and pressure are achieved, the liquid is released to the flash evaporation vessel, where at least partial vaporization of the liquid occurs. The vapor generated by flash evaporation may then be removed and condensed. Regarding this aspect of the present invention, and as will be further described below (primarily in Example 3, herein), a prototype Joule heating system was used to treat produced water collected from a horizontal well within the Utica-Point Pleasant (UPP) Shale located in Noble County, Ohio. In addition, flashing of hyper-concentrated brine generated by the Joule-heated system, along with theoretical flash energy balances were completed to provide better overall estimates of clean water recovery.

Figure 10:
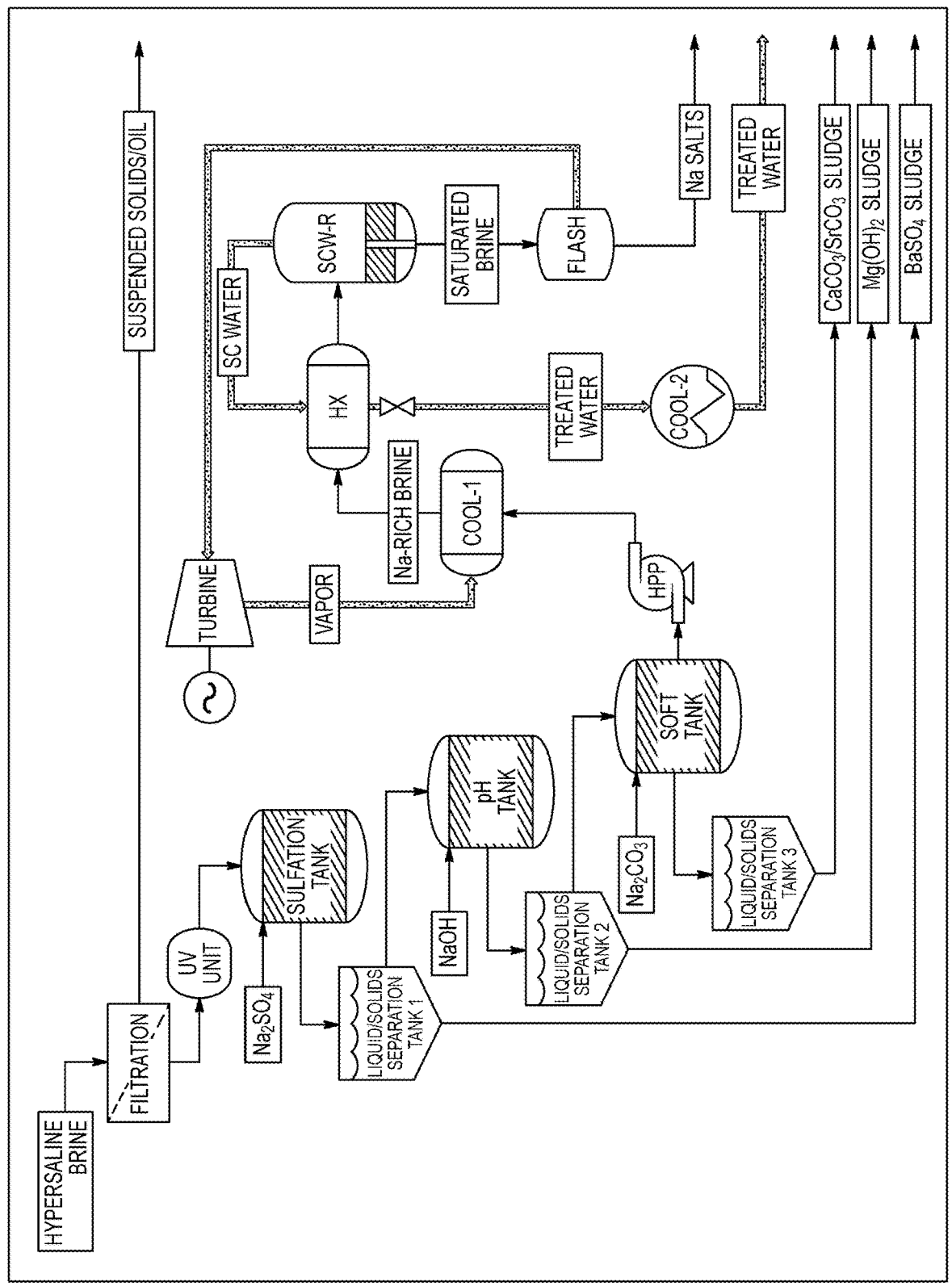
FIG. 10 is a flowchart of an exemplary water treatment system and process in accordance with various aspects and principles of the invention described herein.

Referring now to FIG. 10, a further aspect of the present invention provides a system for decontaminating a liquid. The system may include at least (1) a reactor having a first electrode, a second electrode, and a liquid flow path between said first and second electrodes, and (2) at least one flash evaporation apparatus in fluid communication with said reactor. The reactor may be the similar or the same to that described above. And the flash evaporation apparatus may the similar or the same to that described above. The system of this aspect of the present invention may further include precipitation and settling tanks for pretreatment of the liquid before it enters the reactor and subsequently the flash evaporation vessel.

To that end, and referring to FIG. 10, a reactor for supercritical water desalination is shown at SCW-R. This reactor may operate on the principles (and with the components) described above with respect to FIGS. 1-9—and/or may be one of the illustrated embodiments shown in the figures. The reactor (as shown in FIG. 10) may be used to treat (e.g., desalinate) a Na-rich brine. Prior to entering the reactor, the Na-rich brine is delivered through a pump (HPP) to a heat exchanger (HX), which pre-heats the Na-rich brine prior to its entry into the reactor. In the reactor, the liquid is subjected to the Joule-heating method described herein until it reaches the pseudocritical temperature. At the pseudocritical temperature, the fluid divides into two phases, a concentrated liquid and a clean vapor. As the clean vapor is produced, the dissolved solids transfer to the liquid phase. The clean vapor rises to the top of the reactor and is removed through the vapor outlet. The concentrated liquid drops to the bottom of the reactor and flows out the liquid outlet (as "Saturated Brine" in FIG. 10).

As shown in FIG. 10, that saturated brine then proceeds into a flash evaporation apparatus ("Flash"). In the flash evaporation apparatus, at least partial vaporization of the saturated brine occurs. The vapor generated by flash evaporation may then be removed and pulled via turbine to a first condenser (COOL-1), where it is condensed.

Further, the vapor phase generated following Joule-heating in the reactor (SCW-R) exits via the top of the reactor and proceeds to a second condenser (COOL-2). The vapor from the flash evaporation apparatus (which has been condensed in first condenser) merges with this condensed liquid stream and proceeds out of the system as treated water. Thus, the system uses (1) a reactor, and (2) at least one flash evaporation apparatus in fluid communication with said reactor to desalinate a Na-rich brine, resulting in treated water.

Prior to entry via heat exchanger (HX) into the reactor (SCW-R), contaminated water (which is to be treated) may be pretreated to remove further contaminants, solids, etc., thereby creating the Na-rich brine that then proceeds via pump into the heat exchanger and reactor. This pretreatment portion of the system may be seen at the left side of FIG. 10.

As can be seen, as hypersaline brine enters the system, it may include multiple dissolved solids. Further, such brines may also include suspended solids, and may also include oil (such as would be present in produced water from a fracturing process). The brine may first be passed through a filtration device, which would remove most to all of the suspended solids and oils. The remaining brine including dissolved solids would then proceed on through the system to at least one (and likely a series of) precipitation and separation tanks.

These precipitation and separation tanks are used to remove certain contaminants from the water to leave a Na-rich brine. Such contaminants include calcium, strontium, magnesium, and barium. As can be seen from FIG. 10, the first illustrated precipitation tank is a sulfation tank. As shown in FIG. 10, this tank may be used to remove barium contaminants from the initial filtered brine.

To that end, as shown in FIG. 10, $Na_2SO_4$ is introduced into the brine that is present in the sulfation tank. The introduction of this compound causes a chemical reaction that produces $BaSO_4$, which is insoluble in water, and thus precipitates out of solution. For instance, barium may be present in the brine in the form of barium chloride ($BaCl_2$), which is soluble in water and thus is a dissolved solid contaminant in the brine. $BaCl_2$ reacts with $Na_2SO_4$ to produce the insoluble $BaSO_4$ (which precipitates out of solution) and NaCl:

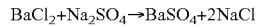

$$BaCl_2 + Na_2SO_4 \rightarrow BaSO_4 + 2NaCl$$

Once $Na_2SO_4$ is introduced into the brine for the reaction to occur, the liquid is transferred to a first separation tank. Here, the precipitated barium sulfate can be separated from the liquid by means known to those skilled in the art. For example, the separation tank may be a settling tank. Alternatively, centripetal force may be used to cause separation (such as in a hydrocyclone). Other alternative methods may be used. Once separated, the precipitated barium sulfate is then drawn off the bottom of the separation tank as a $BaSO_4$ sludge.

Following the reaction, the sodium chloride generated remains in solution. This increases the sodium content of the brine.

In FIG. 10, the brine the proceeds on to a pH tank, where NaOH is added in order to remove the contaminant magnesium. This process proceeds similarly to that described above to remove barium (i.e., NaOH is introduced into the brine in a second precipitation tank, which causes a chemical reaction that results in $Mg(OH)_2$ precipitating out of solution; $Mg(OH)_2$ is then separated from the remaining brine in a second separation tank and drawn off as a sludge, while sodium chloride generated from the reaction remains in solution—and further increases the sodium content of the brine).

Next, as shown in FIG. 10, the brine the proceeds on to a soft tank, where $Na_2CO_3$ is added in order to remove contaminants such as strontium and calcium. This processes proceeds similarly to that described above to remove barium and magnesium (i.e., $Na_2CO_3$ is introduced into the brine in a third precipitation tank, which causes a chemical reaction that results in $SrCO_3$ precipitating out of solution; $SrCO_3$ is then separated from the remaining brine in a separation tank and drawn off as a sludge, while the other reaction product ($NaNO_3$) generated from the reaction remains in solution—and further increases the sodium content of the brine). Calcium is similarly removed.

Once the pretreatment through the filtration device and series of precipitation and separation tanks is complete, the remaining brine is the Na-rich brine which is drawn via pump to the portion of the system including the reactor and flash evaporation apparatus to be treated to produce treated water as described above.

The following examples may provide further explanation of the described subject matter.

EXAMPLES

Example 1

Figure 11A:
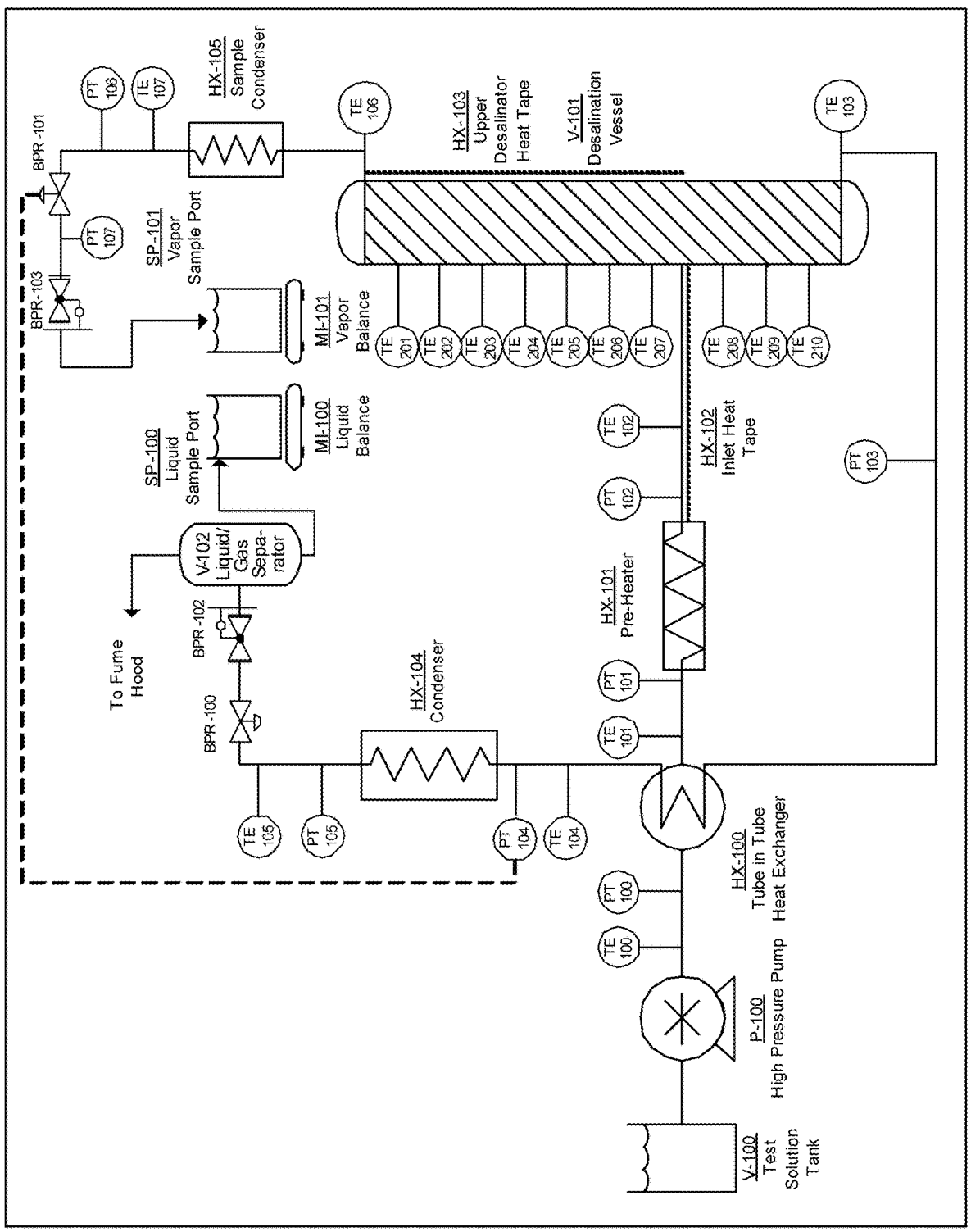
FIG. 11A is a process and instrumentation diagram for an exemplary desalination system in accordance with various aspects and principles of the invention described herein.
Figure 11B:
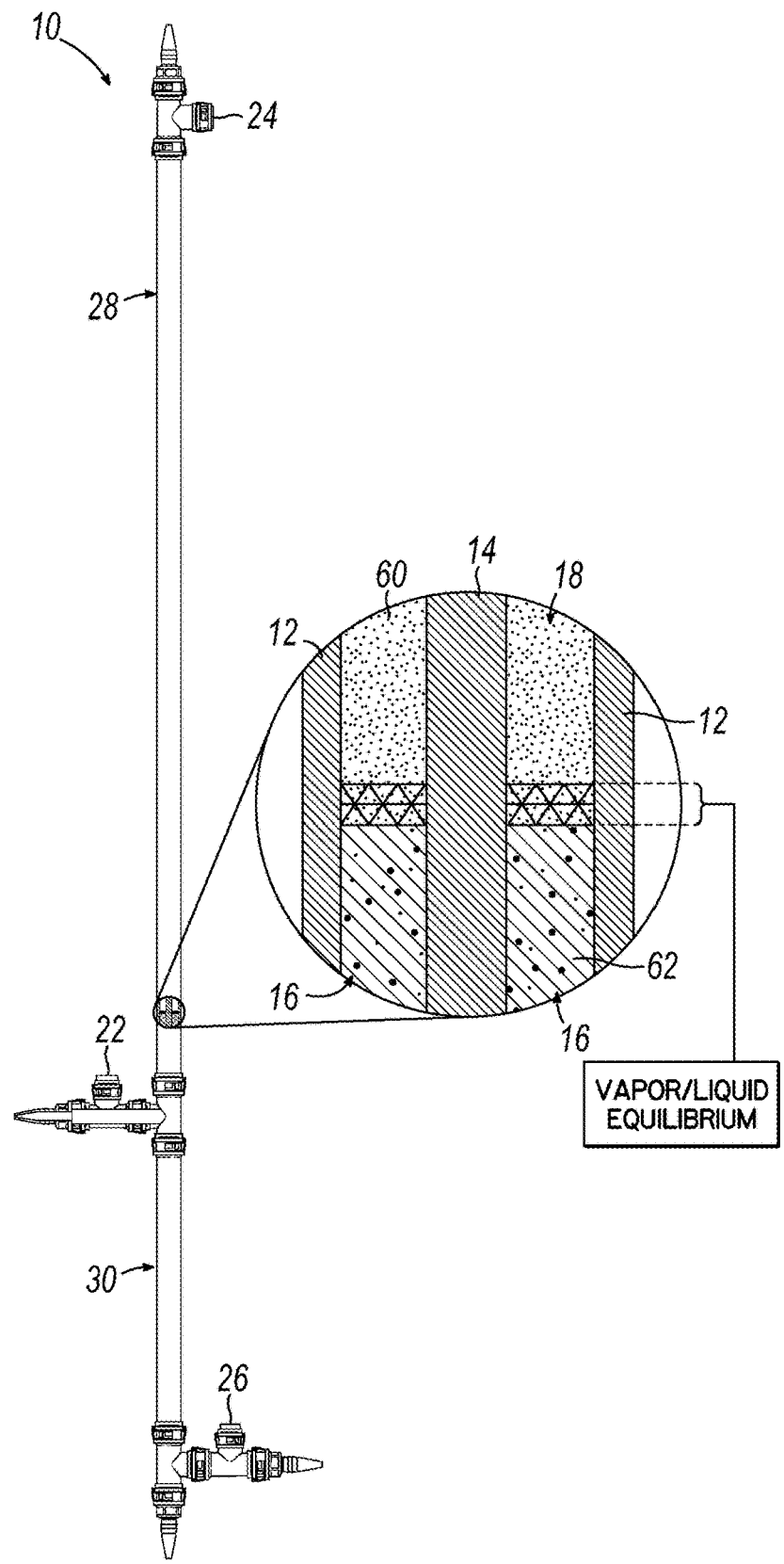
FIG. 11B is a cross-sectional view of an exemplary reactor in accordance with various aspects and principles of the invention described herein, with an enlarged view of a section of the reactor at the location of vapor-liquid equilibrium.

A prototype reactor, in accordance with the various aspects of the present invention, was constructed and tested under funding from National Energy Technology Lab (NETL) under grant number DE-FE0026315. A diagram of the reactor constructed in this Example is shown in FIGS. 11A and 11B. FIG. 11A is a diagram depicting the supporting equipment as well as the joule-heated reactor, V-101. FIG. 11B shows the reactor itself (along with an enlarged view of a cross-section of the reactor).

Contaminated water (test brines) were run through the system and reactor, under various conditions, to demonstrate that the reactor can reduce TDS concentrations.

The system, as can be seen in FIG. 11A, uses a HPLC pump, P-100, to produce a flowrate of up to 300 ml per minute at pressures up to 5000 psi. Pressure is produced by two back pressure regulator valves, BRP-100 and BRP-101, that are controlled through a National Instruments cRIO embedded data acquisition and control system (DAC). The process fluid is heated by a heat exchanger, HX-100 followed by a preheater HX-101 to achieve the desired reactor inlet temperature. Temperature and pressure are measured at all critical locations using the DAC.

Test results from the operation of this reactor are summarized in Table 2, and show a decrease in concentration from an inlet of 150,000 ppm TDS to a vapor outlet as low as 600 ppm depending on operating conditions.

TABLE 2

Test results from prototype reactor and system

|  |  |  |  |  |  |
|---|---|---|---|---|---|
| Temperature | Pressure | Bar | 230.00 ± 0.31 | 249.99 ± 0.89 | 280.00 ± 0.17 |
|  | Pseudocritical | °C. | 377.5 | 384.9 | 395 4 |
|  | Inlet |  | 346.0 ± 0.94 | 35L.5 ± 0.74 | 360 4 t 0.67 |
|  | Vapor Outlet |  | 378.7 ± 0.87 | 390.3 ± 0-74 | 402.7 ± 0.63 |
|  | Liquid Outlet |  | 381.9 t 1 ' 6 | 392 0 t 0.74 | 404.2 ± 0.76 |
|  | Vapor-Liquid Equilibrium |  | 380 1 ± 1.43 | 387 8 ± 1.19 | 398.4 ± 1.55 |
| Mass Flowrate | Inlet | g/min | 103.9 i 1 11 | 1054 ± 0.78 | 1111 ± 0.48 |
| Concentration | Inlet | mg/L | 146501.7 t 11129.2 | 154033.3 ± 2128.25 | 157645.9 ± 1334.82 |
|  | Vapor Outlet |  | 589_4 ± 40.9 | 1095.4 ± 75.2 | 2170.7 ± 815.0 |

Example 2

Thermodynamic data of multicomponent brines is needed to properly treat brines from oil/gas and $CO_2$ sequestration operations. However, the thermodynamic properties of multicomponent hypersaline brine (>3.5 wt %) are unknown and limited to estimations based on single component brine data. Experimental data for multicomponent brines at elevated temperatures and pressures do not exist due to operating conditions above the pseudocritical point of pure water.

Early research into the properties of brines was driven by the need for thermodynamic data above standard temperature and pressure for use in geological modeling including groundwater [N. B. Keevil, "*Vapor pressures of aqueous solutions at high temperatures*," Journal of the American Chemical Society, vol. 64, no. 4, pp. 841-850, 1942; Christopher Palliser, "*A model for deep geothermal brines: state space description and thermodymanic properties*," Massey University, 1998] and sea floor hydrology [T. Driesner and C. A. Heinrich, "*The system $H_2O$—NaCl. Part I: Correlation formulae for phase relations in temperature-pressure-composition space from 0 to 1000° C., 0 to 5000 bar, and 0 to 1 XNaCl*," Geochimica et Cosmochimica Acta, vol. 71, pp. 4880-4901, January 2007; T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007]. The properties of high concentration brines under elevated pressure have been studied as early as 1931 [L. H. Adams, "*Equilibrium in binary systems under pressure. I. An experimental and thermodynamic investigation of the system, NaCl—$H_2O$, at 25*," Journal of the American Chemical Society, vol. 53, no. 10, pp. 3769-3813, 1931], while elevated temperature and pressure test began as early as 1942 [N. B. Keevil, "*Vapor pressures of aqueous solutions at high temperatures*," Journal of the American Chemical Society, vol. 64, no. 4, pp. 841-850, 1942]. To date, numerous experimental studies have been completed for a variety of brines ranging in temperatures and pressures up to 646.2° C. and 4,137 bar [L. H. Adams, "*Equilibrium in binary systems under pressure. I. An experimental and thermodynamic investigation of the system, NaCl—$H_2O$, at 25*," Journal of the American Chemical Society, vol. 53, no. 10, pp. 3769-3813, 1931; N. B. Keevil, "*Vapor pressures of aqueous solutions at high temperatures*," Journal of the American Chemical Society, vol. 64, no. 4, pp. 841-850, 1942; C. W. Blount and F. W. Dickson, "*The solubility of anhydrite ($CaSO_4$) in NaCl—$H_2O$ from 100 to 450° C. and 1 to 1000 bars*," Geochimica et Cosmochimica Acta, vol. 33, pp. 227-245, 01 1969; J. K. Hovey, K. S. Pitzer, J. C. Tanger, J. L. Bischoff, and R. J. Rosenbauer, "*Vapor-liquid phase equilibria of potassium chloride-water mixtures: equation-of-state representation for potassium chloride-water and sodium chloride-water*," Journal of Physical Chemistry, vol. 94, no. 3, pp. 1175-1179, 1990; F. Armellini, "*Phase equilibria and precipitation phenomena of sodium chloride and sodium sulfate in sub- and supercritical water*," Massachusetts Institute of Technology, 1993; L. Hněkovský, V. Hynek, V. Majer, and R. H. Wood, "*A new version of differential flow heat capacity calorimeter; tests of heat loss corrections and heat capacities of aqueous NaCl from T=300 K to T=623 K*," The Journal of Chemical Thermodynamics, vol. 34, no. 6, pp. 755-782, June 2002; and S. O. Odu, A. G. J. van der Ham, S. Metz, and S. R. A. Kersten, "*Design of a process for supercritical water desalination with zero liquid discharge*," Industrial and Engineering Chemistry Research, vol. 54, pp. 5527-5535, 27 2015]. Several reviews of these and other experimental results have been conducted to develop models for the thermodynamic properties of brines at elevated temperature and pressure [Christopher Palliser, "*A model for deep geothermal brines: state space description and thermodymanic properties*," Massey University, 1998; T. Driesner and C. A. Heinrich, "*The system $H_2O$—NaCl. Part I: Correlation formulae for phase relations in temperature-pressure-composition space from 0 to 1000° C., 0 to 5000 bar, and 0 to 1 XNaCl*," Geochimica et Cosmochimica Acta, vol. 71, pp. 4880-4901, January 2007; T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007; F. Armellini, "*Phase equilibria and precipitation phenomena of sodium chloride and sodium sulfate in sub- and supercritical water*," Massachusetts Institute of Technology, 1993; J. L. Bischoff and K. S. Pitzer, "*Liquid-vapor relations for the system NaCl—$H_2O$: summary of the P-T-x surface from 300 degrees to 500 degrees Celsius*," American Journal of Science, vol. 289, pp. 217-248, 1989; D. Archer, "*Thermodynamic properties of NaCl+$H_2O$ system II. Thermodynamic properties of NaCl(aq), NaCl—$2H_2O$(cr), and phase equilibria*," Journal of Physical and Chemical reference Data, vol. 21, no. 4, pp. 793-829, 1992; D. Archer, "*Thermodynamic properties of NaCl+$H_2O$ system I. Thermodynamic properties of NaCl(cr)*," Journal of Physical and Chemical reference Data, vol. 21, no. 1, p. 121, 1992; and C. Palliser and R. McKibbin, "*A model for deep geothermal brine, II: thermodynamic properties—density*," Transport in Porous Media, vol. 33, pp. 129-154, 1998]. The results from these studies show that brine dissolved solids content has a distinguishable effect on brine density, enthalpy and specific heat.

Minimal experimental data exists regarding Joule-heating of, or the $\Delta h_{vap}$ for, multicomponent hypersaline brines.

Related to the above-described aspects of the present invention, the present application describes (in this Example) the ability to utilize direct electrical heating of hypersaline brines and information regarding thermodynamic properties associated with hypersaline brines with multicomponent dissolved solids (salt) compositions. Vapor-liquid equilibrium temperature ($T_{VLE}$) and enthalpy of vaporization were determined for two representative brine compositions at three pressures. And, a comparison of those experimental results with a previously reported Aspen Plus® model [D. E. López and J. P. Trembly, "*Desalination of hypersaline brines with joule-heating and chemical pre-treatment: Conceptual design and economics*," Desalination, vol. 415, pp. 49-57, August 2017] is also provided. The results described herein allow for better process energy requirements for supercritical water treatment that can be used to reduce or eliminate many of the drawbacks described above with current treatment methods.

And so, the study of this Example was performed to demonstrate that a Joule-heated reactor (in accordance with the principles of the present invention) is capable of treating multicomponent hypersaline brines with TDS content ranging from 50 to 180 g·L$^{-1}$. It combines experimental results for multicomponent brines using a Joule-heated reactor at pressures of 230 to 280 bar and temperatures of 387 to 406° C. with thermodynamic models previously created for single component NaCl brines to identify the deviations resulting from the additional species. In addition, a comparison between an Aspen Plus® v9 simulation using the ELECTNRTL model with experimental results is provided. As will be described in greater detail below, the study performed showed stable operation and demonstrated the ability to treat hypersaline brines that are problematic for other water treatment/management techniques. And the Joule-heating treatment of hypersaline brine allows for direct heating of brines without the need of external heating, potentially simplifying operation and reducing process footprint.

Experimental Methodologies

Materials

All source materials were purchased from Fisher Scientific (and are commercially available therefrom), with the exception of colloidal silica and ammonium hydroxide, which were purchased from Sigma-Aldrich (and are commercially available therefrom), and barium chloride, purchased from Reagents (and are commercially available therefrom). The concentration and source materials for all constituents in the test brines are presented in Table 3. Test brine concentrations were selected based on a review of water produced by oil/gas and $CO_2$ injection wells [K. Guerra, K. Dahm, and S. Dundorf, "*Oil and gas producted water management and beneficial use in the western United States*," U.S. Department of Interior Bureau of Reclamation, 157, September 2011; H. L. Barnes and S. B. Romberger, "*Chemical aspects of acid mine drainage*," Water Polution Control Federation, vol. 40, no. 3, pp. 371-384, March 1968; L. O. Haluszczak, A. W. Rose, and L. R. Kump, "*Geochemical evaluation of flowback brine from Marcellus gas wells in Pennsylvania, U.S.A.*," Applied Geochemistry, vol. 28, pp. 55-61, January 2013; L. S. Land and D. R. Prezbindowski, "*The origin and evolution of saline formation water, lower cretaceous carbonates, south-central Texas, U.S.A.*," Journal of Hydrology, vol. 54, no. 1-3, pp. 51-74, 1981; and P. F. Ziemkiewicz and Y. Thomas He, "*Evolution of water chemistry during Marcellus Shale gas development: A case study in West Virginia*," Chemosphere, vol. 134, pp. 224-231, September 2015]. All concentrations are presented in mg·L$^{-1}$ or g·L$^{-1}$ measured at normal temperature and pressure (293.15 K and 101.3 kPa).

A multicomponent aqueous test brine was prepared at a concentration of 180 g·L$^{-1}$ in a 25 gallon tank circulating for a minimum of 12 hours using a 3250 GPH Hydor Koralia Magnum pump. After mixing was complete, precipitates were filtered using a 0.35 micrometer pleated cartridge filter. The 50 g·L$^{-1}$ brine was prepared by diluting the premixed 180 g·L$^{-1}$ brine by a factor of 3.6 using DI water. Densities of the 50 and 180 g·L$^{-1}$ test brines were calculated using NaCl data from Engineering Equation Solver (2017) and found to be 1,032 and 1,115 kg·m$^{-3}$ with salt content of 4.9 wt. % and 16.1 wt. %, respectively.

TABLE 3

Brine composition used in testing. Sodium added as sodium carbonate and sodium sulfate, followed by sodium chloride to complete the sodium balance. Chloride added as calcium chloride, barium chloride and strontium chloride, follow by sodium chloride to complete the chloride balance.

| | Brines | | |
|---|---|---|---|
| Ions | 50 g·L$^{-1}$ | 180 g·L$^{-1}$ | Ion Source(s) |
| Na$^+$ (mg·L$^{-1}$) | 14,956 | 53,429 | NaCl (>99.0%), NaHCO$_3$ (>99.7%), Na$_2$SO$_4$ (>99.0%) |
| Ca$^{2+}$ (mg·L$^{-1}$) | 4,261 | 15,222 | CaCl$_2$ (>95%) |
| Ba$^{2+}$ (mg·L$^{-1}$) | 27 | 97 | BaCl$_2$ (>95%) |
| Sr$^{2+}$ (mg·L$^{-1}$) | 109 | 389 | SrCl$_2$ (>99%) |
| K$^+$ | 54 | 194 | KCl (>99.0%) |
| Cl$^-$ (mg·L$^{-1}$) | 30,671 | 109,572 | NaCl (>99.0%), CaCl$_2$ (>95%), BaCl$_2$ (>95%), SrCl$_2$, KCl (>99.0%) |
| HCO$_3^-$ (mg·L$^{-1}$) | 82 | 292 | NaHCO$_3$ (>99.7%) |
| SO$_4^{2-}$ (mg·L$^{-1}$) | 109 | 389 | Na$_2$SO$_4$ (>99.0%) |
| NH$_4^+$ (mg·L$^{-1}$) | 109 | 389 | Ammonium Hydroxide (28 wt. %) |
| SiO$_2$ (mg·L$^{-1}$) | 10 | 34 | Colloidal Silica (40 wt. %) |
| TDS (mg·L$^{-1}$) | 50,387 | 180,008 | |
| Density (kg·m$^{-3}$) | 1,032 | 1,115 | |

Reactor System (for Desalination of Brines)

A supercritical water test system using Joule-heating for treatment of brines was developed with the aim of investigating the proposed water management process, and is the test system described above in Example 1 (with the process and instrumentation diagram of the prototype test system and a cross section view of the reactor shown in FIGS. 11A and 11B). The system utilizes a high pressure liquid chromatography pump (P-100) to supply a flow rate up to 300 ml per minute. The brine was pumped through a high pressure tube in tube heat exchanger (HX-100) to recover heat from the processed fluid, followed by a preheater (HX-101) to control the reactor inlet temperature. The reactor has a radial electrode configuration with an inner electrode diameter of 0.25 inches, and is constructed from Hastelloy C-276. The 1 inch Hastelloy C-276 tubular body of the reactor is used as the outer electrode with an inner diameter of 0.76 inches, resulting in a 0.255 inch gap between the electrodes. The inner electrode has 24 inches of exposed surface along the length of the reactor; however, the inner electrode was not entirely immersed in the highly concentrated brine during steady state operation. The potential for electrochemical reactions in the reactor was analyzed through experimental recording of the current as the electrode voltage was slowly ramped, and the effective power from electrochemical reactions was estimated and used in the final results calculations.

The reactor was operated at three pressures (230, 250, and 280 bar) and two inlet TDS concentrations (50 and 180 g·L$^{-1}$). Triplicate trials were conducted at each condition with a minimum of 90 minutes of steady state operation per trial. The reactor produced a low TDS vapor stream 60 exiting at the top of the reactor and a concentrated liquid stream 62 (brine) extracted from the bottom of the reactor. After extraction from the reactor, the high concentration brine was cooled in the heat exchanger (HX-100) before passing through a secondary condenser (HX-104) to cool the brine to room temperature. The vapor flow was condensed (HX-105) before its pressure was reduced and the effluent was sampled. Liquid and vapor effluent samples (50 ml) were collected at five-minute intervals.

Data Acquisition and Controls

The system was controlled by a National Instruments CRio controller running embedded LabView software. Temperature was measured and recorded at multiple points in the process using Type K thermocouples which directly contact the process fluid. Temperature measurements for thermodynamic analysis are located at the inlet to the reactor (TE 102), as well as the vapor outlet (TE 104) and the liquid outlet (TE 130). Ten additional Type K thermocouples were installed on the outer wall of the reactor to develop a temperature profile. System pressure was monitored at the inlet and outlet of the reactor as well as six other high pressure locations in the process; see FIG. 11A for the pressure and temperature measurement locations used in the system of this Example. Data were logged at an interval of five seconds for the duration of the experimental trials.

Reactor voltage was controlled using a variable transformer with a step down voltage transformer, both rated at 10 kVA. The transformer combination allows for operation up to 833 Amps at 12 VAC or 416 Amps at 24 Vac. All trials were conducted at a frequency of 60 Hz, allowing for direct usage of utility power without need for frequency modification. The voltage and amperage waveforms were measured in real time, allowing for calculation of the true power, phase angle, and reactor resistance.

To achieve steady state operation, the pressure as well as the flowrate of both the vapor and liquid effluents from the system were controlled. The vapor effluent was used to control the system pressure on a feedback control loop using a pressure transducer mounted downstream of the reactor (PT-103). Liquid level in the reactor was determined measuring the resistance of the reactor. Once a steady state concentration was achieved in the reactor, the resistance could be used to control the reactor level via a process control valve (BPR-101). This setup allowed for a dynamic control of the reactor liquid level. If power is increased, the vapor fraction in the reactor is increased, dropping the reactor liquid level and in turn lowering the liquid effluent flowrate. The liquid and condensed vapor product flowrates were measured using Mettler Toledo ICS435 and Mettler Toledo PG6002-S balances, respectively. The mass of each effluent stream was recorded using the CRio controller.

Sample Analysis

Samples were analyzed using a Thermo Scientific iCAP 6000 Inductively Coupled Plasma Mass Spectrometer (ICP). A tailored ICP standard solution was used for element calibration to allow for single dilutions to be completed for each sample. Dilution factors ranged from 1 to 400 depending on the expected concentration of the sample, targeting the mid-range of the calibration.

Water Recovery

TDS content of the vapor effluent was determined by ICP for the major cation constituents: sodium, calcium, strontium, and potassium. Water recovery rates were tested in the range of 50 to 80% for 5 wt. % and 20 to 40% for 16 wt. % inlet brines, respectively. The water recovery percentage was limited to avoid supersaturation within the reactor, preventing salt precipitation within the vessel. All trials were completed at a constant inlet flowrate of 100 ml/min. Water recovery percentage was calculated using Equation 1

$$\text{Water Recovery } (\%) = \frac{\dot{m}_v}{\dot{m}_i} \times 100 \qquad (1)$$

where $m_i$ (g·min$^{-1}$) is the inlet the mass flowrate and my (g·min$^{-1}$) is the vapor stream mass flowrate.

Process Simulation

Previously reported steady-state Aspen Plus® v9 process simulations were modified to compare with experimental results generated in this study [X. Dong, J. Trembly, and D. Bayless, "*Techno-economic analysis of hydraulic fracking flowback and produced water treatment in supercritical water reactor*," Energy, vol. 133, pp. 777-783, August 2017; and D. E. López and J. P. Trembly, "*Desalination of hypersaline brines with joule-heating and chemical pre-treatment: Conceptual design and economics*," Desalination, vol. 415, pp. 49-57, August 2017]. Brine was fed through a heat exchanger (HX) used to set the fluid inlet temperature, per experimental trial data (TE-102). The reactor was simulated with a flash separation—FLASH 2 model—separating the brine into vapor and saturated brine streams based upon an evaluated duty range. Thermodynamic properties were calculated using the electrolyte non-random two-liquid (ELECNRTL) method (known to those skilled in the art). Details of the model were previously reported [X. Dong, J. Trembly, and D. Bayless, "*Techno-economic analysis of hydraulic fracking flowback and produced water treatment in supercritical water reactor*," Energy, vol. 133, pp. 777-783, August 2017; and D. E. López and J. P. Trembly, "*Desalination of hypersaline brines with joule-heating and chemical pre-treatment: Conceptual design and economics*," Desalination, vol. 415, pp. 49-57, August 2017, incorporated by reference herein in their entireties].

Thermodynamic Background

Specific Heat Capacity

As pure water nears its critical point (373.95° C. and 220.6 bar) its thermodynamic properties undergo significant changes, including density, hydrogen bond strength, and heat capacity [S. O. Odu, A. G. J. van der Ham, S. Metz, and S. R. A. Kersten, "*Design of a process for supercritical water desalination with zero liquid discharge*," Industrial and Engineering Chemistry Research, vol. 54, pp. 5527-5535, 27 2015; I. Leusbrock, "*Removal of inorganic compounds via supercritical water*," University of Groningen, 2011; and I. Pioro and S. Mokry, "*Thermophysical properties at critical and supercritical conditions*," Heat Transfer Theoretical Analysis, Experimental Investigations and Industrial Systems. InTech, Rijeka, 2011]. The critical point is defined by rapid changes in specific heat, reaching a peak value at the critical temperature and pressure. Above the critical pressure, water is defined in two distinct phases, compressed fluid with liquid like properties and supercritical fluid with a gas like behavior, divided by the pseudocritical line. Pseudocritical points, which make up the pseudocritical line, are the temperature and pressure combinations at which the specific heat peaks above the critical point [I. Pioro and S. Mokry, "*Thermophysical properties at critical and supercritical conditions*," Heat Transfer Theoretical Analysis, Experimental Investigations and Industrial Systems. InTech, Rijeka, 2011]. As water passes from the low temperature compressed fluid phase to the high temperature supercritical phase, it undergoes a large decrease in dielectric constant, transitioning the water from a polar to a non-polar state, significantly decreasing the solubility of inorganic salts [I. Leusbrock, "*Removal of inorganic compounds via supercritical water*," University of Groningen, 2011].

Driesner [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] reviewed a number of studies that had investigated the thermodynamic properties including density, heat capacity, and enthalpy of NaCl brines at elevated temperatures and pressures. Driesner states that although many equations of state that had been previously formed were reliable for specific areas of the pressure, temperature and concentration region in question, there were none that covered the entire range that has been investigated. Driesner proposed a model for the entire range by developing a temperature correction coefficient that could then be evaluated using existing thermodynamic data for pure water.

The correlations presented by Driesner [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] have been selected for use in the thermodynamic analysis of the experimental results produced from the Joule-heated reactor. The selected model employs pure water enthalpy with a corrected temperature function to calculate the enthalpy of the NaCl brine at a given temperature, pressure and concentration (Equation 2). The value of the corrected temperature T* is calculated based on a linear fit to experimental data obtained by Driesner [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007]. Taking the derivative of the enthalpy corrected temperature function with respect to temperature yields the corrected specific heat function (Equation 3).

$$h_{solution}(T, P, X_{NaCl}) = h_{H_2O}(T^*_h, P) \quad (2)$$

$$C_{P_{solution}}(T, P, X_{NaCl}) = q_2 C_{P_{H_2O}}(T^*_h, P) \quad (3)$$

A MATLAB program using the Driesner model [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] was developed to evaluate the corrected properties of the large data sets. After calculating the value of the corrected temperature for the desired property the program interpolates the value from a pure water thermodynamic database with a resolution of 1° C. and 1 bar [Engineering Equation Solver. 2017]. Increasing NaCl content lowers the brine specific heat capacity by roughly 1% per 1 wt. % brine. Decrease of heat capacity is accompanied by an increase in brine temperature at which the maximum specific heat occurs and can be directly related to an increase in the solution pseudocritical temperature when pressure is held constant. It may also be noted that as the NaCl content increases, the enthalpy at a constant temperature and pressure decreases.

The addition of dissolved solids to water introduces an additional degree of freedom, changing thermodynamic properties and phase change behavior in comparison to pure water. At a constant temperature and pressure, properties such as enthalpy, density and specific heat vary based on the salinity of the brine. In systems with pressures above the critical point of pure water, and at constant temperatures, high salinity gradients can induce the presence of both vapor phase and a compressed liquid phase due to the shift in pseudocritical temperature based on concentration. As heat is added to the system, a low concentration vapor phase is produced. The remaining dissolved solids concentrate in the compressed liquid phase, further increasing the pseudocritical temperature. The amount of heat that is required to produce a low concentration vapor phase, $\Delta h_{vap}$, is a result the concentration change. This is similar to the two phase region of subcritical water where quality changes at a constant temperature except instead of a change in quality, the concentration is changing.

For thermodynamic analysis, the system was assumed to be a pure NaCl brine. Experimental evaluation comparing the effects of various salt species shows there is no significant difference in specific heat when comparing KCl to NaCl [J. K. Hovey, K. S. Pitzer, J. C. Tanger, J. L. Bischoff, and R. J. Rosenbauer, "*Vapor-liquid phase equilibria of potassium chloride-water mixtures: equation-of-state representation for potassium chloride-water and sodium chloride-water*," Journal of Physical Chemistry, vol. 94, no. 3, pp. 1175-1179, 1990]. A comparison of specific heat capacity at normal temperature and pressure between the Driesner model and the experimental $CaCl_2$ results from Toner and Catling [J. D. Toner and D. C. Catling, "*A Low-Temperature Thermodynamic Model for the Na—K—Ca—Mg—Cl System Incorporating New Experimental Heat Capacities in KCl, $MgCl_2$, and $CaCl_2$ Solutions*," Journal of Chemical & Engineering Data, vol. 62, no. 3, pp. 995-1010, March 2017] show less than a 2.5% deviation in the concentration range of the test matrix. The other salts were assumed to follow the same trends as NaCl, although at the low concentrations that are present should have minimal effects on the thermodynamics. In addition, two experimental trials were conducted using brines containing 50 and 180 g·L$^{-1}$ NaCl to allow for comparison with multicomponent brine results.

Enthalpy of Vaporization

Figure 12C:
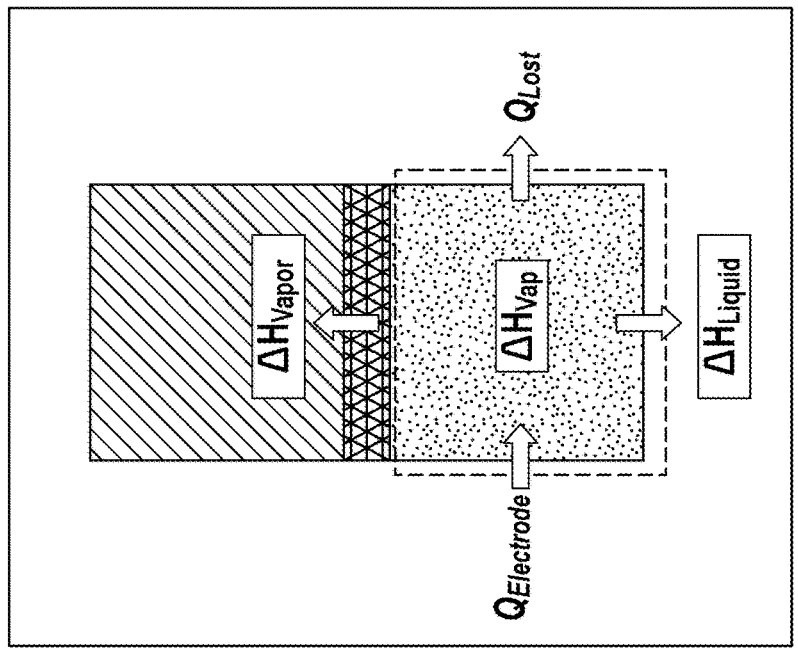
FIGS. 12A, 12B, and 12C show control volume analysis of an upper reactor control volume used to estimate $T_{VLE}$ (FIG. 12A), a lower reactor control volume used to calculate the enthalpy change associated with liquid and vapor product streams (FIG. 12B), and combined control volume used to determine the enthalpy of vaporization (FIG. 12C).
Figure 12B:
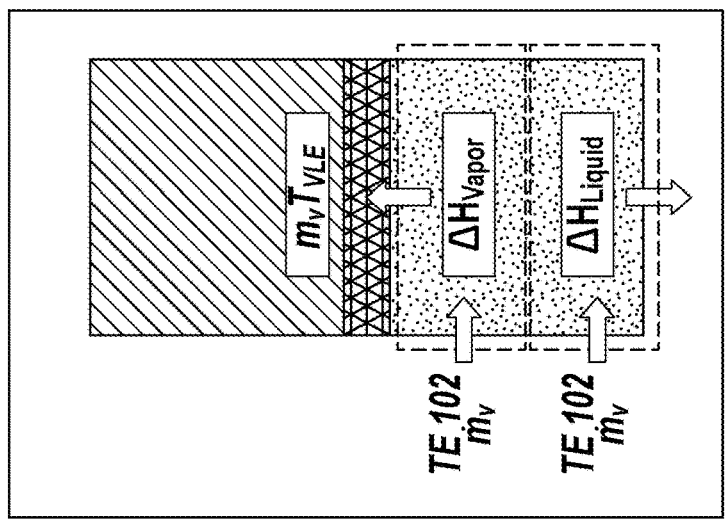
Figure 12A:
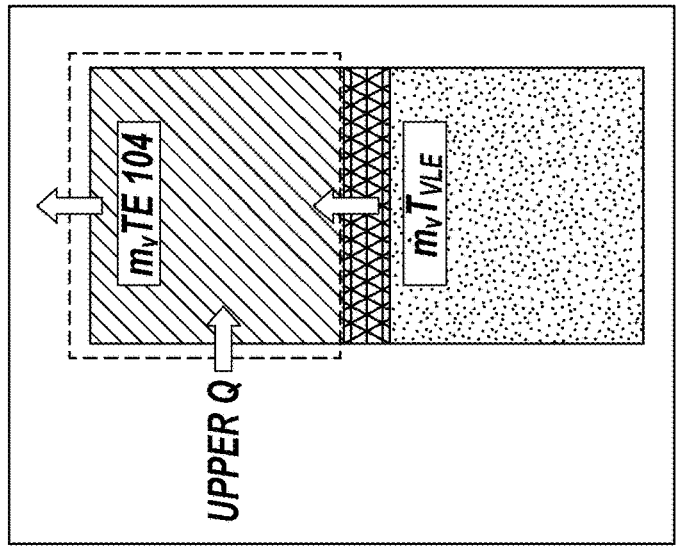

To determine $\Delta h_{vap}$ (kJ·kg$^{-1}$) a three-step procedure was used, summarized in FIG. 12, initiated by calculation of the $T_{VLE}$, followed by determination of energy absorbed by the reactor vapor and liquid streams, and finally an energy balance on the reactor. First, $T_{VLE}$ was estimated through an energy balance on a control volume over the upper portion of the reactor (FIG. 12A) using the vapor product mass flowrate $\dot{m}_v$ (kg·s$^{-1}$) and temperature ($T_V$ (° C.)) of the vapor outlet in combination with the heat transfer ($\dot{Q}_{Upper}$ (kW)). $\dot{Q}_{Upper}$ (kW) was determined (Equation 4) by summing the power applied to the heat tape ($\dot{Q}_{tape}$ (kW)), HX-103, to achieve desired vapor outlet temperature and an estimated heat loss function ($\dot{Q}_{loss,Up}$ (kW)) based on the reactor wall temperature. Due to the rapid changes in specific heat near the pseudocritical point, an integration of the specific heat was completed with respect to temperature at constant pressure and constant brine concentration (Equation 5). $T_{VLE}$ was determined using an integral bound via a minimizing function in Engineering Equation Solver software [Engineering Equation Solver. 2017].

$$\dot{Q}_{Upper} = \dot{Q}_{tape} - \dot{Q}_{loss,Up} \quad (4)$$

$$\dot{Q}_{Upper} = \dot{m}_v \int_{T_{VLE}}^{T_V} C_p dT \quad (5)$$

Next, enthalpy change between the vapor [$\Delta H_{Vapor}$ (kJ)] and liquid [$\Delta H_{Liquid}$ (kJ)] outlet streams was determined using an energy balance on two control volumes for each product stream (FIG. 12B). Due to the large change in brine concentration in the lower portion of the reactor, as well as specific heat dependence on concentration, the present inventors assumed a concentration profile in the liquid phase of the reactor. Due to limited knowledge of the concentration gradient in the lower reactor, a linear concentration gradient was assumed. Enthalpy changes for both outlets was completed using a similar integral of specific heat with relation to temperature at constant pressure, but with the assumed brine concentration profile (Equations 6 and 7):

$$\Delta H_{Vapor} = \dot{m}_v \int_{T_{inlet}}^{TVLE} C_{p,vap} dT \quad (6)$$

$$\Delta H_{Liquid} = \dot{m}_L \int_{T_{inlet}}^{T_L} C_{p,liq} dT \quad (7)$$

where $\dot{m}_L$ (kg·s$^{-1}$) is the liquid product flowrate, $C_{p,vap}$ (J·kg$^{-1}$·K$^{-1}$) is the specific heat of water vapor at the specified system pressure and $C_{p,liq}$ (J·kg$^{-1}$·K$^{-1}$) is the specific heat of the liquid product.

Finally, the $\Delta h_{vap}$ is determined by first completing an energy balance (Equation 8) on a control volume over the lower portion of the reactor using the electrical power input through the electrode ($\dot{Q}_{Elect}$ (kW)), heat loss around the lower portion of the reactor ($\dot{Q}_{loss,low}$ (kW)), $\Delta H_{Vapor}$, and $\Delta H_{Liquid}$. Then, $\Delta h_{vap}$ (Equation 9) is determined using the result of Equation 8 and $\dot{m}_v$.

$$\Delta H_{Vap} = \dot{Q}_{Elect} - \dot{Q}_{loss,low} - \Delta H_{Vapor} - \Delta H_{Liquid} \quad (8)$$

$$\Delta h_{Vap} = \frac{\Delta H_{Vap}}{\dot{m}_v} \quad (9)$$

Results and Discussion

Vapor Product Quality

Figure 13A:
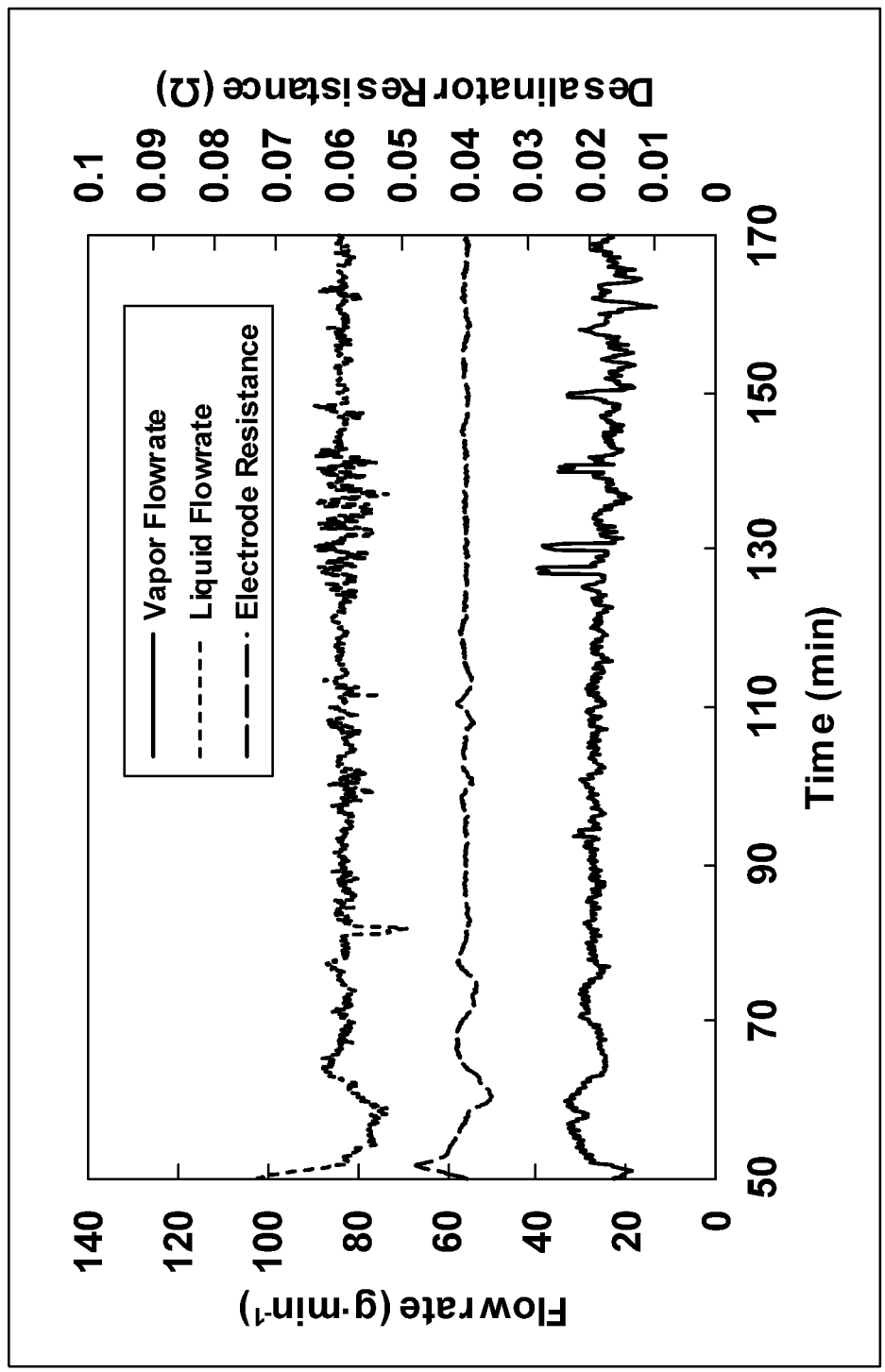
FIGS. 13A, 13B, and 13C are graphs showing representative system data for 180 g·L$^{-1}$ NaCl brine, with FIG. 13A showing product flowrates and reactor resistance, FIG. 13B showing inlet/outlet stream temperatures and reactor power, and FIG. 13C showing inlet/outlet stream compositions.
Figure 13B:
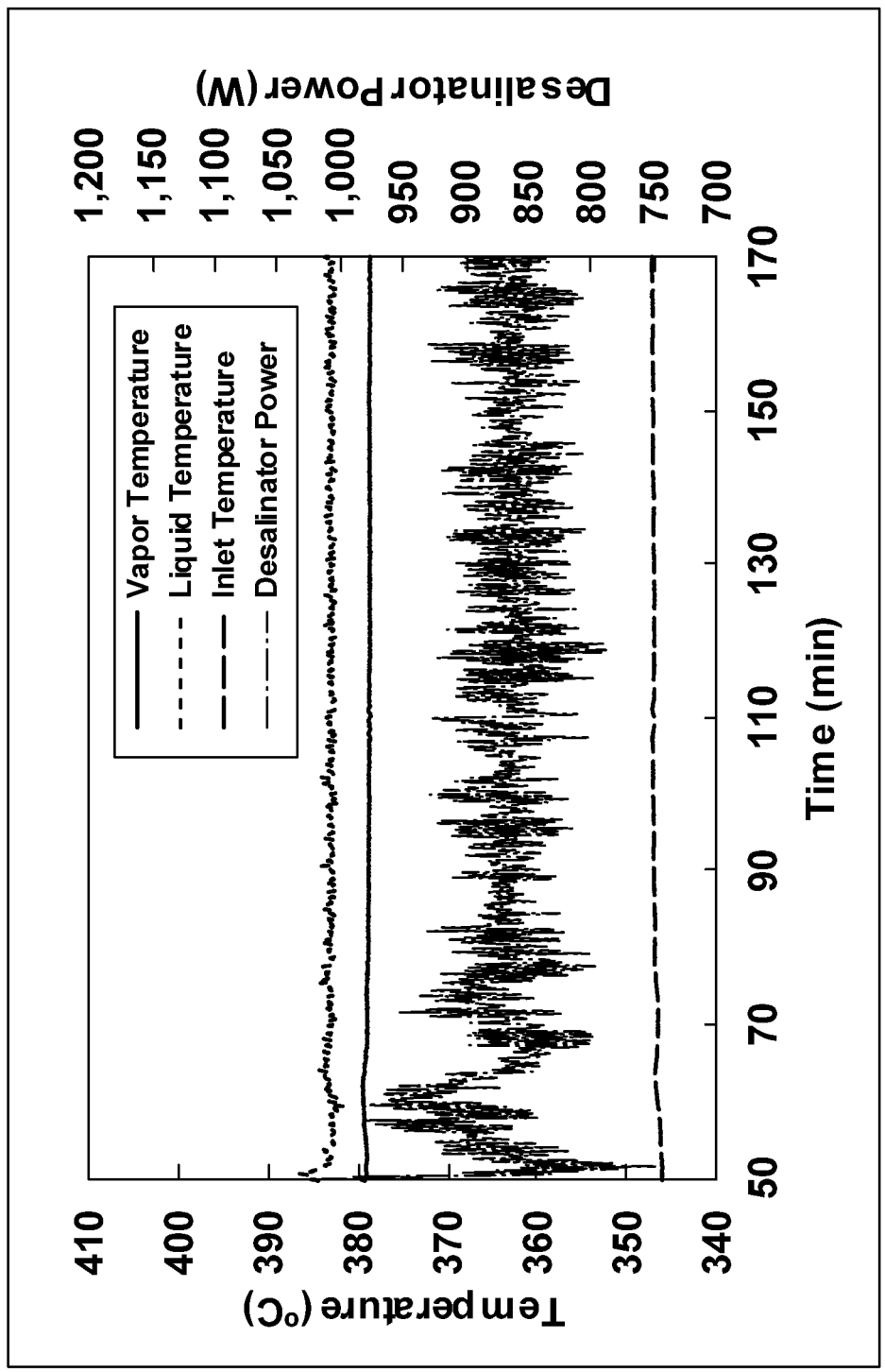
Figure 13C:
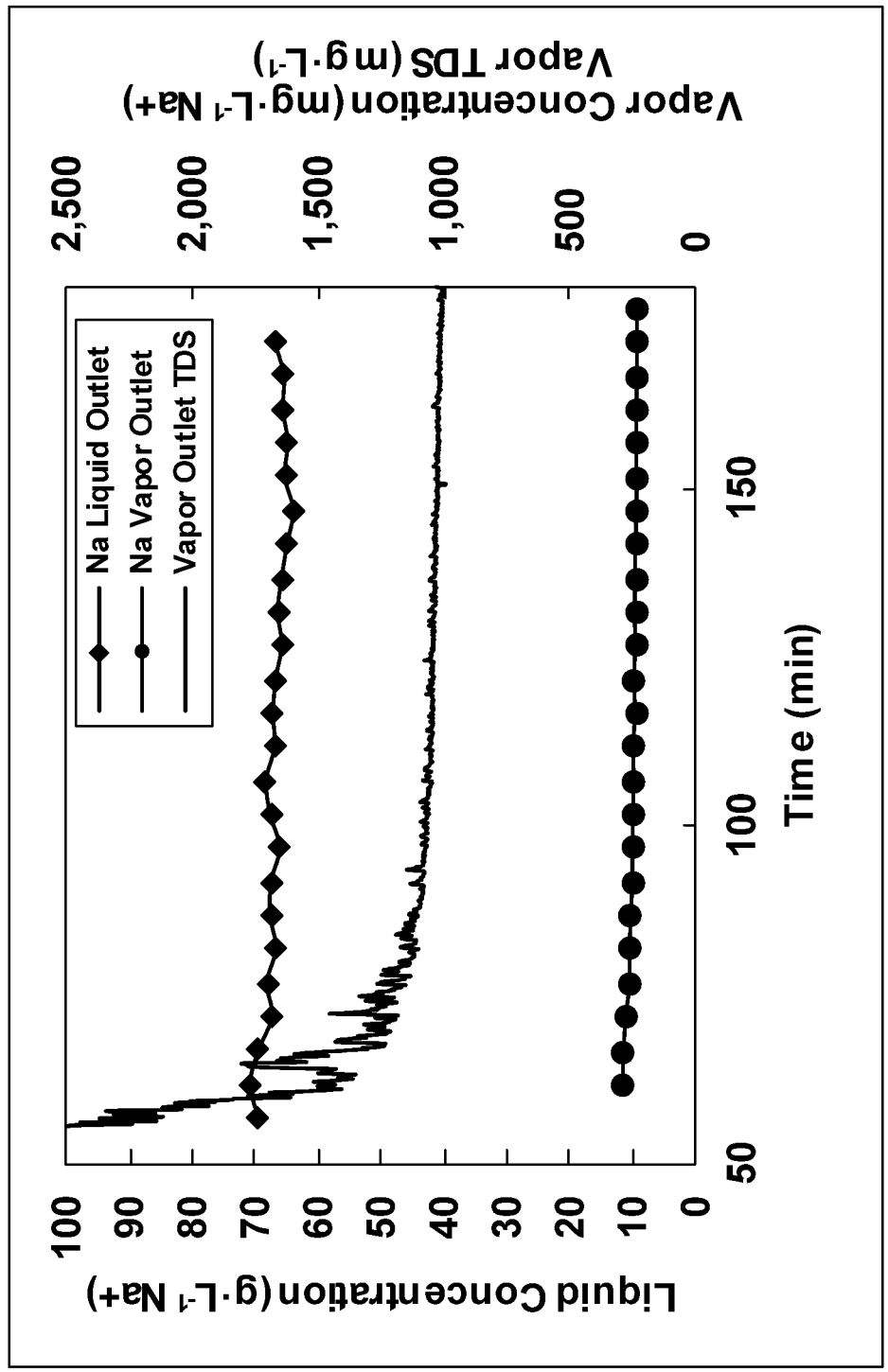

As described above, a series of trials were conducted evaluating the ability of the prototype Joule-heating reactor to produce a clean water product from multicomponent brines containing 50 to 180 g·L$^{-1}$ TDS, modeled after brines generated by oil/gas and $CO_2$ injection wells. As limited information exists for the $H_2O$/NaCl brine system at supercritical conditions, trials were also completed with 50 and 180 g·L$^{-1}$ NaCl brines to compare with previous experimental and modeling results. FIG. 13 presents representative prototype system operating data from a single trial conducted at 23 MPa with 100 mL·min$^{-1}$ of 180 g·L$^{-1}$ NaCl brine. As shown in FIG. 13A, approximately 50 min is needed to establish steady state conditions when heated from room temperature. Once operating conditions are achieved, the prototype system exhibits stable operation as demonstrated by the liquid/vapor flowrates and reactor power (FIG. 13A) and inlet/product temperatures (FIG. 13B). Average reactor power (FIG. 13B) was approximately 875 W throughout with slight fluctuations due to minor changes in liquid conductivity and liquid product flowrate. Vapor TDS (FIG. 13C) decreases to a steady state concentration of approximately 1,000 mg·L$^{-1}$ within the first 25 minutes of operation. This phenomena was associated with the purging of brine flowing through the system before fluid transition to pseudocritical state.

Figure 14:
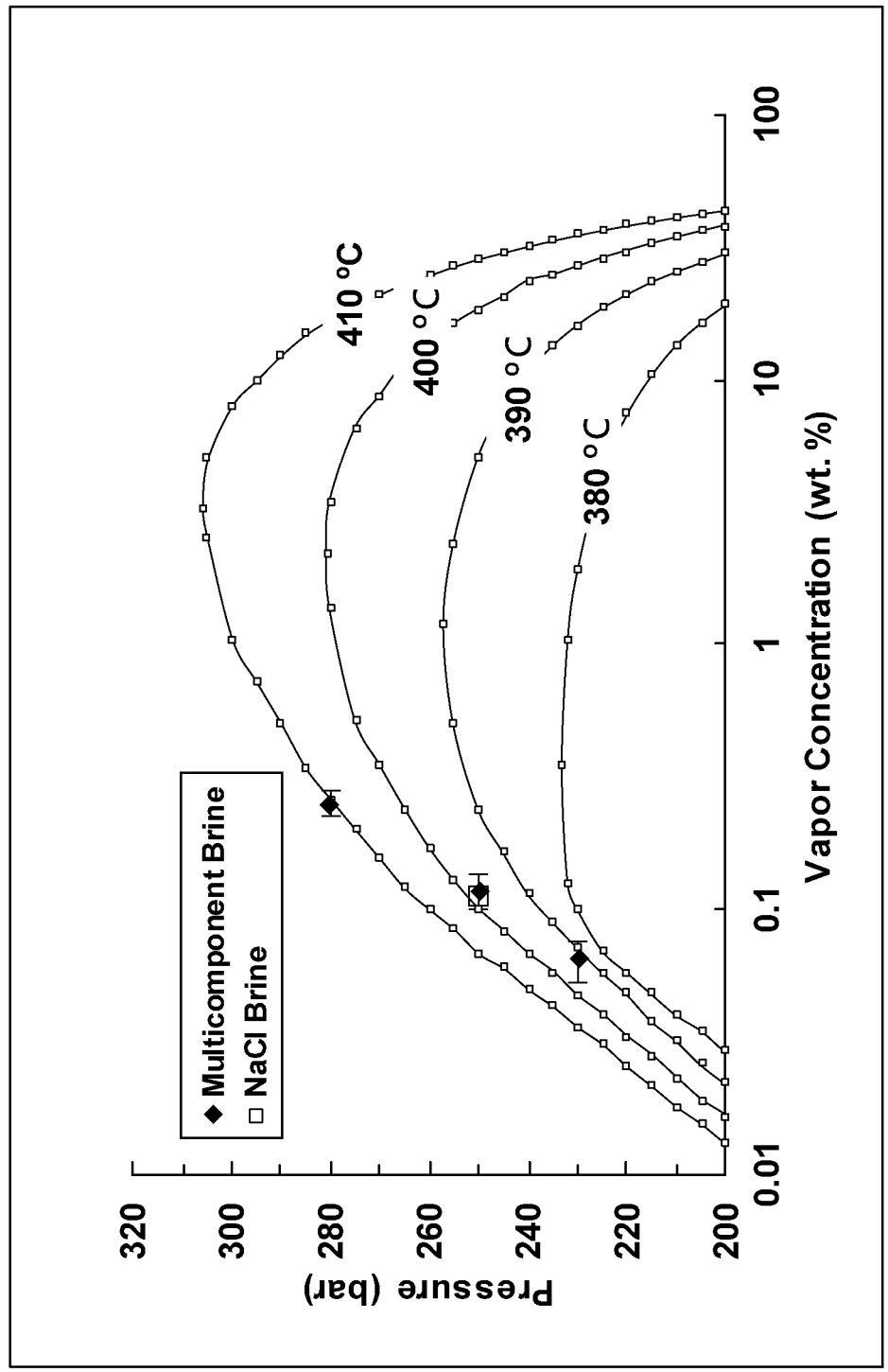
FIG. 14 is a graph showing a comparison of vapor TDS concentrations from 180 g·L$^{-1}$ NaCl brine and 50 and 180 g·L$^{-1}$ multicomponent brine study results with Bischoff and Pitzer data [J. L. Bischoff and K. S. Pitzer, "*Liquid-vapor relations for the system NaCl-H$_2$O: summary of the P-T-x surface from* 300 *degrees to* 500 *degrees Celsius,*" American Journal of Science, vol. 289, pp. 217-248, 1989]. Bischoff and Pitzer results are shown as smoothed grey lines of constant vapor temperature.
Figure 15:
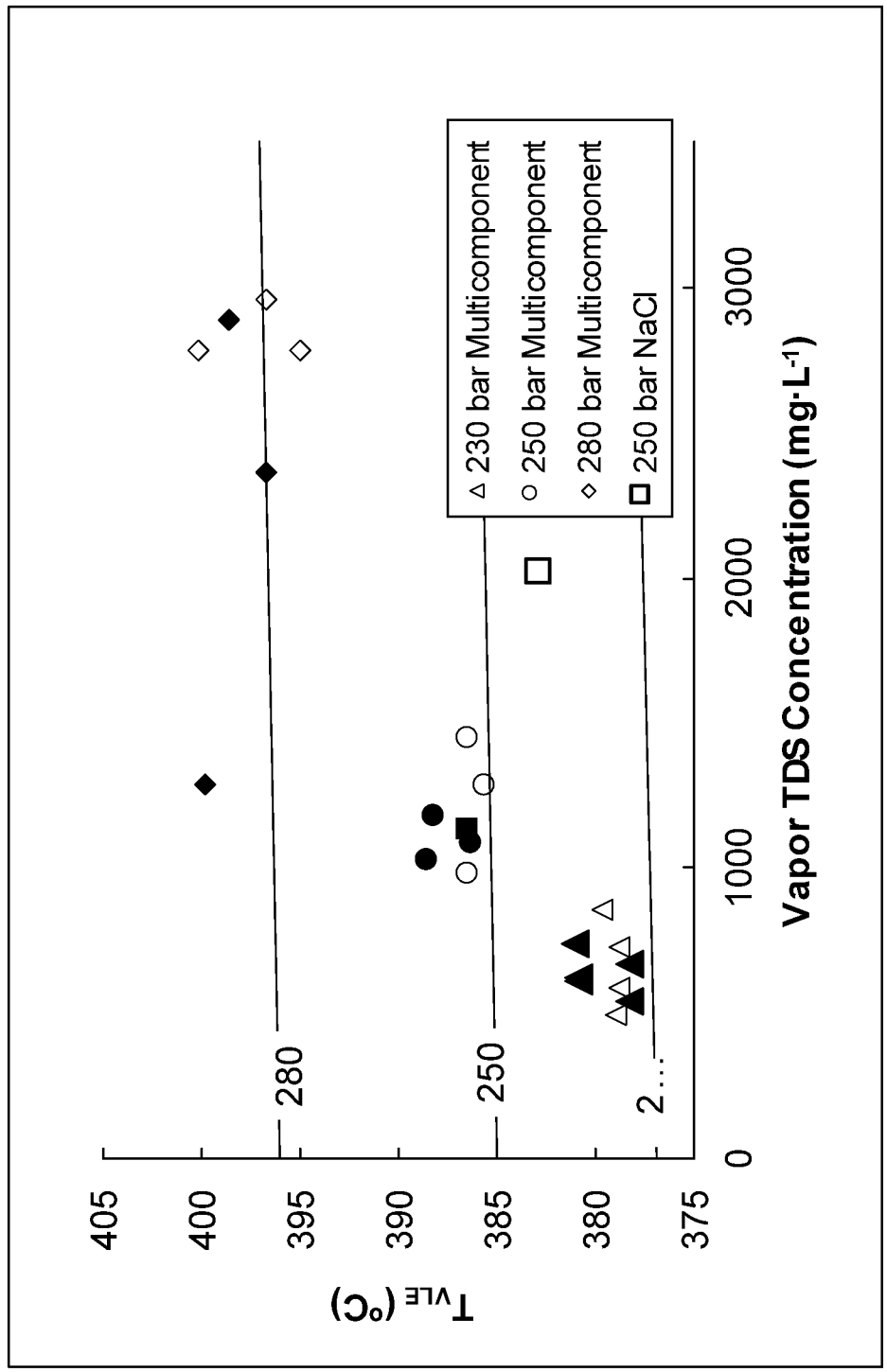
FIG. 15 is a graph showing experimental $T_{VLE}$ results with vapor concentration for 230,250 and 280 bar. Provided lines of pseudocritical temperature derived from Driesner model [T. Driesner, "*The system H$_2$O—NaCl. Part II: Correlations for molar volume, enthalpy, and isobaric heat capacity from* 0 *to* 1000° C., 1 *to* 5000 *bar, and* 0 *to* 1 *XNaCl,*" Geochimica et Cosmochimica Acta, vol. 71, pp. 4902-4919, January 2007]. Results from the 50 g·L$^{-1}$ trials are presented as open markers, while 180 g·L$^{-1}$ results are presented as solid filled markers. Typical single trial standard deviations were below 50 mg·L$^{-1}$ with three trials resulting in standard deviations near 150 mg·L$^{-1}$.

Results from the 50 and 180 g·L$^{-1}$ NaCl brine trials are shown in Table 4, while results from the 50 and 180 g·L$^{-1}$ multicomponent brine trials are provided in Table 5. As negligible information regarding properties of supercritical fluids generated from multicomponent brines exists, data available for $H_2O$/NaCl systems was selected for comparison. In particular, the Bischoff and Pitzer study was selected for comparison, as the authors reported a wide range of $H_2O$/NaCl brine results and NaCl is the primary component of the brines investigated in this study [J. L. Bischoff and K. S. Pitzer, "*Liquid-vapor relations for the system NaCl—$H_2O$: summary of the P-T-x surface from* 300 *degrees to* 500 *degrees Celsius*," American Journal of Science, vol. 289, pp. 217-248, 1989, incorporated by reference herein]. FIG. 14 presents the Joule-heated reactor vapor product results with the Bischoff and Pitzer data. The 180 g·L$^{-1}$ NaCl results show good agreement with the Bischoff and Pitzer data producing a vapor stream containing 1,128 mg·L$^{-1}$ NaCl as shown in FIG. 15. Multicomponent brine results also show reasonable agreement with the previously reported results, which is expected as NaCl is the primary component of the multicomponent brines (Table 3). It should be noted that the temperature of the vapor generated by the reactor increased with operating pressure, due to the increase in water's pseudocritical temperature.

TABLE 4

Summary of experimental results for 50 and 180 g · L$^{-1}$ NaCl brines at 250 bar.

| Parameters | 50 g · L$^{-1}$ | 180 g · L$^{-1}$ |
| --- | --- | --- |
| Pressure (bar) | 250.00 ± 0.10 | 249.99 ± 0.31 |
| Pseudocritical Temp (° C.) | 384.9 | 384.9 |
| Inlet Temp (° C.) | 351.58 ± 0.19 | 352.11 ± 0.15 |
| Vapor Outlet Temp (° C.) | 390.036 ± 0.51 | 391.06 ± 0.78 |
| Liquid Outlet Temp (° C.) | 392.11 ± 0.40 | 400.73 ± 0.31 |
| $T_{VLE}$ (° C.) | 383.1 | 386.6 |
| $\dot{m}_{inlet}$ (g · min$^{-1}$) | 104.5 ± 7.4 | 112.3 ± 8.6 |
| Inlet TDS (ppm) | 60,692.8 | 209,774.5 |
| Vapor TDS (ppm) | 2,010.81 ± 60.0 | 1,128.44 ± 23.1 |

TABLE 5

Summary of experimental results for 50 and 180 g · L⁻¹ multicomponent brines. Data presented are three trial averages with standard deviations. Pseudocritical temperature of pure water is included for reference.

| Temperatures | Operating Pressure (bar) | | |
|---|---|---|---|
| | 230.01 ± 0.45 | 249.99 ± 0.97 | 280.00 ± 1.00 |
| 50 g · L⁻¹ | | | |
| Pseudocritical (° C.) | 377.5 | 384.9 | 395.4 |
| Inlet (° C.) | 343.5 ± 2.05 | 349.7 ± 2.02 | 362.8 ± 8.43 |
| Vapor Outlet (° C.) | 387.2 ± 0.64 | 391.0 ± 0.32 | 406.4 ± 0.06 |
| Liquid Outlet (° C.) | 369.5 ± 4.63 | 373.7 ± 10.91 | 388.2 ± 7.03 |
| $T_{VLE}$ (° C.) | 379.1 ± 0.47 | 386.3 ± 0.53 | 397.3 ± 2.65 |
| $\dot{m}_{inlet}$ (g · min⁻¹) | 104.3 ± 1.30 | 104.4 ± 1.98 | 105.4 ± 1.98 |
| Inlet TDS (ppm) | 41,639.4 ± 298.3 | 44,261.9 ± 252.7 | 59,130.1 ± 311.3 |
| Vapor TDS (ppm) | 655.1 ± 158.5 | 1,240.0 ± 237.7 | 2,836.1 ± 97.5 |

| Temperatures | Operating Pressure (bar) | | |
|---|---|---|---|
| | 230.00 ± 0.31 | 249.99 ± 0.89 | 280.00 ± 0.17 |
| 180 g · L⁻¹ | | | |
| Pseudocritical (° C.) | 377.5 | 384.9 | 395.4 |
| Inlet (° C.) | 346.0 ± 0.94 | 351.5 ± 0.74 | 360.4 ± 0.67 |
| Vapor Outlet (° C.) | 378.7 ± 0.87 | 390.3 ± 0.74 | 402.7 ± 0.63 |
| Liquid Outlet (° C.) | 381.9 ± 1.16 | 392.0 ± 0.74 | 404.2 ± 0.76 |
| $T_{VLE}$ (° C.) | 380.1 ± 1.43 | 387.8 ± 1.19 | 398.4 ± 1.55 |
| $\dot{m}_{inlet}$ (g · min⁻¹) | 103.9 ± 1.11 | 105.4 ± 0.78 | 111.1 ± 0.48 |
| Inlet TDS (ppm) | 146,501.7 ± 11,129.2 | 154,033.3 ± 2,128.25 | 157,645.9 ± 1,334.82 |
| Vapor TDS (ppm) | 589.4 ± 40.9 | 1,095.4 ± 75.2 | 2,607.5 ± 263.3 |

Product vapor TDS ranges for the investigated pressures were 622.3±163.7, 1,167.7±249.3, and 2,721.8±280.8 mg·L⁻¹ at 230, 250, and 280 bar, respectively. Individual cation concentrations as well as vapor fractionation, defined by the ratio of vapor concentration to inlet concentration, are shown in Table 6. This phenomena of increasing vapor TDS with pressure is a result of increased supercritical water vapor density. Densities of the supercritical water vapors produced in the prototype system were determined to be 227.0, 274.4, and 295.6 kg·m⁻³ using vapor/liquid interface temperatures at 230, 250, and 280 bar, respectively [Engineering Equation Solver. 2017]. As water density increases, its ability to dissolve inorganic halide salts increases. Similar results have been reported for single component halide salts in supercritical water including NaCl, KCl, $CaCl_2$, and $MgCl_2$ [I. Leusbrock, S. J. Metz, G. Rexwinkel, and G. F. Versteeg, "*Solubilities of inorganic compounds in supercritical water*;" I. Leusbrock, S. J. Metz, G. Rexwinkel, and G. F. Versteeg, "*The solubility of magnesium chloride and calcium chloride in near-critical and supercritical water*," The Journal of Supercritical Fluids, vol. 53, no. 1-3, pp. 17-24, June 2010; I. Leusbrock, S. J. Metz, G. Rexwinkel, and G. F. Versteeg, "*Solubility of 1:1 Alkali Nitrates and Chlorides in Near-Critical and Supercritical Water*," Journal of Chemical & Engineering Data, vol. 54, no. 12, pp. 3215-3223, December 2009; M. M. DiPippo, K. Sako, and J. W. Tester, "*Ternary phase equilibria for the sodium chloride-sodium sulfate-water system at 200 and 250 bar up to 400° C.*," Fluid Phase Equilibria, vol. 157, no. 2, pp. 229-255, 1999; and Phillip E. Savage, Sudhama Gopalan, Thamid I. Mizan, Christopher J. Martino, and Eric E. Brock, "Reactions at supercritical conditions: Applications and fundamentals," AIChE Journal, vol. 41, no. 7, pp. 1723-1778, July 199538]. Further, there is no significant difference between vapor TDS generated from the 50 and 180 g·L⁻¹ multicomponent brines at each operating pressure, further supporting that vapor phase density controls composition. The removal efficiencies for the major cations were found to be 97.98-99.59% and 99.81-99.98% for sodium and calcium, respectively. Overall TDS removal range was 95.2-99.6% over the evaluated conditions.

TABLE 6

Vapor product compositions for 50 and 180 g · L⁻¹ multicomponent brine experimental trials. Concentrations are presented in mg · L⁻¹, and vapor fractionation is presented as a percentage range from all trials conducted. Note that barium was below the detection limit and is presented as BDL.

| Constituent | 230 (mg · L⁻¹) | 250 (mg · L⁻¹) | 280 (mg · L⁻¹) |
|---|---|---|---|
| $Ca^{2+}$ | 15.03 ± 18.81 | 13.60 ± 11.53 | 24.46 ± 8.19 |
| $K^+$ | 7.71 ± 11.26 | 4.97 ± 0.75 | 10.09 ± 2.49 |
| $Na^+$ | 232.08 ± 29.82 | 440.37 ± 66.78 | 1,038.59 ± 77.76 |
| $Sr^{2+}$ | 0.49 ± 0.55 | 0.62 ± 0.39 | 0.81 ± 0.34 |
| $Ba^{2+}$ | 0.30 ± 0.57 | 0.11 ± 0.23 | 1.73 ± 2.37 |

$T_{VLE}$ Determination

Experimental data generated by the prototype Joule-heated reactor was used to calculate $T_{VLE}$ for each operating condition using the method described in the Thermodynamic Background section, above. FIG. 15 presents the calculated $T_{VLE}$ values for the 180 g·L⁻¹ NaCl and 50 and 180 g·L⁻¹ multicomponent brines with pseudocritical temperature calculated using the Driesner model [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] for NaCl brines. It can be seen that as the NaCl concentration increases, the Driesner model predicts a slight increase in pseudocritical point. These results are similar to those shown in FIG. 14, as the model also predicts increased vapor TDS concentration with operating pressure due to increased supercritical fluid density.

The 180 g·L$^{-1}$ NaCl trial T$_{VLE}$ value is in good agreement with the Driesner model. T$_{VLE}$ values determined from multicomponent brine experiments generally are slightly higher (2-5° C.) in comparison to the predicted NaCl model values. This could be a result of thermocouple error (±2.2° C.) and additional brine components, most notably CaCl$_2$. No discernable difference is seen between T$_{VLE}$ values from the 50 and 180 g·L$^{-1}$ multicomponent brines at each operating pressure, correlating with data in Table 6, which showed no discernable difference in vapor composition generated from either fluid at each pressure. These data further suggest thermodynamic properties of multicomponent brines, with NaCl as the dominant component, may be suitably predicted using experimental data and models developed for H$_2$O/NaCl brines [T. Driesner, "*The system H$_2$O—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007; and J. L. Bischoff and K. S. Pitzer, "*Liquid-vapor relations for the system NaCl—H$_2$O: summary of the P-T-x surface from 300 degrees to 500 degrees Celsius*," American Journal of Science, vol. 289, pp. 217-248, 1989].

Water Recovery and Δh$_{vap}$

A benefit of the Joule-heating reactor is that electrical power is directly converted into thermal energy within the liquid brine via resistive heating, removing conduction and/or convection heat transfer associated with external heating mechanisms, while potentially reducing scaling/plugging within the system.

Figure 16:
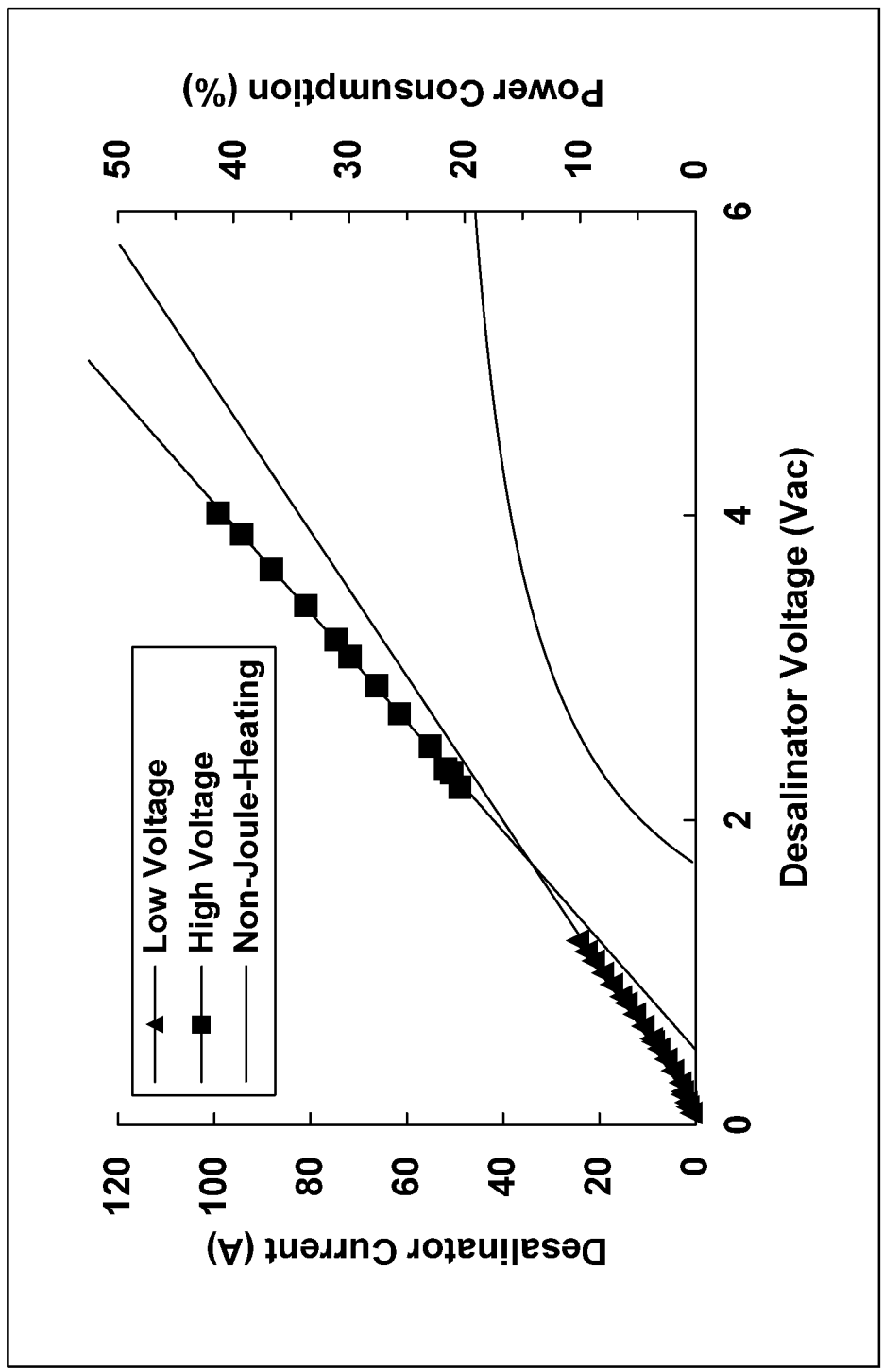
FIG. 16 is a graph showing test results from the 50 g·L$^{-1}$ electrochemical reactions test. The heating power loss is calculated based on the sloped of the low and high power linear regions.

Due to the Joule-heating method requiring an electrical current to be passed through brine in the reactor, it was necessary to consider the effects of electrochemical reactions, including water splitting. A test was completed for each inlet concentration by slowly ramping the voltage while monitoring reactor current. Two distinct slopes were found in the voltage and current data, the first region below 1.25 Vac and second above 2.25 Vac. Data between the two regions was not linear, therefore it was not included in the distinct linear ranges. It was assumed current while operating below 1.25 Vac was purely resistive heating of the fluid, while current above 2.25 Vac was a combination of resistive heating and electrochemical reactions. The slope of the two linear regions was used to calculate the power that was associated with heating of the process fluid. This test resulted in a power loss of up to 20% and 40% for the 50 and 180 g·L$^{-1}$ solution respectively, FIG. 16 displays the results of the 50 g·L$^{-1}$ test.

Figure 17:
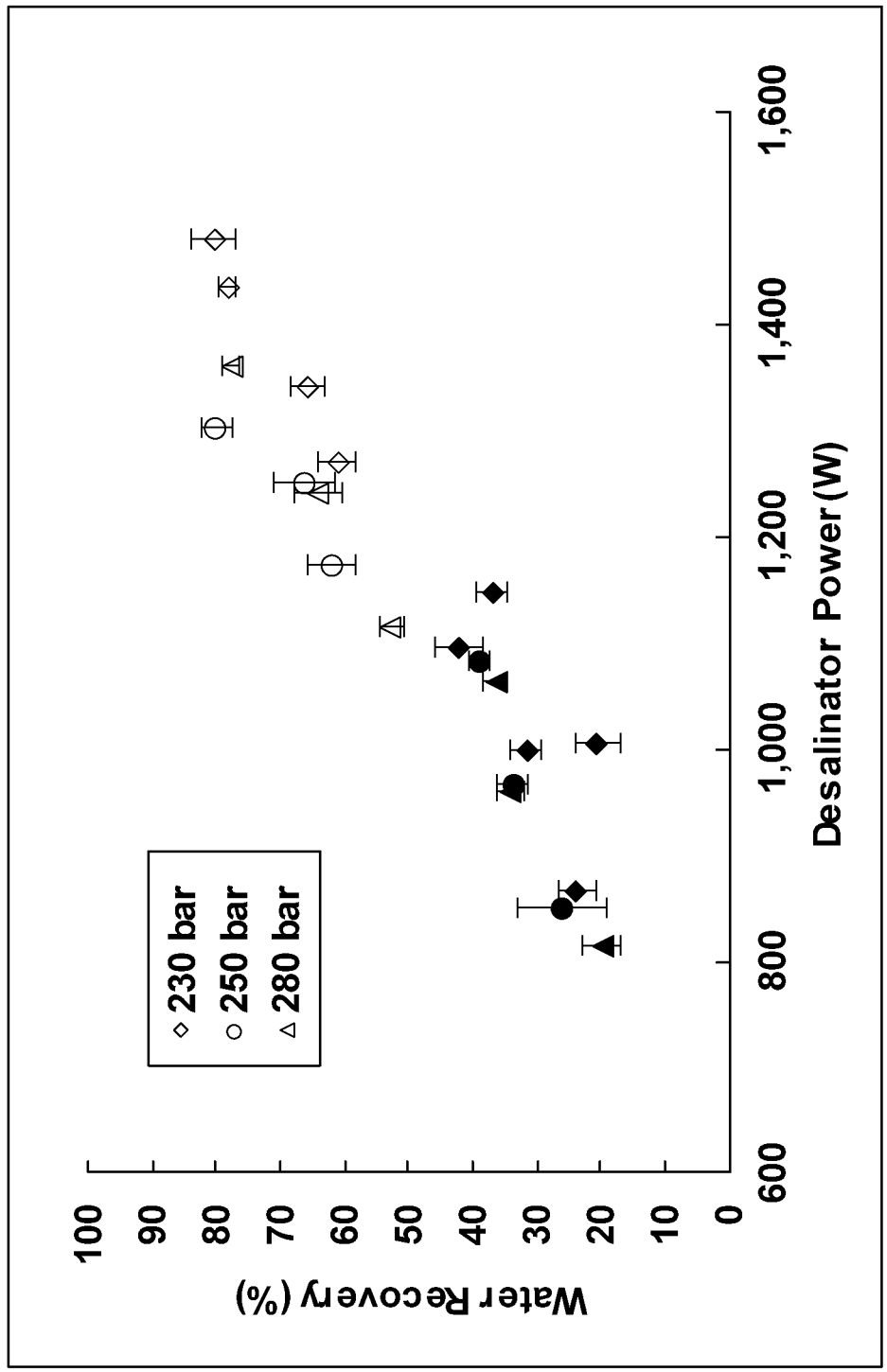
FIG. 17 is a graph showing water recovery from experimental trials based upon reactor power. Water recovery defined by Equation 1. All trials completed with an inlet flowrate of 100 mL·min$^{-1}$. Results corrected for reactor heat loss. 50 g·L$^{-1}$ multicomponent data represented by hollow markers, 180 g·L$^{-1}$ multicomponent data represented by solid filled markers.

FIG. 17 presents clean water recovery from the generation of vapor within the reactor based upon supplied power. Typical operating voltages for the trials were 5.9-10.0 Vac with a current range of 124-173 A depending upon brine composition and targeted water recovery. A clear linear relationship between reactor power and water recovery is seen regardless of operating pressure or inlet composition. To avoid precipitation of salts within the reactor, the system may be operated at a water recovery level which prevents an ion product greater than its associated equilibrium constant. Further water recovery may be achieved via flashing the reactor liquid product as described previously [S. O. Odu, A. G. J. van der Ham, S. Metz, and S. R. A. Kersten, "*Design of a process for supercritical water desalination with zero liquid discharge*," Industrial and Engineering Chemistry Research, vol. 54, pp. 5527-5535, 27 2015; D. E. López and J. P. Trembly, "*Desalination of hypersaline brines with joule-heating and chemical pre-treatment: Conceptual design and economics*," Desalination, vol. 415, pp. 49-57, August 2017, incorporated by reference herein in their entireties].

Figure 18:
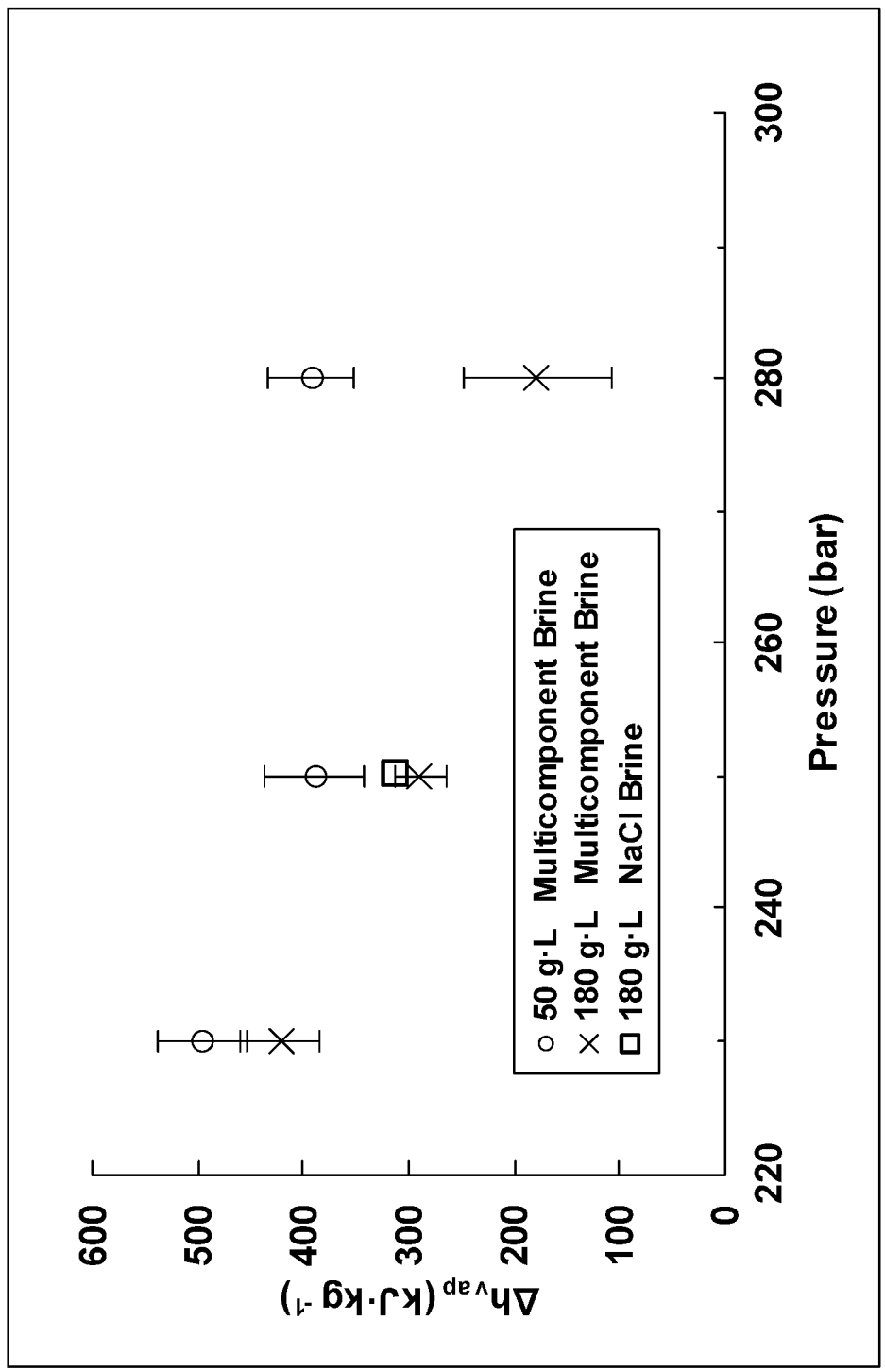
FIG. 18 is a graph showing enthalpy of vaporization for 180 g·L$^{-1}$ NaCl brine and 50 and 180 g·L$^{-1}$ multicomponent brines at evaluated pressures.

To understand the energetics associated with the proposed Joule-heated brine treatment process, the energy necessary to produce a clean water product needs to be understood. Δh$_{vap}$ represents the energy necessary to generate a quantity of low-TDS vapor from the hypersaline brine within the desalination system. Experimental data from the prototype system were used to derive enthalpies of vaporization values using the methodology described in the "Thermodynamic Background" section of this Example. FIG. 18 presents the results from the Δh$_{vap}$ analyses. Energy required to generate low-TDS vapor from the 50 g·L$^{-1}$ multicomponent brine was determined to be 495±43.1, 389±47.4, and 392±40.4 kJ·kg$^{-1}$, while values for the 180 g·L$^{-1}$ multicomponent brine were determined to be 421.7±37.3, 289.3±23.6, and 178.3±69.9 kJ·kg$^{-1}$ at 230, 250 and 280 bar respectively. Operating pressure was found have a significant effect on Δh$_{vap}$, with the highest value for both multicomponent brines at 230 bar.

Figure 19:
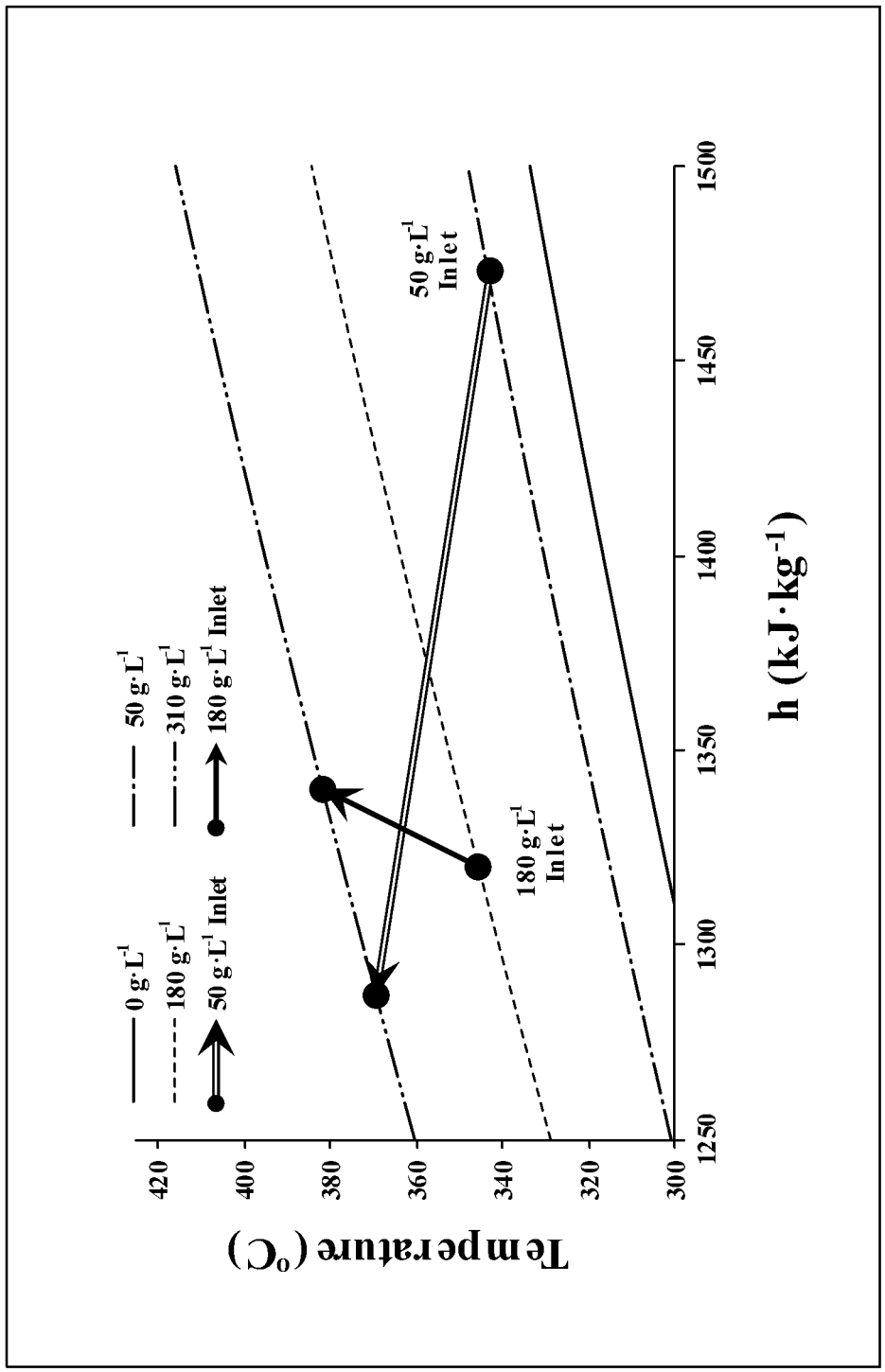
FIG. 19 is a graph showing process lines plotted on the temperature enthalpy diagram with lines of constant NaCl concentration. The process lines symbolize the enthalpy change of fluid from the inlet to the lower outlet of the reactor. The 50 g·L$^{-1}$ trial shows significantly different thermodynamics than the 180 g·L$^{-1}$ trial.

It was found that the higher inlet concentration brine resulted in a lower Δh$_{vap}$, similar to the increase in efficiency of mechanical vapor compression and multi-effect desalination as the inlet concentration is increased [G. P. Thiel, E. W. Tow, L. D. Banchik, H. W. Chung, and J. H. Lienhard, "*Energy consumption in desalinating produced water from shale oil and gas extraction*," Desalination, p. 94, 2015]. Comparing FIG. 17 and FIG. 18, the linear relationship between reactor power and water recovery is counterintuitive when compared to the Δh$_{vap}$ results. As Δh$_{vap}$ for the 180 g·L$^{-1}$ multicomponent brine was 18-120% less than the 50 g·L$^{-1}$, one would expect power required to generate vapor from the lower strength brine to be greater. However, the linear relationship between water recovery and reactor power can be attributed to the increased ratio of electrochemical reactions in the 180 g·L$^{-1}$. Further evaluation of the thermodynamic of the lower portion of the reactor revealed a difference in liquid enthalpy change due to increasing salt concentration within the lower portion of the reactor. This phenomena can be further explained through FIG. 19, which shows the T-h diagram for the multicomponent brines (50 and 180 g·L$^{-1}$) entering the reactor and the resulting liquid product (310 g·L$^{-1}$) exiting the lower outlet. Process paths indicating the transition of the brines entering the reactor to the liquid product are also shown. The specific enthalpy of the resulting lower liquid product from the 50 g·L$^{-1}$ brine is lower than its corresponding inlet brine specific enthalpy; however, in the 180 g·L$^{-1}$ case the liquid product has a greater specific enthalpy than the corresponding inlet brine. This specific enthalpy change in the 50 g·L$^{-1}$ case, results in an energy release from the liquid in the bottom of the reactor, while showing an increase in the 180 g·L$^{-1}$ case, further complicating the relationship between applied power and Δh$_{vap}$.

Electrode Corrosion

Figure 20:
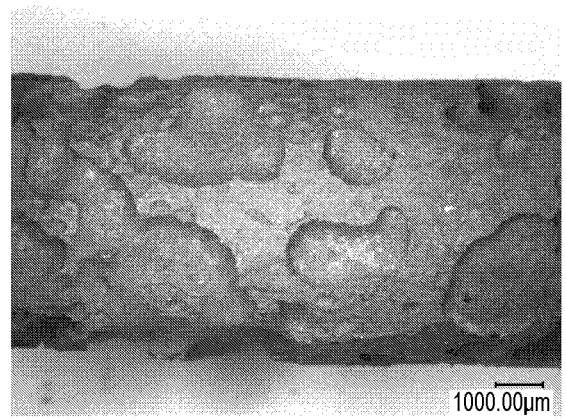
FIG. 20 is a photograph showing corrosion of the inner electrode removed after 50 hours of high power operation.
Figure 21:
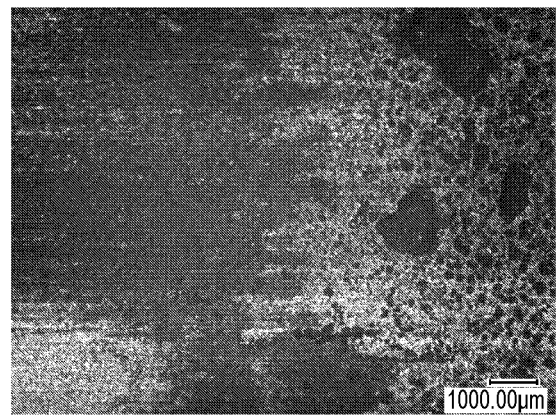
FIG. 21 is a photograph showing corrosion of the outer electrode after 250 hours of high powered operation. Pitting on right side of the figure can be compared to the left side of the figure where electrical current is minimal.

Corrosion was encountered in the lower portion of the reactor where liquid brine underwent Joule-heating. Throughout the trials a potential range of 5.9-10.0 Vac was applied across the electrodes in the lower portion of the reactor. Images of the inner and outer electrodes after 50 and 250 hrs of operation are shown in FIG. 20 and FIG. 21, respectively. The inner electrode experienced more significant corrosion, likely due to the higher current density at this location. The 0.5-in diameter inner electrode experienced significant corrosion, forming large pits along its length exposed to brine during joule-heating tests. Corrosion at the outer electrode was found to be significantly lower, with pitting no deeper than 100 μm found after 250 hours of operation with brine.

Aspen Model Results

Results from the prototype reactor system were used with a simulation developed in Aspen Plus® v9 using the ELECNRTL model to assess the ability of predicting brine properties and system performance. The reactor inlet brine's temperature (TE-102) and composition were used in the simulation, along with a flash column duty range (based upon reactor heat duty accounting for vessel heat loss). This model does not account for electrochemical reactions generated by the operating voltages used in the trials. $T_{VLE}$ and water recovery (Equation 1) with multicomponent brines containing 50 and 180 g·L$^{-1}$ at pressures ranging from 230 to 280 bar were determined.

Figure 22A:
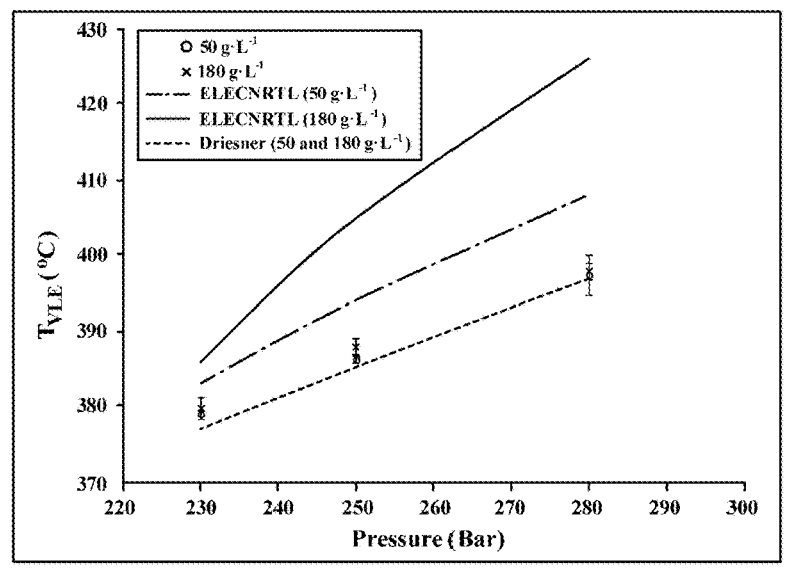
FIGS. 22A and 22B are graphs showing a comparison of 50 and 180 g·L$^{-1}$ experimental values with Aspen Plus® ELECNRTL model results, with FIG. 22A showing $T_{VLE}$ with pressure and FIG. 22B showing water recovery based with reactor duty. Experimental data are shown as average value with standard deviations and model results as smoothed lines.

FIG. 22 presents a comparison of experimental values derived from the prototype Joule-heated reactor with ELECNRTL and Driesner model results. Driesner model results for both 50 and 180 50 g·L$^{-1}$ brines are shown as a single line as there was less than 1° C. difference between the results. The ELECNRTL and Driesner models (FIG. 22A) show ability to predict $T_{VLE}$ trends. ELECNRTL temperature over prediction for 50 g·L$^{-1}$ brine are 4-11° C., while Driesner model under predictions are 2-3° C. ELECNRTL model accuracy decreased with increasing TDS content, with $T_{VLE}$ over prediction for the 180 g·L$^{-1}$ brine ranging from 6-28° C., with relatively accurate Driesner model predictions. Comparing results, the Driesner model [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] provides better prediction of $T_{VLE}$ for both 50 and 180 g·L$^{-1}$ brines with an under prediction range of 2-3° C. Error in predicting $T_{VLE}$ values will have implications in evaluating desalination power requirements impacting system enthalpy balances as described in the "Thermodynamic Background" section of this Example. The Driesner model, although developed for binary component NaCl brines, is able to predict $T_{VLE}$ of the multicomponent brines evaluated in this study. Although NaCl was the primary component of the brines evaluated in this study other components were present, with CaCl$_2$ being the second most abundant. CaCl$_2$ behavior is likely similar to NaCl under similar conditions, possibly accounting for Driesner model success in predicting $T_{VLE}$ determined in this study. Further, studies would be required to determine if the Driesner model is capable of accurately predicting $T_{VLE}$ of brines containing large content of salts with significantly different behavior (Na$_2$CO$_3$, Na$_2$SO$_4$, K$_2$SO$_4$) at similar operating conditions [M. Schubert, J. W. Regler, and F. Vogel, "*Continuous salt precipitation and separation from supercritical water. Part 2. Type 2 salts and mixtures of two salts*," The Journal of Supercritical Fluids, vol. 52, no. 1, pp. 113-124, February 2010].

Figure 22B:
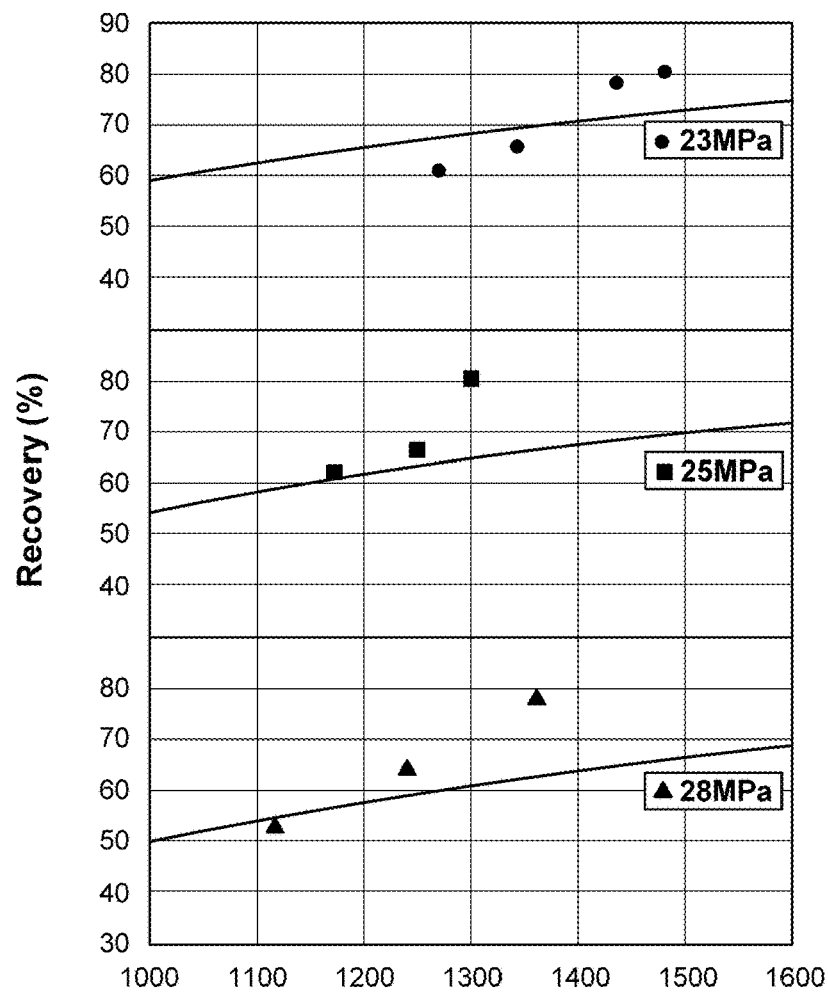

FIG. 22B presents a comparison of 50 g·L$^{-1}$ brine water recovery model results based upon flash and experimental values according to reactor duty (accounting for vessel heat losses). As seen, model error increased with reactor power. The results indicate the existing ELECNRTL model within Aspen Plus® can be used to provide trends regarding system performance and as a tool to roughly guide further process development, although model inaccuracy at higher reactor power should be noted when considering results. The ELECNRTL model did not show sufficient accuracy (<30%) when modeling the 180 g·L$^{-1}$ brines, especially at elevated pressure. These results indicate incorporating the Driesner model [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] into Aspen Plus® would provide better model accuracy and yield greater model utility for guiding future process development than the existing ELECNRTL model.

Conclusions

The reported results indicate a Joule-heated reactor is capable of treating multicomponent hypersaline brines with TDS content ranging from 50 to 180 g·L$^{-1}$. The prototype system showed stable operation and demonstrated ability to treat hypersaline brines that are problematic for other water treatment/management techniques. Clean water recovery ranges of 20-80% were demonstrated over the evaluated operating envelope. TDS content of the clean water product was found to be controlled by operating pressure, with a TDS range of 600-2,800 mg·L$^{-1}$ found over 230 to 280 bar. Results from multicomponent hypersaline brine tests were found to be similar to those reported by Bischoff and Pitzer ["*Liquid-vapor relations for the system NaCl—$H_2O$: summary of the P-T-x surface from 300 degrees to 500 degrees Celsius*," American Journal of Science, vol. 289, pp. 217-248, 1989] and Driesner [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007] for single component NaCl hypersaline brines. TDS content of the hypersaline brine was shown to decrease the associated heat of vaporization; however, due to change in liquid product enthalpy, a clear linear relationship between electrical power input and water recovery was established. Comparing experimental results to results from previously reported models [R. Kaplan, D. Mamrosh, H. H. Salih, and S. A. Dastgheib, "*Assessment of desalination technologies for treatment of a highly saline brine from a potential $CO_2$ storage site*," Desalination, vol. 404, pp. 87-101, February 2017; G. P. Thiel, E. W. Tow, L. D. Banchik, H. W. Chung, and J. H. Lienhard, "*Energy consumption in desalinating produced water from shale oil and gas extraction*," Desalination, p. 94, 2015] indicated Aspen Plus® provides reasonable prediction of 50 g·L$^{-1}$ brine properties and water recovery. However, to better predict system performance with higher strength brines (such as 180 g·L$^{-1}$) the use of alternative models, such as the Driesner model [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochimica et Cosmochimica Acta, vol. 71, pp. 4902-4919, January 2007], is likely to improve simulation accuracy.

Example 3

Figure 23:
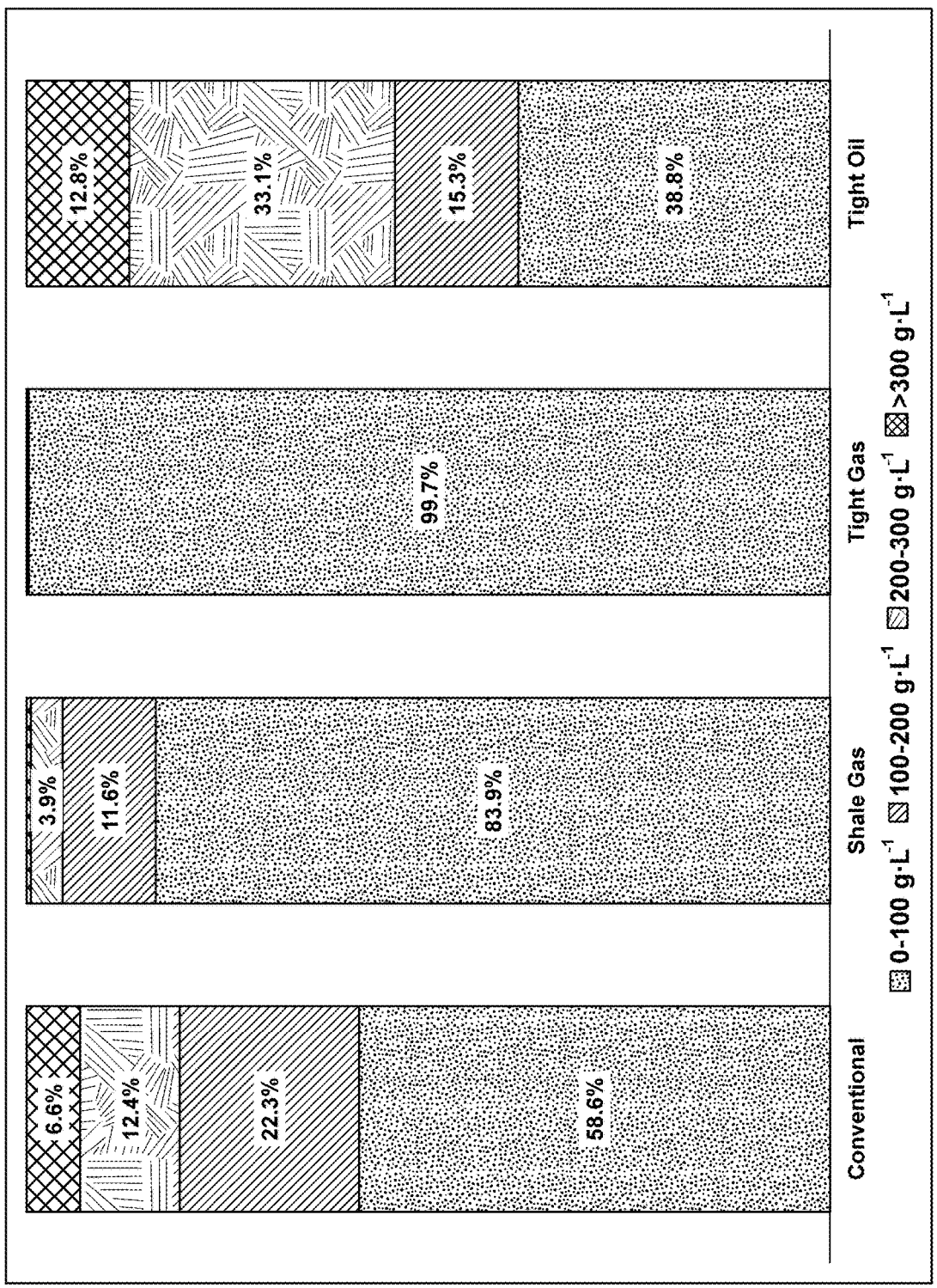
FIG. 23 is a chart showing TDS ranges for various sources of produced water, presented in percentages and in g·L$^{-1}$.

As described above, produced water TDS content can vary wildly depending upon the source reservoir (as seen in FIG. 23), so a means of treating higher salinity brines with minimal discharge is an emerging concern. Further, as described above, supercritical water desalination is an attractive treatment methodology for hypersaline brine (produced water) waste streams generated by oil/gas wells. The Joule-heating method provided in this study allows for internal heating of high conductivity fluids, reducing thermal lag and heat losses endemic to external heating methods. This Example describes the treatment of field-derived produced water from a Utica-Point Pleasant shale well located in Noble County, Ohio (using methods described herein consistent with the principles of the present invention), and compares the results of treating that field-derived produced water with previous results using simulated brines. Experimental results from a prototype process are provided at operating pressures of 230 and 250 bar. At these pressures, a clean vapor was produced with total dissolved solids (TDS) levels of 608.73±57.36 and 1,174.52±131.3 mg·L$^{-1}$, respectively. The liquid outlet was processed through an additional flash vessel to assess further water recovery, producing an additional clean product with a TDS level of 618.0±34.2 mg·L$^{-1}$. A two-stage flash system model was assessed for the reactor outlet, introducing a workable design for a zero liquid discharge (ZLD) system at all appropriate brine salt concentrations.

Thus, the study of this Example was performed to provide a workable understanding of the Joule-based desalination method and its role in purifying produced water waste streams from oil/gas wells. These results are directly compared to similar results provided from the USGS produced water database to demonstrate its efficiency in handling a variety of produced water streams from all sources. Flashing of the reactor's concentrated liquid product demonstrated the ability to further recover clean water from the process, with two-stage flashing simulation results indicating the process is capable of achieving ZLD.

Experimental Methodologies

Materials

The produced water used in this study was collected from a horizontal well located in the UPP Shale in Noble County, Ohio in April 2017. This particular well was drilled in summer 2011 and brought online in fall 2011. At the well pad, the produced water is separated from the hydrocarbon product and stored in a tank with an inert head space. As the produced water used in this study was collected nearly 6 years after operation commenced, this sample is representative of connate water located within the UPP Shale at this location. Upon its collection, the produced water was purged with nitrogen to prevent formation of oxide precipitates. Via analytical characterization (Section 2.3) the produced water was found to contain 255 g·L$^{-1}$; to compare to previous studies, the produced water was diluted to 180 g·L$^{-1}$ with deionized water to allow for better comparison with previous results. The inlet composition for all trials completed is shown in Table 7.

TABLE 7

As collected and experimental test solution compositions.

| Constituent | As Received (mg · L$^{-1}$) | Test Solution (mg · L$^{-1}$) |
|---|---|---|
| Na$^+$ | 50,159.1 ± 1,209.1 | 35,406.4 ± 853.5 |
| Ca$^{2+}$ | 36,504.6 ± 1,289.4 | 25,767.9 ± 910.1 |
| Mg$^{2+}$ | 4,678.0 ± 292.4 | 3,302.1 ± 206.4 |
| Sr$^{2+}$ | 2,966.1 ± 86.5 | 2,093.7 ± 61.1 |
| K$^+$ | 610.2 ± 28.8 | 430.7 ± 20.3 |
| Cl$^-$ | 158,596.8 ± 5,822.5 | 112,204.8 ± 2,750.4 |
| Total | 253,529.5 ± 5,823.8 | 178,961.2 ± 4,110 |

Desalination System

The prototype system used in this Example has been described above in Example 2. Up to 300 mL·min$^{-1}$ flow rate can be pumped into the system with a high pressure liquid chromatography (HPLC) pump. Once the brine has been preheated via exchange with the liquid effluent and additional preheating, the fluid enters the reactor, which is equipped with an inner electrode for Joule heating. The reactor and electrode are constructed from Hastelloy C-276 for high corrosion resistance at the required conditions. The high concentration liquid effluent from the reactor is subsequently cooled via heat exchange and a secondary condenser, whereas the vapor effluent was condensed prior to a reduction of pressure.

Based on the prior work done in Example 2, the reactor was operated at two pressures (230 and 250 bar) with the diluted field-derived produced water (test solution) described above. Water recovery values of 25 to 40 percent were investigated within the reactor at each pressure. Water recovery is determined in Equation 10, $$\text{Water Recovery (\%)} = \frac{\dot{m}_v}{\dot{m}_i} \times 100 \tag{10}$$

with $\dot{m}_i$ (g·min−1) as the inlet mass flowrate and $\dot{m}_v$ (g·min−1) as the vapor mass flowrate.

Sample Analysis

Test solution and reactor vapor and liquid product compositions were analyzed. A Thermo Scientific iCAP 6000 Inductively Coupled Plasma Optical Emission Spectrometer (ICPOES) was used to determine cation concentrations. Standard solutions with dilution factors between 1 to 400 were used. A selection of these samples were also analyzed using a Metrohm 930 Ion Chromatograph (IC) to determine the chloride concentration within each sample. Higher concentrations of chlorides required higher dilution factors, from 10 to 1,000.

Desalination Data Acquisition and Operation

The employed data acquisition system and methods have been described above in Example 2. Temperature readings are acquired at multiple points using Type K thermocouples throughout the desalination vessel, including the inlet and liquid and vapor outlets, and along the reactor's outer wall. System pressure is controlled via pressure regulation on the vapor outlet, whereas the flow rates of both the liquid and vapor outlets are used to control stable system operation. The resistance of the electrode provides a direct measurement of the liquid level in the reactor. This provides a unique method of control within the system: an increase in power leads to proportional increases in the vapor flowrate, decreasing the liquid level within the desalination vessel. The lowered liquid level produces an increase in resistance, lowering the applied power which produces less vapor. This stabilizes the liquid level within the system.

$T_{VLE}$ Determination

An integral bound using a minimizing function within Engineering Equation Solver software was used to determine fluid temperature at the vapor/liquid interface ($T_{VLE}$) (as described above in Example 2). An energy balance accounting for heat losses over the reactor's upper portion was used to estimate $T_{VLE}$ using the vapor mass flowrate ($\dot{m}_v$)·(kg·s−1) and temperature (TE 104 (° C.)). Details of the methods used to determine $T_{VLE}$ have been previously described in Example 2. Briefly, the applied power (the power of the heat tape minus associated losses) was used in the following integral in Equation 11 to approximate $T_{VLE}$:

$$\dot{Q}_{upper} = \dot{m}_v \int_{T_{VLE}}^{TE\ 104} C_p dT \tag{11}$$

Flash System

To evaluate flash evaporation effectiveness, a system was constructed to produce additional clean vapor product from the prototype system's high concentration liquid effluent. The high concentration liquid effluent was collected and saved for testing in the flash evaporation system. The flash evaporation system is comprised of a 200 ml brine heater vessel (V-101), shown in FIG. 24, loaded with the desired amount of test solution and heated to operating pressure and temperature. Once stable temperature and pressure are achieved, HV-101 is opened and released to the atmospheric pressure flash vessel (V-102). The vapor generated from the produced water are filtered (FL-101), removing solid entrained solid salts before condensing in HX-102 and collection (V-103).

While not performed in the system used for this Example, an alternate method may include directly flashing the high concentrated effluent from the bottom of the reactor.

Desalination System Modeling

As an approximation for determining power requirements to the Joule-heated reactor, correlations published by Driesner, et al. [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochim. Cosmochim. Acta, vol. 71, no. 20, pp. 4902-4919, October 2007] were used to calculate specific enthalpies at reactor inlet and liquid/vapor product streams. This calculation is of the form seen in Equation 12, where the system pressure, P, and concentration, x (here approximated as $x_{NaCl}$) are used to correlate the system temperature, T, to an appropriate temperature equivalent, $T_H$. These values for $T_H$ and P can then be used to derive specific enthalpies for pure water. These correlations are themselves built upon literature data from published equations of state for NaCl-water mixtures [C. Palliser and R. McKibbin, "*A model for deep geothermal brine, II: thermodynamic properties—density*," Transport in Porous Media, vol. 33, pp. 129-154, 1998; K. Guerra, K. Dahm, and S. Dundorf, "*Oil and gas producted water management and beneficial use in the western United States*," U.S. Department of Interior Bureau of Reclamation, 157, September 2011; H. L. Barnes and S. B. Romberger, "*Chemical aspects of acid mine drainage*," Water Polution Control Federation, vol. 40, no. 3, pp. 371-384, March 1968] to an agreement of 1% or better within the described temperature-pressure region. These enthalpies are then used to calculate an expected power requirement for desalination using the experimental temperatures and pressures for each stream as well as the inlet concentrations used; the liquid concentration is calculated using a recovery ratio based on the inlet and expected vapor concentration at these conditions. The applied power is then determined using Equation 13, where L, V and i denote the liquid, vapor and inlet flow streams, respectively. These results are plotted as water recovery with electrical power input, and are compared to experimental results in the discussion section.

$$H(T, P, x_{NaCl}) = H_w(T_H, P) \tag{12}$$

$$\dot{Q}_{app} = \dot{m}_L h_L + \dot{m}_V h_V - \dot{m}_i h_i \tag{13}$$

Flash System Modeling

Figure 25:
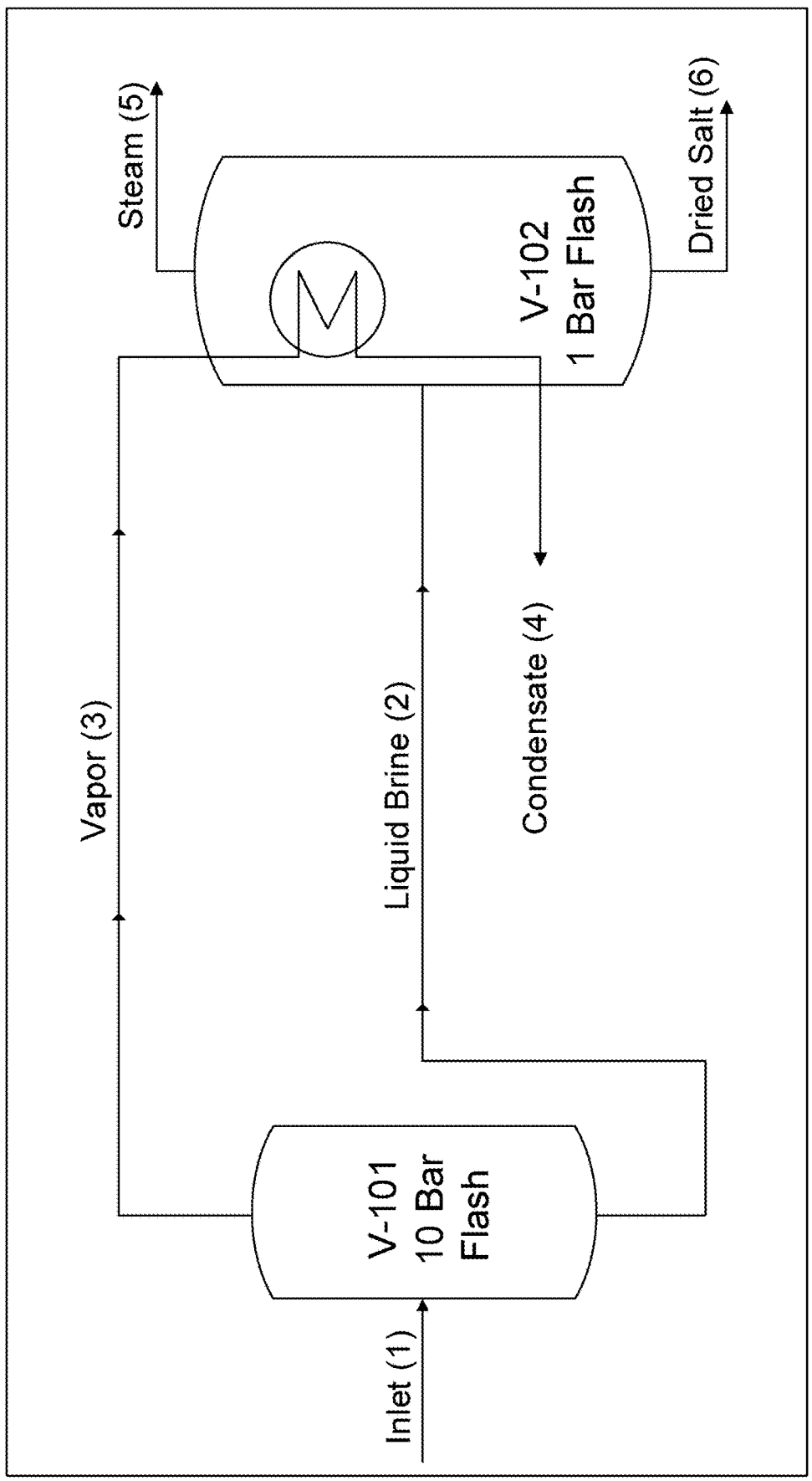
FIG. 25 is a process flow diagram of a two-stage flash model system in accordance with various aspects and principles of the invention described herein. The streams are labeled here; the "liquid brine" stream includes the solid salt precipitate produced from the first flash vessel.

In order to evaluate the Joule-heated desalination process's zero liquid discharge (ZLD) potential, a two-stage flash model was developed for the outlet of the reactor. A range of outlet concentrations were evaluated with consecutive integrated flash vessels operating at 10 bar and 1, respectively (FIG. 25); in the first vessel, the concentrated fluid is flashed, creating a vapor, brine and solid salt stream. This brine is brought to a second flash vessel at 1 bar, where the vapor from the first flash is condensed to provide additional energy to facilitate further recovery of clean water and production of solid salt. The condensate and the steam from both vessels make up the clean water product, whereas the dried salt comprises salt exiting the reactor bottom. The following equations summarize the model: Equation 12 above summarizes the Driesner correlation for binary $NaCl$—$H_2O$ mixtures that are used for both the inlet solution (from the reactor outlet) and the liquid brine that feeds into the second flash vessel. An additional Driesner correlation is used to determine the solubility limit of halite as a function of temperature and pressure in Equation 14; this is used to calculate the salt concentration in the liquid brine produced in the first flash vessel. Equation 15 represents the overall mass balance for both vessels, where X denotes an overall mass fraction. Along a similar vein, Equation 16 represents a salt balance around both vessels; in complete separation, the fraction of dried salt is identical to the concentration of salt in the inlet (C denotes salt concentration on a per mass basis). Equation 17 comprises the isenthalpic assumption for the first flash vessel; that is, the enthalpy of the inlet solution is equal to the sum of product stream (vapor, liquid, solid) enthalpies. Equation 18 is similar; the term "q" denotes the required heat input for complete separation, or alternatively, the excess heat generated from a complete separation (for negative values of q). Here, "cond" denotes the condensate enthalpy (h) and mass fraction and "dry salt" denotes the dried salt enthalpy and mass fraction.

$$C_{NaCl,sat}^L = \sum_{i=0}^{5} e_i \left(\frac{T}{T_{hm}}\right)^i \tag{14}$$

$$X_{stm} + X_L + X_{salt} = X_{cond} + X_v + X_{Dry\ salt} = 1 \tag{15}$$

$$C_{in} = X_L C_L + X_{salt} = X_{Dry\ salt} \tag{16}$$

$$h_i = X_{stm} h_{stm} + X_L h_L + X_{Dry\ salt} h_{NaCl} \tag{17}$$

$$X_{cond} h_{cond} + X_v h_v + X_{Dry\ salt} h_{NaCl} - X_i h_i = q \tag{18}$$

Results and Discussion

NaCl Results

In order to evaluate the Joule-heated reactor's ability to treat brines generated by hydrocarbon reservoirs, trials were completed with 180 g·L$^{-1}$ inlet concentration at 250 bar. As the trials were analyzed using the Driesner data [T. Driesner, "*The system $H_2O$—NaCl. Part II: Correlations for molar volume, enthalpy, and isobaric heat capacity from 0 to 1000° C., 1 to 5000 bar, and 0 to 1 XNaCl*," Geochim. Cosmochim. Acta, vol. 71, no. 20, pp. 4902-4919, October 2007; T. Driesner and C. A. Heinrich, "*The system $H_2O$—NaCl. Part I: Correlation formulae for phase relations in temperature-pressure-composition space from 0 to 1000° C., 0 to 5000 bar, and 0 to 1 XNaCl*," Geochim. Cosmochim. Acta, vol. 71, no. 20, pp. 4880-4901, October 2007, incorporated by reference herein] for NaCl brines, it was necessary to conduct a trial using a binary NaCl—H$_2$O solution to provide a direct comparison. The results from the NaCl brine trial are presented in Table 8. For these trials the system was operated at 250 bar, with inlet concentrations of 180 g·L$^{-1}$ NaCl.

TABLE 8

Reactor product effluents from 180 ± g · L$^{-1}$ NaCl trials at 250 bar.

| Parameters | 180 g · L$^{-1}$ |
|---|---|
| Pressure (bar) | 249.99 ± 0.31 |
| Pseudocritical Temp (° C.) | 384.9 |
| Inlet Temp (° C.) | 352.11 ± 0.15 |
| Vapor Outlet Temp (° C.) | 391.06 ± 0.78 |
| Liquid Outlet Temp (° C.) | 400.73 ± 0.31 |
| T$_{VLE}$ (° C.) | 386.6 |
| ṁ$_{inlet}$ (g · min$^{-1}$) | 112.3 ± 8.6 |
| Inlet TDS (ppm) | 209,774.5 |
| Vapor TDS (ppm) | 1,128.44 ± 23.1 |

Field-Derived Brine Results

Figure 26A:
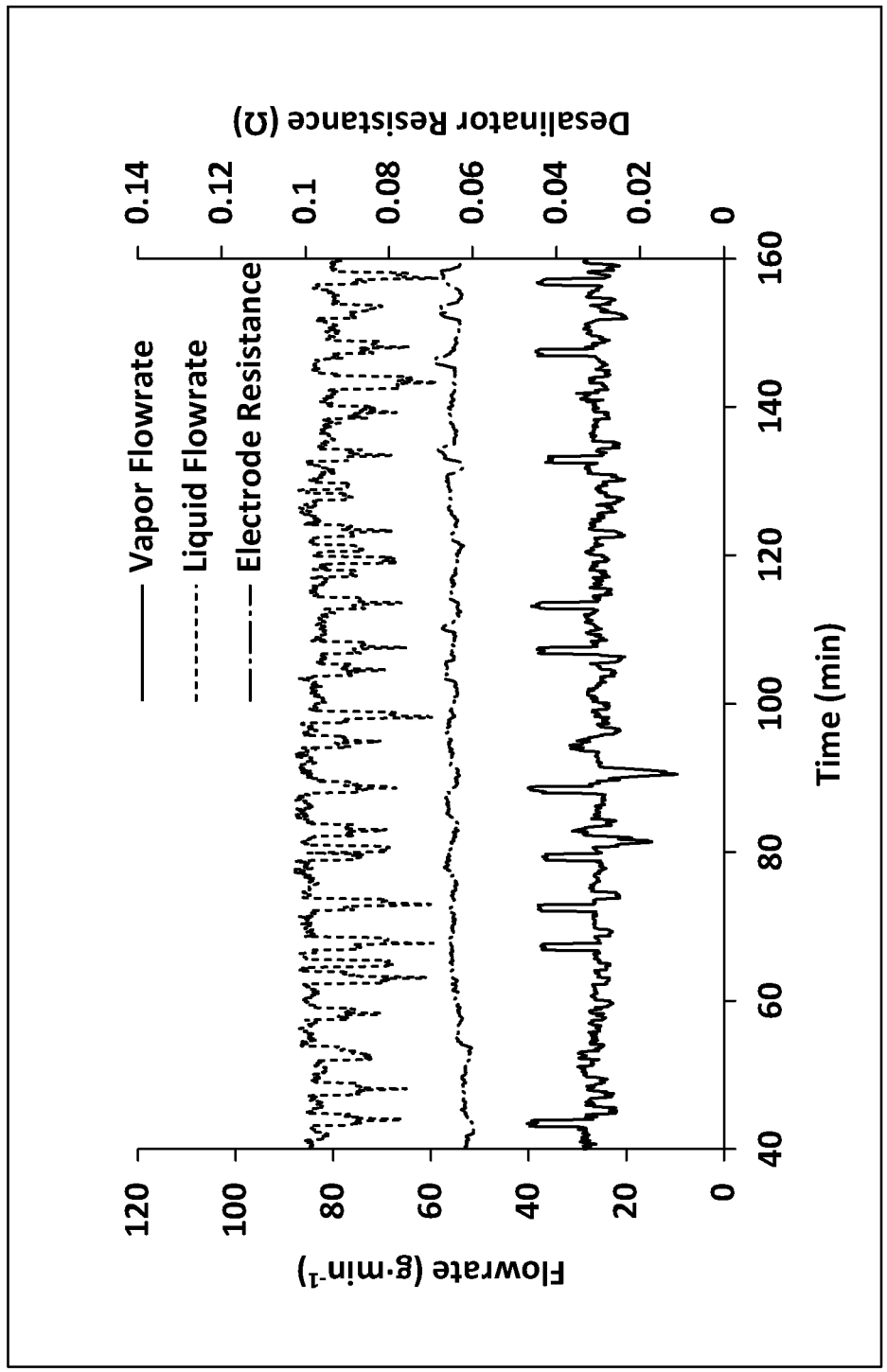
FIGS. 26A, 26B, and 26C are graphs including representative reactor system data for 180 g·L$^{-1}$ UPP brine at 250 bar, with FIG. 26A showing product flowrates and reactor resistance, FIG. 26B showing inlet/outlet temperatures and reactor power, and FIG. 26C showing sodium concentrations in the vapor phase measured using ICP as well as the TDS using an onboard TDS probe. "UPP brine" is field-derived produced water from a Utica-Point Pleasant shale well located in Nobel County, Ohio.
Figure 26B:
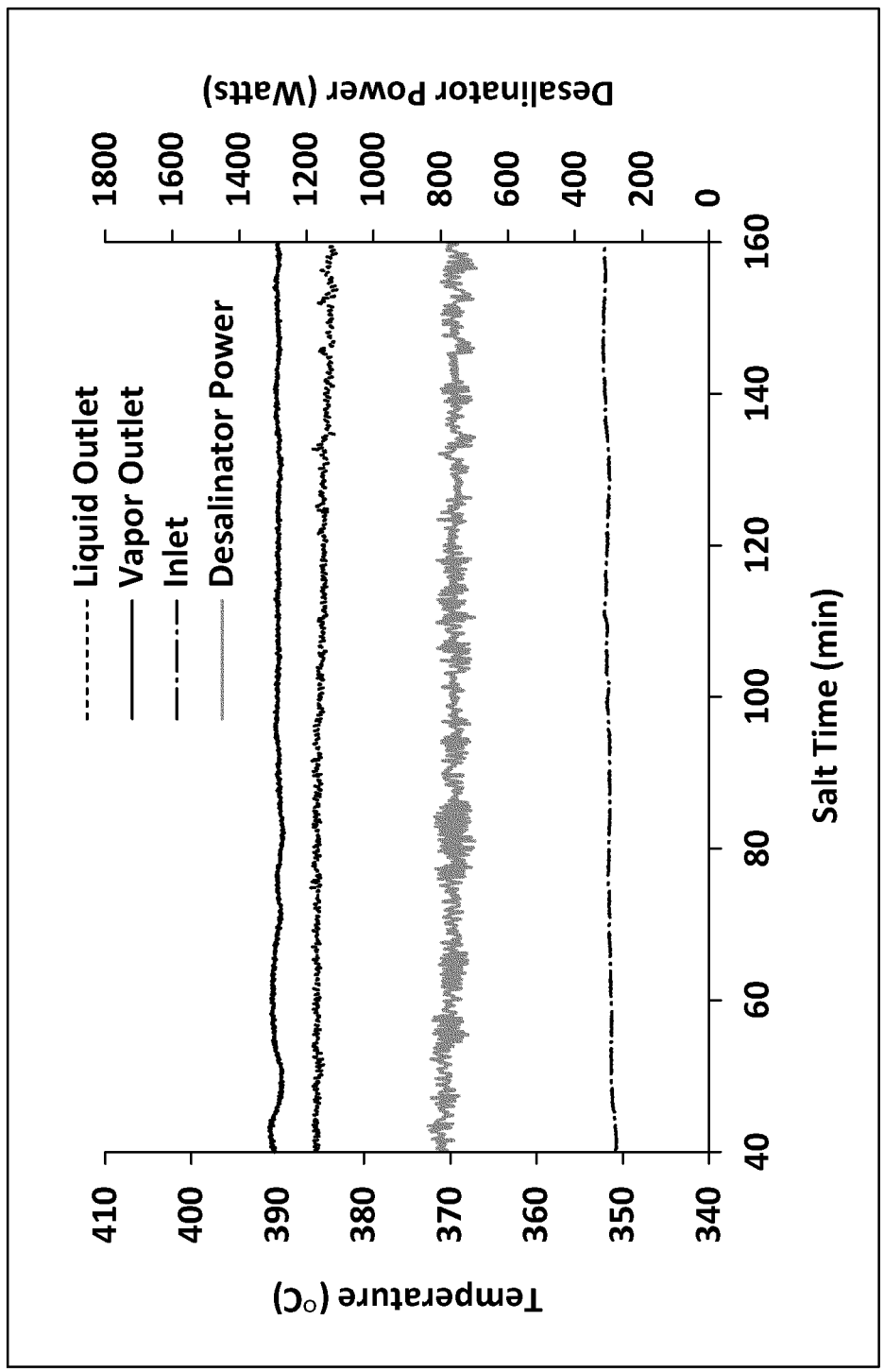
Figure 26C:
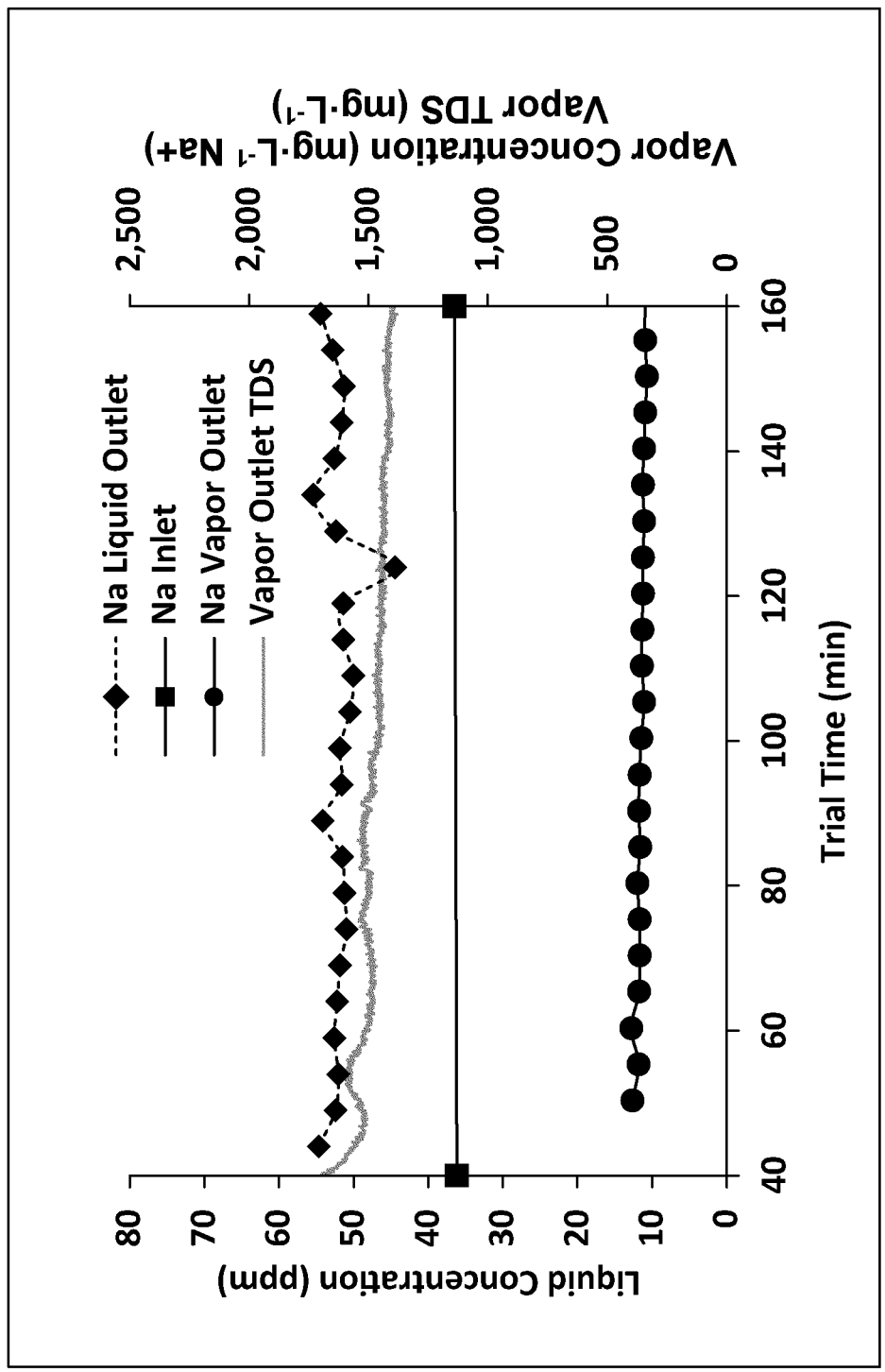

A series of trials were completed with 180 g·L$^{-1}$ UPP brine, achieving water recoveries from 20-40%. Steady state operation was achieved 40 minutes after introducing brine to the system and sustained for a minimum of 120 minutes for each trial. Representative steady state reactor operating data at 250 bar is shown in FIG. 26. The operating data shows a steady state power of 758 W, with a water recovery of 24.7%. Upon reaching a vapor TDS below 2,000 ppm, determined using an onboard TDS probe calibrated for 0-10,000 ppm, sampling of the vapor and liquid products began. The consistent reactor resistance indicates steady level control, as a change in liquid level or concentration in the lower portion of the vessel would result in a reactor resistance change. The steady state results for the UPP brine trials are shown in Table 9.

TABLE 9

180 g · L$^{-1}$ UPP brine reactor system results at 230 and 250 bar.

| | Operating Pressure (bar) | |
|---|---|---|
| Temperatures | 230.00 ± 0.00 | 250.02 ± 0.03 |
| Pseudocritical (° C.) | 377.5 | 384.9 |
| Inlet (° C.) | 346.47 ± 0.51 | 350.60 ± 1.08 |
| Vapor Outlet (° C.) | 378.91 ± 0.20 | 389.97 ± 1.01 |
| Liquid Outlet (° C.) | 382.05 ± 1.07 | 388.48 ± 3.4 |
| T$_{VLE}$ (° C.) | 379.58 ± 1.39 | 386.31 ± 1.03 |
| ṁ$_{inlet}$ (g · min$^{-1}$) | 105.89 ± 0.82 | 106.99 ± 1.64 |
| Inlet TDS (ppm) | 178,013.6 ± 5,329.9 | 179,910.4 ± 3,338.04 |
| Vapor TDS (ppm) | 608.73 ± 57.36 | 1,174.52 ± 131.3 |

Figure 27:
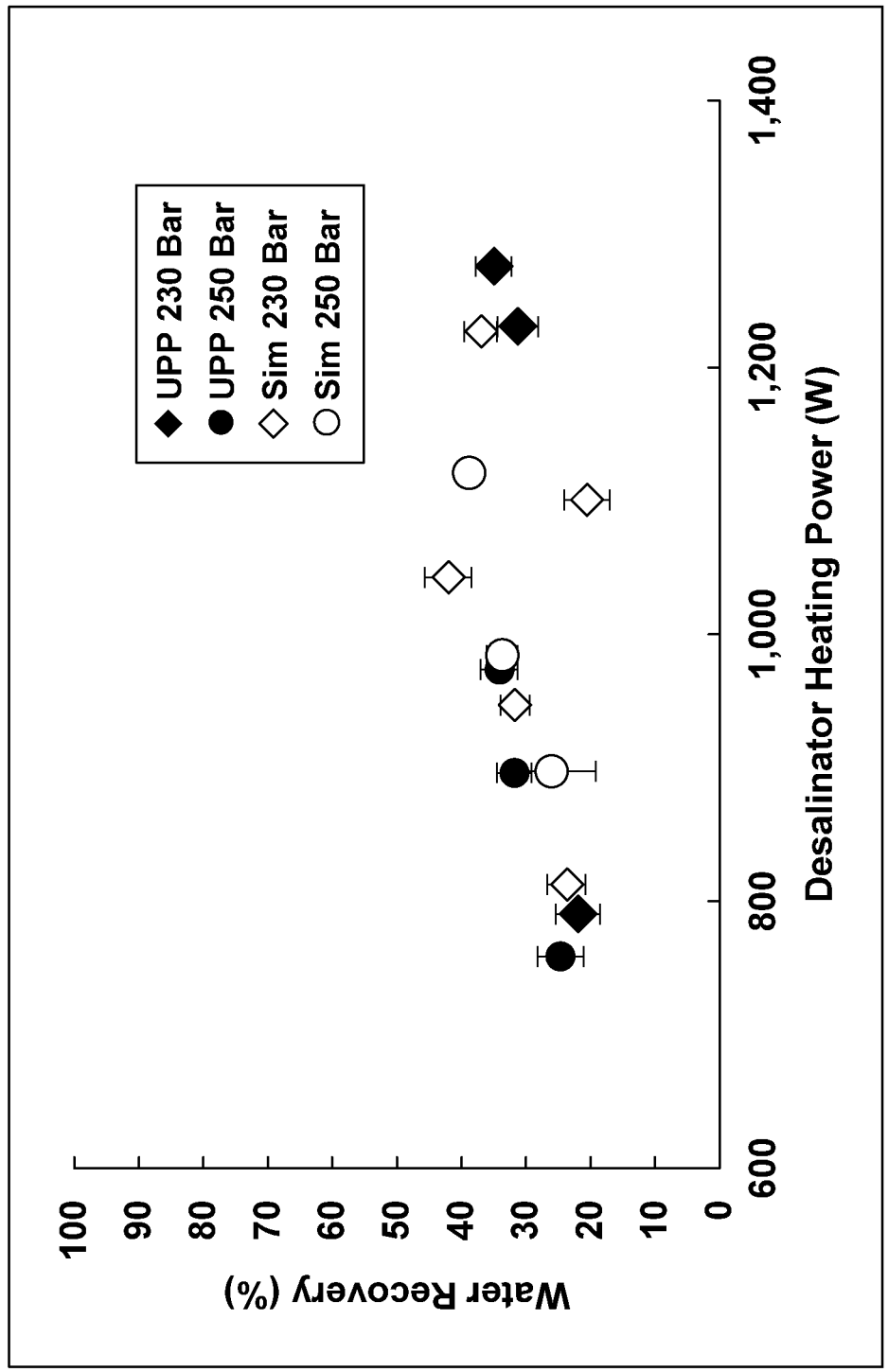
FIG. 27 is a graph showing water recovery from experimental trials based upon reactor power for both UPP and simulated brines containing 180 g·L$^{-1}$ TDS. Water recovery defined by Equation 10. All trials completed with inlet flowrates of 100 mL·min$^{-1}$. Results corrected for heat loss.

Water recovery was calculated and compared to the power input to the reactor in FIG. 27. Reactor power ranged from 790 to 1,276 W and 758 to 973 W while recovery ranged from 21.9% to 35% and 24.7% to 34.2% for the 230 and 250 bar trials, respectively. Linear trends can be seen at each pressure, with the 230 bar trials resulting in higher power requirements. Results from the previously evaluated simulated brine data is also included; the 230 and 250 bar trials are within error of one another.

Vapor Product Quality

Figure 28:
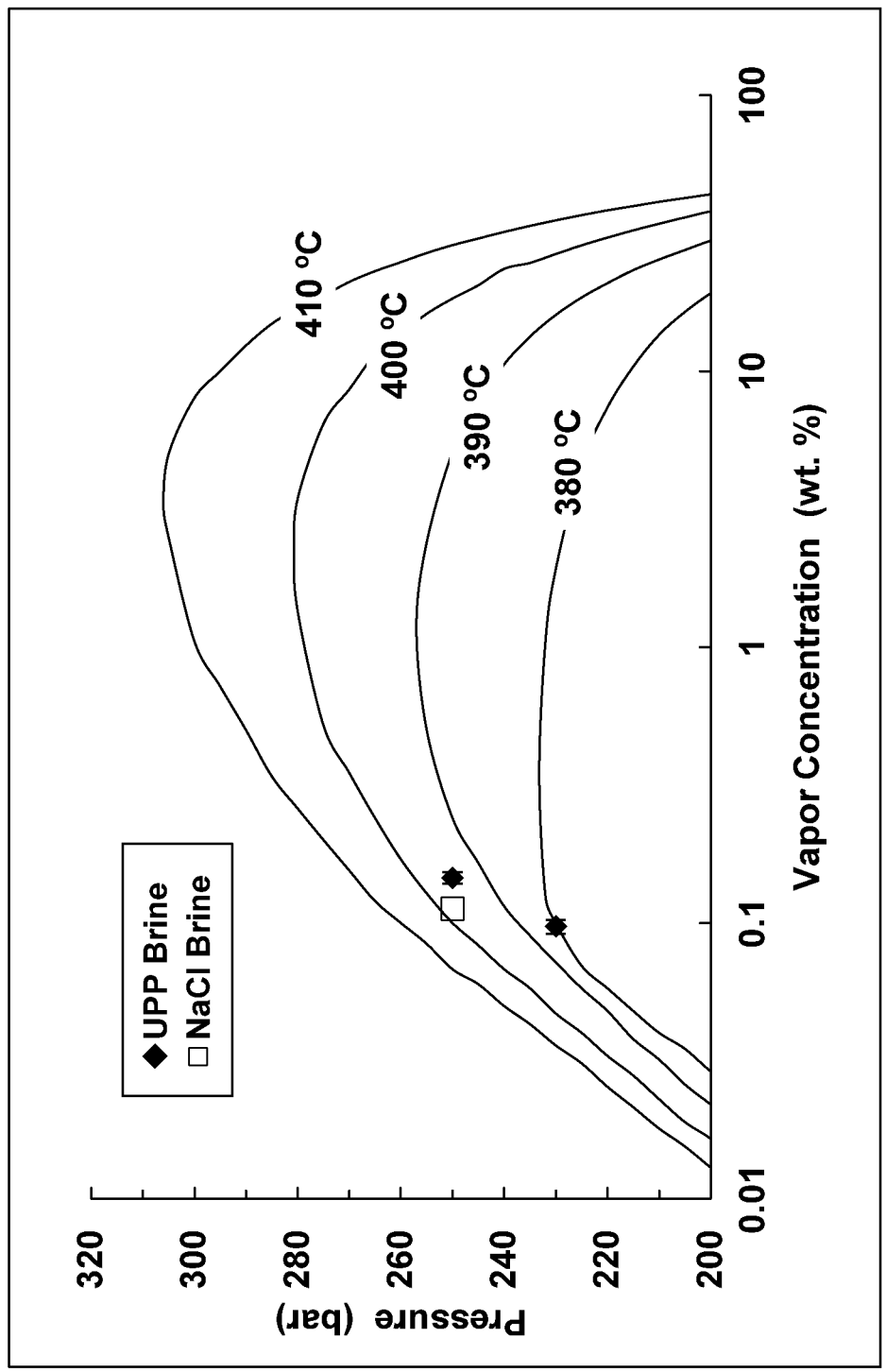
FIG. 28 is a graph showing a comparison of vapor TDS concentrations from 180 g·L$^{-1}$ NaCl and UPP brines results with Bischoff and Pitzer data [J. L. Bischoff, R. J. Rosenbauer, and K. S. Pitzer, "*The system NaCl-H$_2$O: Relations of vapor-liquid near the critical temperature of water and of vapor-liquid-halite from 300 to 500 C*," Geochim. Cosmochim. Acta, vol. 50, no. 7, pp. 1437-1444, 1986]. Bischoff and Pitzer results are shown as smoothed grey lines of constant temperature.
Figure 29:
FIG. 29 is a chart showing a comparison of simulated and UPP vapor products by cation and total TDS content. Chlorides (Cl$^-$) make up the balance between cation and total contents.

Vapor TDS for the 180 g·L$^{-1}$ NaCl and UPP well brines are shown in FIG. 28. Vapor generated from the UPP brine contained very similar TDS concentrations as NaCl brine reported by Bischoff and Pitzer data sets [J. L. Bischoff, R. J. Rosenbauer, and K. S. Pitzer, "The system NaCl—H$_2$O: Relations of vapor-liquid near the critical temperature of water and of vapor-liquid-halite from 300 to 500 C," Geochim. Cosmochim. Acta, vol. 50, no. 7, pp. 1437-1444, 1986]. As operating pressure increases past the critical pressure of pure water, vapor TDS increases, a phenomenon that is consistent with simulated brines previously investigated and described above in Example 2. This is a result of greater vapor density exiting the reactor with increasing pressure. Vapor concentrations were found to be 608.73±57.36 mg·L$^{-1}$ and 1,174.52±131.3 mg·L$^{-1}$ at 230 and 250 bar, respectively. The individual ion concentrations for the vapor effluent are shown in Table 10. This is reflective of simulated brine previously tested in Example 2; the vapor product for 230 and 250 bar was 622.3±163.7 mg·L$^{-1}$ and 1167.7±249.3 mg·L$^{-1}$, respectively. However, the UPP vapor has a different makeup of cation constituents than its simulated counterpart; this comparison is reflected in FIG. 29. The UPP brine has a much higher Ca$^{2+}$ content and much lower Na$^+$ content. This difference can be attributed to a proportional difference in the inlet concentration; however, the inlet UPP brine is much higher in both Sr$^{2+}$ and K$^+$; thus, this data suggests a preferential solubility for Sr$^{2+}$ as opposed to K$^+$ in the vapor product. Given that the TDS of both the UPP and simulated brine vapor products are the same, this further suggests that the composition of the vapor product is determined both by the inlet composition and the relative solubilities of each ion in the vapor phase. Of additional note, the Cl$^-$ concentration is a bit higher than expected based upon respective cation concentrations. MgCl$_2$ is known to hydrolyze to form brucite (MgOH$_2$) when coupled with NaCl at temperatures as low as 200° C. [P. L. Brown, S. E. Drummond, and D. A. Palmer, "Hydrolysis of magnesium(II) at elevated temperatures," p. 5]. At higher temperatures, up to 40% of MgCl$_2$ can hydrolyze in solution, as compared to 0.14% for CaCl$_2$ and trace amounts for NaCl [M. R. Gray, P. E. Eaton, and T. Le, "Kinetics of Hydrolysis of Chloride Salts in Model Crude Oil," Pet. Sci. Technol., vol. 26, no. 16, pp. 1924-1933, October 2008]. The Cl$^-$ levels in the vapor are imbalanced by approximately 120 mg·L$^{-1}$, which is a full order of magnitude smaller than the 3,853 mg·L$^{-1}$ that would be expected if 40% of the MgCl$_2$ hydrolyzed. The pH of the vapor product is roughly 3, which reflects this analysis.

TABLE 10

Vapor product compositions for the 230 and 250 bar UPP well trials in comparison with the simulated brine data of Example 2. Concentrations are presented in mg · L$^{-1}$.

| Constituent | UPP 230 bar (mg · L$^{-1}$) | UPP 250 Bar (mg · L$^{-1}$) |
|---|---|---|
| Na$^+$ | 183.49 ± 12.43 | 375.60 ± 34.59 |
| Ca$^{2+}$ | 37.78 ± 6.63 | 58.88 ± 15.60 |
| Mg$^{2+}$ | 7.74 ± 2.02 | 10.94 ± 4.10 |
| Sr$^{2+}$ | 2.21 ± 0.46 | 3.60 ± 0.10 |
| K$^+$ | 1.56 ± 0.21 | 3.56 ± 0.47 |
| Cl$^-$ | 525.66 ± 19.16 | 876.36 ± 46.59 |

T$_{VLE}$

Figure 30:
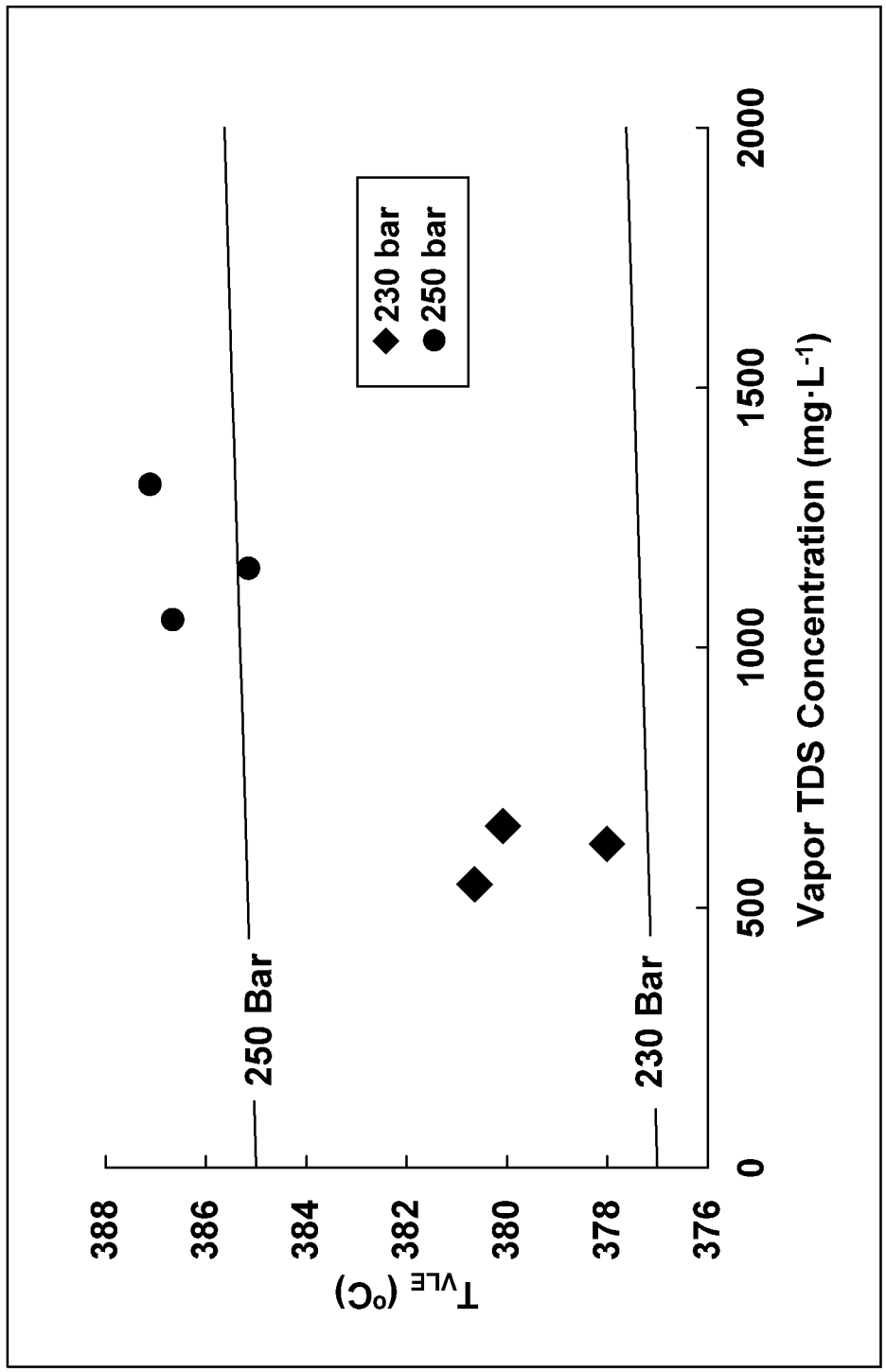
FIG. 30 is a graph showing experimental $T_{VLE}$ results from the UPP brine trials conducted at 230 and 250 bar. Pseudocritical lines are presented for each concentration, calculated utilizing the maximum value of specific heat using the Driesner model [28] at each pressure.

T$_{VLE}$ was calculated using the methods described in Example 2, above. T$_{VLE}$ was calculated to be 379.58±1.39° C. and 386.31±1.03° C. for the 230 and 250 bar trials, respectively. These results are comparable to the synthetic brine that was previously tested resulting in T$_{VLE}$ of 380.1±1.43 (230 bar) and 387.8±1.19 (250 bar) with the field derived water showing slightly lower T$_{VLE}$ values. T$_{VLE}$ results are presented in FIG. 30, comparing calculated values to the pseudocritical line calculated using the Driesner model [T. Driesner, "The system $H_2O$—NaCl. Part II: Correlations for molar volume, enthalpy, and isobaric heat capacity from 0 to 1000° C., 1 to 5000 bar, and 0 to 1 XNaCl," Geochim. Cosmochim. Acta, vol. 71, no. 20, pp. 4902-4919, October 2007; T. Driesner and C. A. Heinrich, "The system $H_2O$—NaCl. Part I: Correlation formulae for phase relations in temperature-pressure-composition space from 0 to 1000° C., 0 to 5000 bar, and 0 to 1 XNaCl," Geochim. Cosmochim. Acta, vol. 71, no. 20, pp. 4880-4901, October 2007]. Similar to the synthetic brine results, the $T_{VLE}$ values were found to be slightly higher than the pseudocritical temperature for the vapor concentration. This is attributed to the pseudocritical temperature being calculated using the pure NaCl Driesner data [T. Driesner, "The system $H_2O$—NaCl. Part II: Correlations for molar volume, enthalpy, and isobaric heat capacity from 0 to 1000° C., 1 to 5000 bar, and 0 to 1 XNaCl," Geochim. Cosmochim. Acta, vol. 71, no. 20, pp. 4902-4919, October 2007], while the synthetic and field derived test solutions were multicomponent, containing significant amounts of $CaCl_2$, $MgCl_2$, and $SrCl_2$.

Reactor Modeling

Previously, the ability to utilize built-in ELECNRTL and Flash2 models in Aspen Plus® v9 to predict reactor water recovery (%) with power input (W) was assessed. These previous results showed ELECNRTL model accuracy decreased with power input and solution TDS content, with significant error occurring with solutions containing 180 $g \cdot L^{-1}$ TDS. However, in comparing experimentally determined $T_{VLE}$ results, the Driesner model provided better accuracy (2-3° C. error) in comparison to the Aspen Plus® v9 ELECNRTL model (6-28° C.) [T. Driesner, "The system $H_2O$—NaCl. Part II: Correlations for molar volume, enthalpy, and isobaric heat capacity from 0 to 1000° C., 1 to 5000 bar, and 0 to 1 XNaCl," Geochim. Cosmochim. Acta, vol. 71, no. 20, pp. 4902-4919, October 2007]. In this study, the Driesner model was applied to the reactor unit and used to predict water recovery based upon electrical power input.

Figure 31:
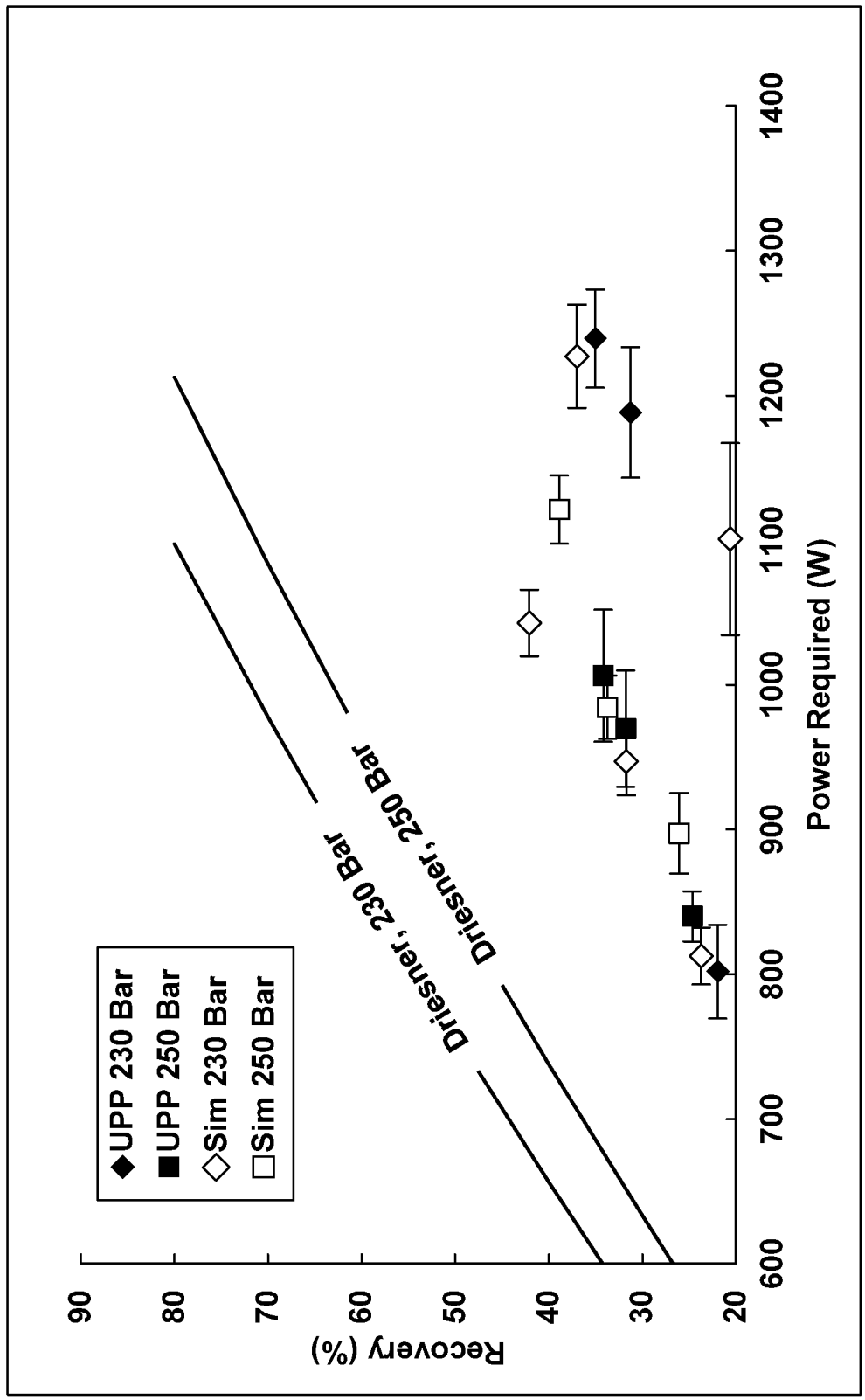
FIG. 31 is a graph showing a comparison of Joule-heated reactor corrected power inputs with expectations from Driesner [T. Driesner, "*The system H$_2$O—NaCl. Part II: Correlations for molar volume, enthalpy, and isobaric heat capacity from 0 to 1000° C., 1 to 5000 bar, and 0 to 1 XNaCl*," Geochim. Cosmochim. Acta, vol. 71, no. 20, pp. 4902-4919, October 2007] data. The temperatures employed in calculation reflect the inlet, liquid and vapor data.

FIG. 31 presents Driesner model results with reactor water recoveries which have been corrected with experimentally determined heat losses. Under these operating conditions the Driesner model under predicts electrical power input required to generate clean water vapor, with error increasing with water recovery. Driesner model error is likely due to the lack of stability in phase separation near the critical point of pure water. These errors could also result from inaccuracies in the enthalpies near the critical point, as Driesner [T. Driesner, "The system H2O—NaCl. Part II: Correlations for molar volume, enthalpy, and isobaric heat capacity from 0 to 1000° C., 1 to 5000 bar, and 0 to 1 XNaCl," Geochim. Cosmochim. Acta, vol. 71, no. 20, pp. 4902-4919, October 2007] speculated some discrepancies for the equations of state were present when employed near the critical temperature and pressure of pure water. Finally, while NaCl is the dominant salt present in the UPP brine, other salts and organic components are present (especially $Ca^{2+}$), providing for possible discrepancies between projection and result. This is echoed by the simulated brine data also depicted—a different distribution of ions led to differences in the simulated brine data relative to the UPP brine. These results suggest that more accurate thermodynamic property models could be useful at the reported operating conditions to sufficiently predict power requirements for the Joule-heated reactor.

Flash Experimental Results and Modeling

Figure 32:
FIG. 32 is a chart showing a comparison of values for liquid effluent (on left) and flash product (on right). Chlorides (Cl$^-$) make up the balance between cation and total contents.

A series of flash trials were completed using the liquid product from 250 bar experiments. This product was chosen as there was minimal difference in composition between liquid products produced at 230 and 250 bar. To mimic prototype system operation, the flash vessel was operated at 250 bar and the experimentally determined $T_{VLE}$ (388.5° C.) for the liquid product. Initial trials were conducted, without a flash vessel filter, which resulted in flash vapor products with greater than 8,000 $mg \cdot L^{-1}$ TDS. This large TDS content was caused by entrainment of brine fluid and/or solid salts generated during the flash procedure into the collection vessel. To prevent entrainment, a sintered metal filter (FL-101) was added to the flash vessel. Table 11 presents both the 250 bar reactor concentrate and flashed water product compositions. While the 250 bar reactor concentrate contained 268 $g \cdot L^{-1}$ TDS, the flash product TDS was significantly lower at approximately 620 $mg \cdot L^{-1}$. FIG. 32 is a graphical representation of these results. Note the proportionally higher values of $K^+$ and $Na^+$ in the flash product, as well as the proportionally lower amounts of $Ca^{2+}$, $Mg^{2+}$ and $Sr^{2+}$; this suggests that the divalent ions are more likely to remain in the liquid or solidify as solid salts rather than entraining with the vapor flash product. These results show it is possible to recover additional clean water beyond the Joule-heated reactor vapor stream via flashing.

TABLE 11

Reactor concentrate and flash product compositions at 250 bar.

| Constituent | Liquid, 250 Bar (mg · L$^{-1}$) | Flash Product (mg · L$^{-1}$) |
| --- | --- | --- |
| Na$^+$ | 54,642.4 ± 2290.4 | 153.2 ± 16.5 |
| Ca$^{2+}$ | 37,269.1 ± 1057.0 | 67.6 ± 0.6 |
| Mg$^{2+}$ | 4,916.9 ± 150.8 | 7.0 ± 1.6 |
| Sr$^{2+}$ | 3039.8 ± 105.3 | 5.2 ± 0.6 |
| K$^+$ | 648.2 ± 47.1 | 2.1 ± 0.3 |
| Cl$^-$ | 168,055.4 ± 9630.2 | 400.8 ± 18.6 |
| Total | 268,179.4 ± 9288.5 | 618.0 ± 34.2 |

Figure 33:
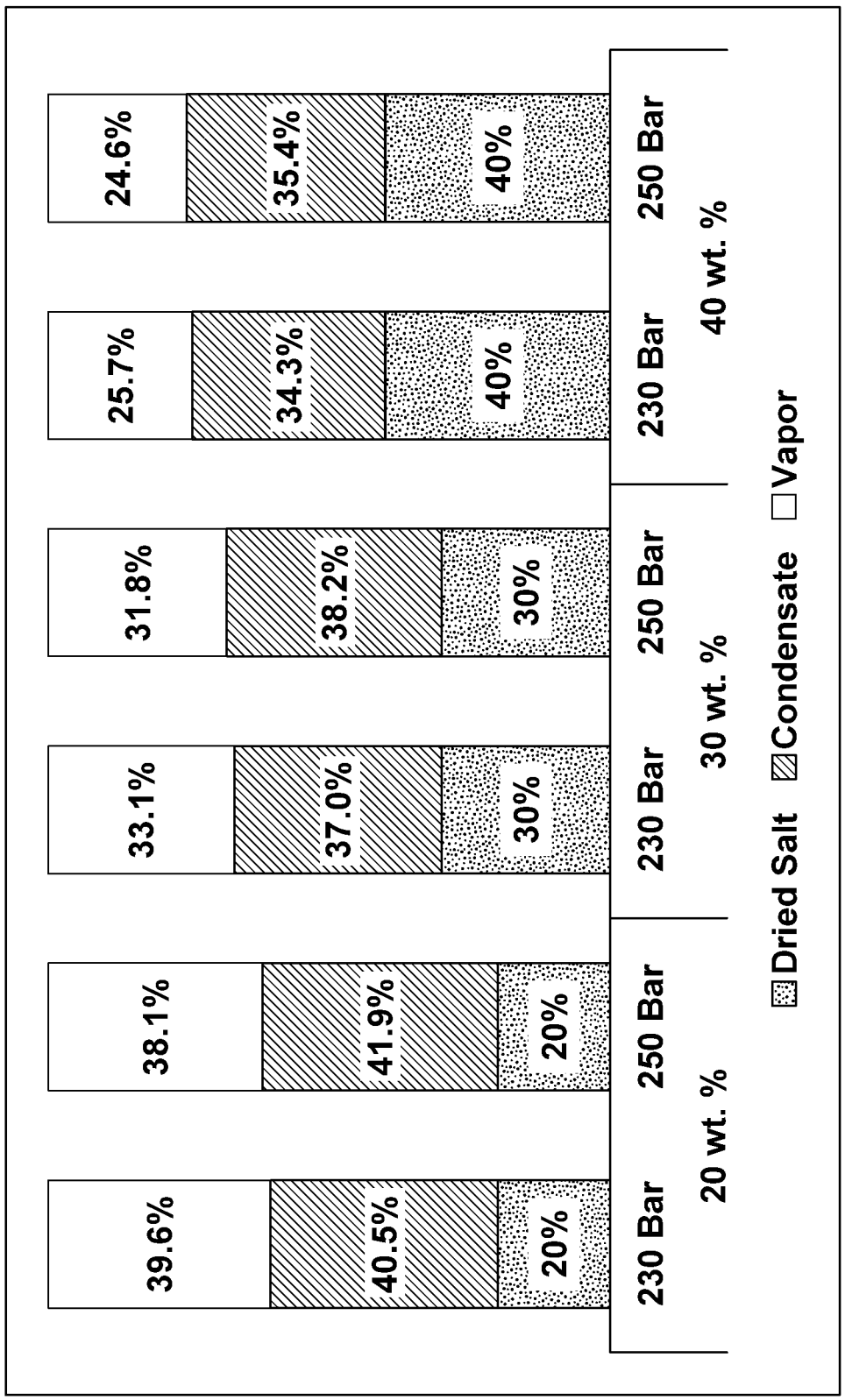
FIG. 33 is a chart showing fractions of dried salt, condensate, and vapor produced from the two-stage flash system at 230 and 250 bar for varying reactor outlet concentrations. Weight percent is used here in lieu of g·L$^{-1}$ given the reactor outlet's unknown density profile at these operating conditions.
Figure 34:
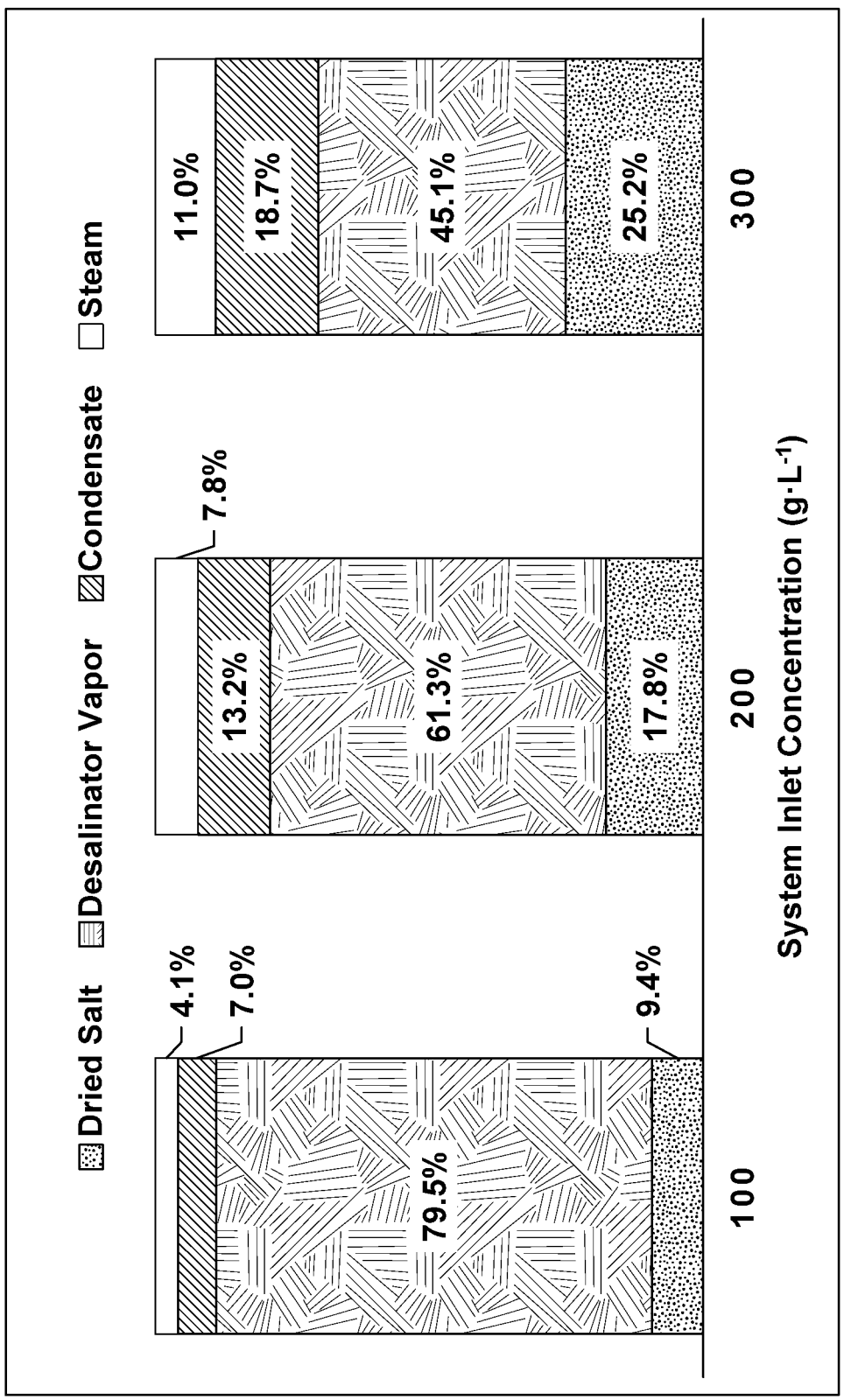
FIG. 34 is a chart showing overall product recoveries of the reactor and flash system at 250 bar. Note that the salt is contained substantially, if not entirely, within the "Dried Salt" stream.

To further assess the quantity of clean water which can be recovered from flashing the reactor liquid product, a two-stage flash model was used as described above. This model was used to assess clean water recovery from reactor outlet concentrations from 20 to 40 wt. % at 230 and 250 bar. FIG. 33 represents the fractionation at varying salt concentrations and pressures for the inlet to the two-stage flash system, represented as condensate, vapor and solid salt. Enthalpy balance results for the 30 wt % inlet at 250 bar are provided in Table 12, and described below. It is worth noting that the "q" value is negative for all represented salt concentrations, implying complete evaporation of water within the two-stage flash system is favored from an enthalpic standpoint. Similar results were found by van Wyk et al. while evaluating supercritical water treatment of seawater [S. van Wyk, S. O. Odu, A. G. J. van der Ham, and S. R. A. Kersten, "Design and results of a first generation pilot plant for supercritical water desalination (SCWD)," Desalination, vol. 439, pp. 80-92, August 2018]. Thus, the Joule-heated desalination process is a viable ZLD candidate. Because of this, a two-stage flash system projects 100% clean water recovery from three streams: the vapor product from the reactor, the vapor product from the 10 bar flash vessel, and the steam product from the 1 bar flash vessel. FIG. 34 depicts the expected mass fractionation from this system at a reactor pressure of 250 bar. Increasing the system inlet concentration produces smaller yields of clean vapor in the reactor and larger yields of clean vapor in the flash system. Note that all salt emerges as "dried salt" in the flash vessel.

As mentioned above, an example enthalpy balance for the two-stage flash system is given in Table 12, for an example reactor outlet concentration of 30 wt. % at 250 bar. X denotes the overall mass fraction (outlined in the "Flash System Modeling" section, above); the balance is done on a per kilogram basis. The negative "Heat Balance" value implies that the enthalpy provided by the inlet stream surpasses the enthalpy requirements for complete separation (into steam and dried salt streams). The vapor from the first vessel is used for additional heat recovery; thus, the condensate stream is an additional outlet from the second flash vessel.

TABLE 12

Enthalpy balance for the two-stage flash system with a 30 wt. % inlet at 250 bar.

| Stream Name | Stream ID | T (° C.) | P (bar) | Mass (kg) | Salt Fraction | Enthalpy (kJ) |
|---|---|---|---|---|---|---|
| Inlet | 1 | 388.5 | 250 | 1.00 | 0.3 | 1364.0 |
| Liquid Brine Entrained | 2 A | 180 | 10 | 0.46 | 0.31 | 281.3 |
| Solid | 2 B | 180 | 10 | 0.16 | 1 | 21.8 |
| Vapor | 3 | 180 | 10 | 0.38 | 0 | 1061.2 |
| Condensate | 4 | 180 | 10 | 0.38 | 0 | 291.4 |
| Steam | 5 | 100 | 1 | 0.32 | 0 | 850.7 |
| Dried Salt | 6 | 100 | 1 | 0.30 | 1 | 19.7 |
| Heat Balance | | | | | | −202.2 |

CONCLUSIONS

The above results provide a workable understanding of the Joule-based desalination method and its role in purifying produced water waste streams from oil/gas wells. These results are directly compared to similar results provided from the USGS produced water database to demonstrate its efficiency in handling a variety of produced water streams from all sources. Flashing of the reactor's concentrated liquid product demonstrated the ability to further recover clean water from the process, with two-stage flashing simulation results indicating the process is capable of achieving ZLD. The applied power required is also depicted; discrepancies between this and similar models (such as the Dreisner model) provide a direction for future work.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. An apparatus to decontaminate a liquid including dissolved solids comprising:
   a reactor having a first electrode and a second electrode; and
   a liquid flow path between said first and second electrodes, wherein the reactor is adapted to generate electrical current such that liquid in the liquid flow path reaches at least a pseudocritical temperature, and wherein the reactor is incapable of generating the electrical current such that the liquid in the liquid flow path reaches a temperature indicative of electrolysis.

2. The apparatus of claim 1, wherein said first electrode comprises a wall of said reactor.

3. The apparatus of claim 2, wherein at least a portion of said wall defines an interior space of said reactor, and wherein at least a portion of said second electrode is disposed within said interior space.

4. The apparatus of claim 3, wherein said reactor is tubular and said second electrode runs along a length of said tubular reactor.

5. The apparatus of claim 3, further comprising at least one electrode sealing fitting that insulates said wall of said reactor from said second electrode.

6. The apparatus of claim 5, further comprising an alumina insulator associated with said at least one electrode sealing fitting.

7. The apparatus of claim 3, further comprising an alumina insulating washer positioned between a first piece and a second piece of the second electrode to prevent ejection of the second piece from the first piece.

8. The apparatus of claim 2, wherein said wall of said reactor includes a material that is corrosion-resistant.

9. The apparatus of claim 8, wherein said material includes a high nickel alloy.

10. The apparatus of claim 1, further comprising a liquid inlet and a liquid outlet located in a first section of said reactor, and a vapor outlet located in a second section of said reactor.

11. The apparatus of claim 10, wherein said vapor outlet is connected to said liquid outlet.

12. The apparatus of claim 10, wherein said first section of said reactor is a lower section, and said second section of said reactor is an upper section.

13. The apparatus of claim 1, further comprising a pressure regulator.

14. An apparatus to decontaminate a liquid including dissolved solids comprising:
   a reactor having a first electrode and a second electrode;
   an alumina insulating washer positioned between a first piece and a second piece of the second electrode to prevent ejection of the second piece from the first piece; and
   a liquid flow path between said first and second electrodes.

15. An apparatus to decontaminate a liquid including dissolved solids comprising:
   a reactor having a first electrode and a second electrode, wherein said first electrode comprises a wall of said reactor, wherein at least a portion of said wall defines an interior space of said reactor, and wherein at least a portion of said second electrode is disposed within said interior space;
   an alumina insulating washer positioned between a first piece and a second piece of the second electrode to prevent ejection of the second piece from the first piece; and
   a liquid flow path between said first and second electrodes.

* * * * *